United States Patent
Bender

(10) Patent No.: US 7,067,608 B2
(45) Date of Patent: Jun. 27, 2006

(54) PROCESS FOR PREPARING BRANCHED POLYARYLENE ETHERS

(75) Inventor: Timothy P. Bender, Port Credit (CA)

(73) Assignee: Xerox Corporation, Stamford, CT (US)

( * ) Notice: Subject to any disclaimer, the term of this patent is extended or adjusted under 35 U.S.C. 154(b) by 60 days.

(21) Appl. No.: 10/722,326

(22) Filed: Nov. 25, 2003

(65) Prior Publication Data
US 2005/0154178 A1    Jul. 14, 2005

(51) Int. Cl.
*C08G 14/00* (2006.01)

(52) U.S. Cl. ............... 528/125; 528/126; 528/220; 528/488; 528/492; 528/501; 528/503; 525/36; 525/471; 525/534

(58) Field of Classification Search ............ 528/125, 528/126, 220, 488, 492, 501, 503; 525/310, 525/471, 534
See application file for complete search history.

(56) References Cited

U.S. PATENT DOCUMENTS

| | | | |
|---|---|---|---|
| 2,297,691 A | 10/1942 | Carlson | 95/5 |
| 3,041,167 A | 6/1962 | Blakney et al. | 96/1 |
| 3,121,006 A | 2/1964 | Middleton et al. | 96/1 |
| 4,251,612 A | 2/1981 | Chu et al. | 430/59 |
| 4,265,990 A | 5/1981 | Stolka et al. | 430/59 |
| 5,739,254 A | 4/1998 | Fuller et al. | 528/125 |
| 5,753,783 A | 5/1998 | Fuller et al. | 525/471 |
| 5,773,553 A | 6/1998 | Fuller et al. | 528/170 |
| 5,814,426 A | 9/1998 | Fuller et al. | 430/96 |
| 5,849,809 A | 12/1998 | Narang et al. | 522/35 |
| 5,863,963 A | 1/1999 | Narang et al. | 522/162 |
| 5,869,595 A | 2/1999 | Fuller et al. | 528/322 |
| 5,874,192 A | 2/1999 | Fuller et al. | 430/58 |
| 5,882,814 A | 3/1999 | Fuller et al. | 430/59 |
| 5,889,077 A | 3/1999 | Fuller et al. | 522/162 |
| 5,939,206 A | 8/1999 | Kneezel et al. | 428/480 |
| 5,945,253 A | 8/1999 | Narang et al. | 430/280.1 |
| 5,958,995 A | 9/1999 | Narang et al. | 522/35 |
| 5,994,425 A | 11/1999 | Narang et al. | 522/35 |
| 6,007,877 A | 12/1999 | Narang et al. | 427/510 |
| 6,020,119 A | 2/2000 | Foucher et al. | 430/627 |
| 6,022,095 A | 2/2000 | Narang et al. | 347/20 |
| 6,087,414 A | 7/2000 | Fuller et al. | 522/162 |
| 6,090,453 A | 7/2000 | Narang et al. | 427/504 |
| 6,117,967 A | 9/2000 | Fuller et al. | 528/125 |
| 6,124,372 A | 9/2000 | Smith et al. | 522/35 |
| 6,139,920 A | 10/2000 | Smith et al. | 427/510 |
| 6,151,042 A | 11/2000 | Smith et al. | 347/20 |
| 6,174,636 B1 | 1/2001 | Fuller et al. | 430/58.7 |
| 6,177,238 B1 | 1/2001 | Fuller et al. | 430/320 |
| 6,184,263 B1 | 2/2001 | Narang et al. | 522/111 |
| 6,187,512 B1 | 2/2001 | Foucher et al. | 430/311 |
| 6,203,143 B1 | 3/2001 | Narang et al. | 347/65 |
| 6,260,949 B1 | 7/2001 | Smith et al. | 347/44 |
| 6,260,956 B1 | 7/2001 | Narang et al. | 347/63 |
| 6,273,543 B1 | 8/2001 | Narang et al. | 347/20 |
| 6,273,985 B1 | 8/2001 | DeLouise et al. | 156/273.3 |
| 6,323,301 B1 | 11/2001 | Smith et al. | 528/125 |
| 6,365,323 B1 | 4/2002 | Narang et al. | 430/280.1 |
| 6,485,130 B1 | 11/2002 | DeLouise et al. | 347/63 |

FOREIGN PATENT DOCUMENTS

| | | |
|---|---|---|
| EP | 826700 | 3/1998 |
| EP | 827026 | 3/1998 |
| EP | 827027 | 3/1998 |
| EP | 827028 | 3/1998 |

(Continued)

OTHER PUBLICATIONS

Copending U.S. Appl. No. 10/322,110, filed Dec. 17, 2002, entitled "Process for Preparing Substituted Polyarylene Ethers," by Timothy P. Bender.

(Continued)

*Primary Examiner*—Duc Truong
(74) *Attorney, Agent, or Firm*—Judith L. Byorick

(57) ABSTRACT

Disclosed is a process for preparing branched polyarylene ether polymers by (A) providing a reaction mixture comprising (i) a polyfunctional phenol compound of the formula $Ar(OH)_x$ wherein $x \geq 3$ and wherein Ar is an aryl moiety or an alkylaryl moiety, provided that when Ar is an alkylaryl moiety at least three of the —OH groups are bonded to an aryl portion thereof, (ii) one or more linear polymers of the formula

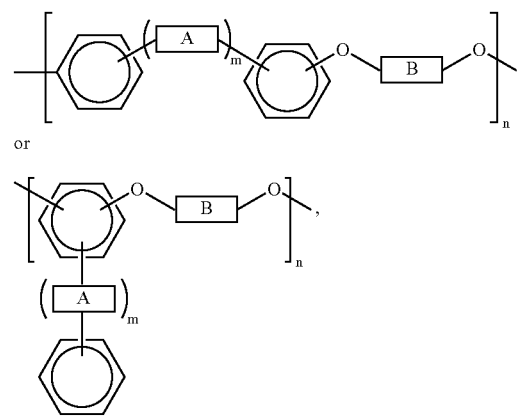

wherein m is 0 or 1, A and B are as defined herein, and n is an integer representing the number of repeat monomer units, and (iii) a carbonate base; and (B) heating the reaction mixture and removing generated water from the reaction mixture, thereby effecting a polymerization reaction.

33 Claims, No Drawings

FOREIGN PATENT DOCUMENTS

| EP | 827029 | 3/1998 |
| EP | 827030 | 3/1998 |
| EP | 827031 | 3/1998 |
| EP | 827032 | 3/1998 |
| EP | 827033 | 3/1998 |
| EP | 918257 | 5/1998 |
| EP | 918256 | 5/1999 |
| EP | 918258 | 5/1999 |

OTHER PUBLICATIONS

Copending U.S. Appl. No. 10/040,850, filed Jan. 9, 2002, entitled "Process for Preparing Polyarylene Ethers," by Timothy P. Bender.

Copending U.S. Appl. No. 10/036,469, filed Jan. 7, 2002, entitled "High Performance Curable Polmyers and Processes for the Preparation Thereof," by Ram S. Narang et al.

Copending U.S. Appl. No., filed Nov. 19, 2003, entitled "Unsaturated Ester Substituted Polymers with Reduced Halogen Content," by Christine J. DeVisser et al.

Copending Application U.S. Appl. No., filed concurrently herewith, entitled "Branched Polyarylene Ethers and Processes for the Preparation Thereof," by Timothy P. Bender.

English abstract for JP 10120743.
English abstract for JP 10090895.
English abstract for JP 10097073.
English abstract for JP 10090894.
English abstract for JP 10087817.
English abstract for JP 10090896.
English abstract for JP 10104836.
English abstract for JP 10090897.
English abstract for JP 10090899.
English abstract for JP 10090898.
English abstract for JP 11218943.
English abstract for JP 11223956.
English abstract for JP 11223955.
English abstract for JP 200119761.
English abstract for JP 2000344884.
English abstract for JP 10100410.

"Cyclodepolymerisation of bisphenol A polysulfone: evidence for self-complementarity in macrocyclic poly(ether sulfones)," Ian Baxter et al., *Chem. Commun.*, 1998, p. 2213.

"Hyperbranched Polymers 10 Years After," Y. H. Kim, *Journal of Polymer Science: Part A: Polymer Chemistry*, vol. 36, 1685-1698 (1998).

"Randomly Branched Bisphenol A Polycarbonates. I. Molecular Weight Distribution Modeling, Interfacial Synthesis, and Characterization," M. J. Marks et al., *Journal of Polymer Science: Part A: Polymer Chemistry*, vol. 38, 560-570 (2000).

"Hyperbranched poly(arylene ether phosphine oxide)s," H. S. Lee et al., *Polymer Bulletin*, 45, 319-326 (2000).

English translation of German Patent WO 03/033594 A1.

PROCESS FOR PREPARING BRANCHED POLYARYLENE ETHERS

Cross-reference is hereby made to the following copending applications:

Copending Application U.S. Ser. No. 10/322,110, filed Dec. 17, 2002, entitled "Process for Preparing Substituted Polyarylene Ethers," with the named inventor Timothy P. Bender, the disclosure of which is totally incorporated herein by reference, discloses processes for preparing polymers of the formula

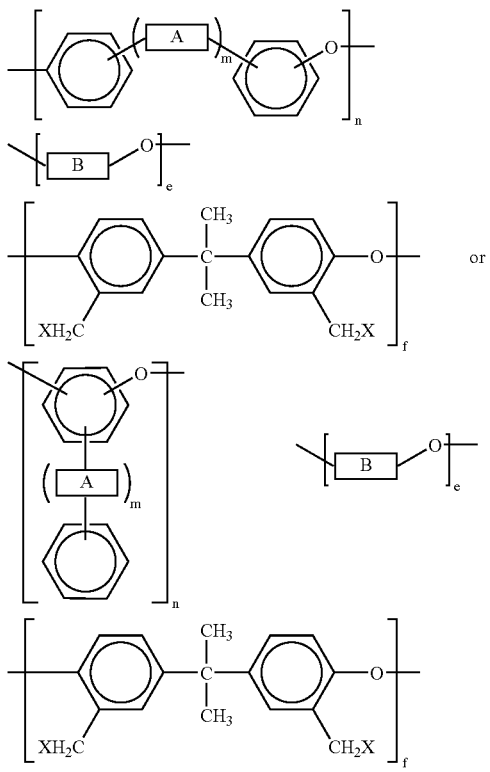

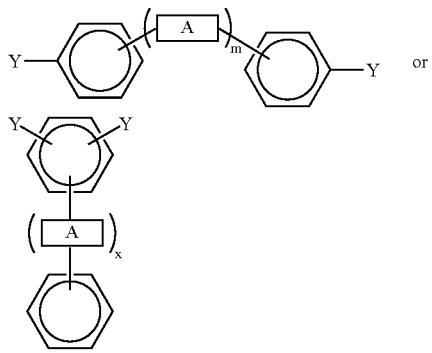

wherein m is 0 or 1, X is chlorine, bromine, or iodine, and n, e, and f are each, independently of the others, integers wherein e may be 0 and n and f are each at least 1, said process comprising providing a first reaction mixture which comprises a first solvent, a compound of the formula wherein Y is a chlorine or fluorine atom, a compound of the formula

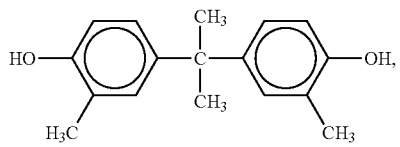

and optionally, a compound of the formula

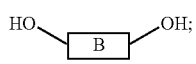

heating the first reaction mixture and removing generated water therefrom, thereby forming an intermediate polymer of the formula

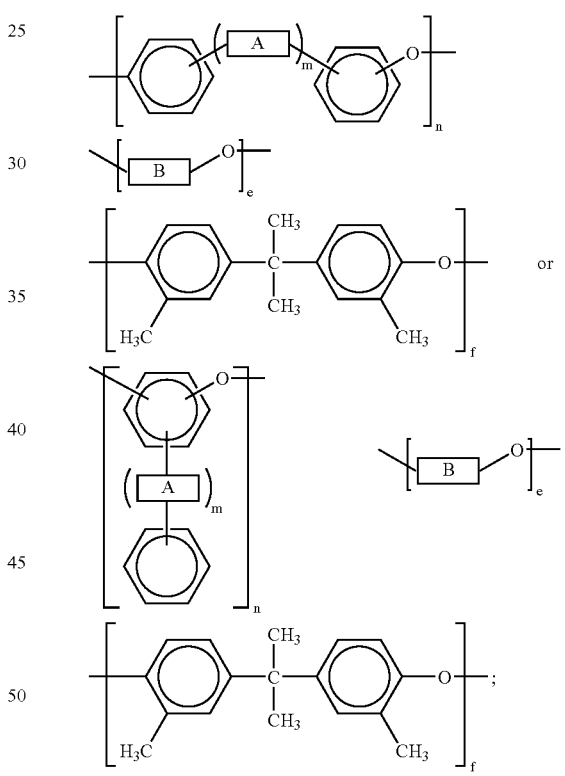

providing a second reaction mixture which comprises a second solvent, the intermediate polymer, and a N-halosuccinimide, wherein the halogen atom in the N-halosuccinimide is the same as the halogen atom that is X; and heating the second reaction mixture, thereby forming the polymer.

Copending Application U.S. Ser. No. 10/040,850, filed Jan. 9, 2002, entitled "Process for Preparing Polyarylene Ethers," with the named inventors Timothy P. Bender, Christine DeVisser, Richard A. Burt, Paul F. Smith, and Marko D. Saban, the disclosure of which is totally incorporated herein by reference, discloses a process for preparing a polymer of the formula

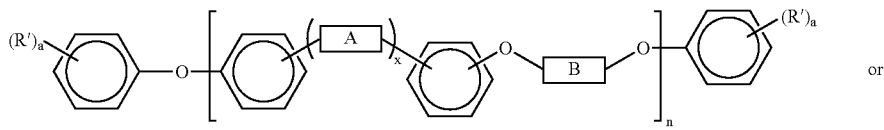

or

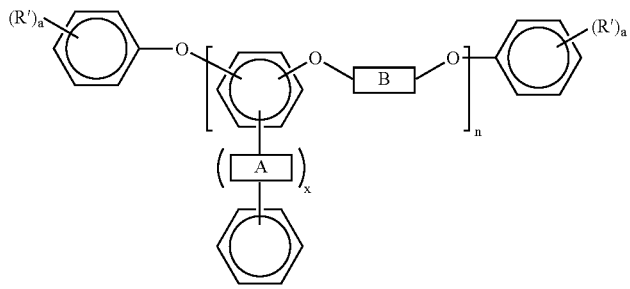

wherein x is an integer of 0 or 1, A is one of several specified groups, such as

B is one of several specified groups, such as

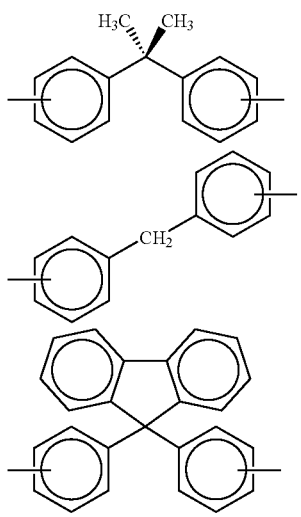

or mixtures thereof, and n is an integer representing the number of repeating monomer units, said process comprising (A) providing a reaction mixture which comprises (i) a solvent, (ii) a compound of the formula

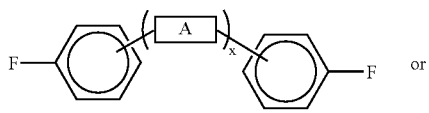

or

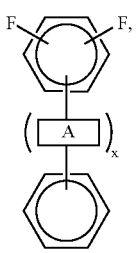

(iii) a compound of the formula

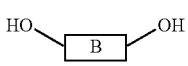

(iv) a compound of the formula

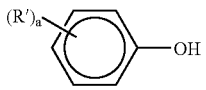

wherein a is an integer of from 1 to 5, R' is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, or a mixture thereof, and (v) a carbonate base; and (B) heating the reaction mixture and removing generated water from the reaction mixture, thereby effecting a polymerization reaction.

Copending Application U.S. Ser. No. 10/036,469, filed Jan. 7, 2002, entitled "High Performance Curable Polymers and Processes for the Preparation Thereof," with the named inventors Ram S. Narang and Timothy J. Fuller, the disclosure of which is totally incorporated herein by reference, discloses a composition which comprises a polymer containing at least some monomer repeat units with photosensitivity-imparting substituents which enable crosslinking or chain extension of the polymer upon exposure to actinic radiation, said polymer being of the formula

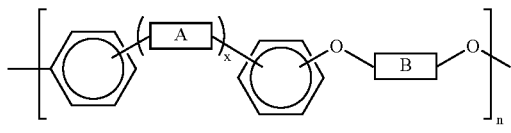

or

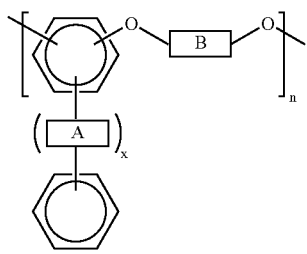

wherein x is an integer of 0 or 1, A is one of several specified groups, such as

B is one of several specified groups, such as

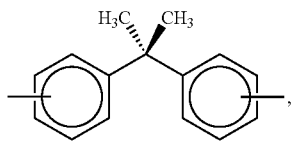

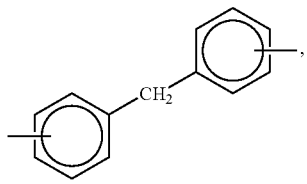

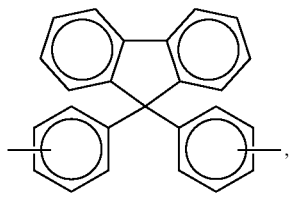

or mixtures thereof, and n is an integer representing the number of repeating monomer units, wherein said photo-sensitivity-imparting substituents are allyl ether groups, epoxy groups, or mixtures thereof. Also disclosed are a process for preparing a thermal ink jet printhead containing the aforementioned polymers and processes for preparing the aforementioned polymers.

Copending Application U.S. Ser. No. 10/717,295, filed Nov. 19, 2003, entitled "Unsaturated Ester Substituted Polymers with Reduced Halogen Content," with the named inventors Christine J. DeVisser and Timothy P. Bender, the disclosure of which is totally incorporated herein by reference, discloses polymers of The formula

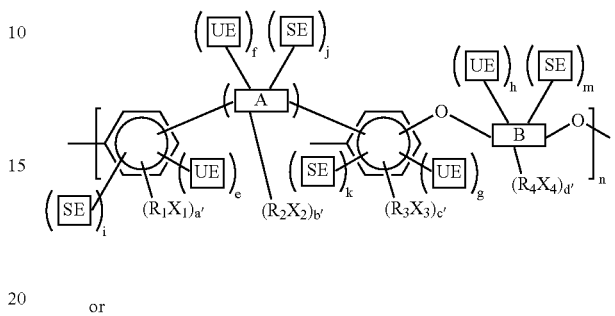

or

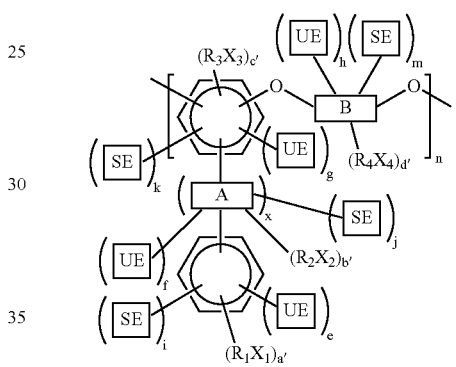

wherein x is 0 or 1, $R_{1-4}$ are alkyl, aryl, arylalkyl, or alkylaryl groups, $X_{1-4}$ are halogens, a', b', c', and d' are 0–4, UE is on unsaturated ester group, e, f, g, and h are 0–4, at least one of e, f, g, and h is $\geq 1$ in at least some monomers, SE is a saturated ester group, i, j, k, and m are 0–4 at least one of i, j, k, and m is $\geq 1$ in at least some monomers, a'+e+i$\leq$4, b'+f+j$\leq$4, c'+g+k$\leq$4, d'+h+m$\leq$4, RX represents the total number of haloalkyl groups in the polymer, the ratio of UE groups to SE groups to RX groups in the polymer is

υε:σε:ρχ wherein υε is from about 1 to about 99.99, wherein σε is from about 0.01 to about 99, wherein ρχ is from 0 to about 50, and wherein υε+σε+ρχ=100.

Copending Application U.S. Ser. No. 10/721,140, filed concurrently herewith, entitled "Branched Polyarylene Ethers and Processes for the Preparation Thereof," with the named inventor Timothy P. Bender, the disclosure of which is totally incorporated herein by reference, discloses a process for preparing branched polyarylene ether polymers by (A) providing a reaction mixture comprising (i) a polyfunctional phenol compound of the formula $Ar(OH)_x$ wherein $x \geq 3$ and wherein Ar is an aryl moiety or an alkylaryl moiety, provided that when Ar is an alkylaryl moiety at least three of the —OH groups are bonded to an aryl portion thereof, (ii) a compound of the formula

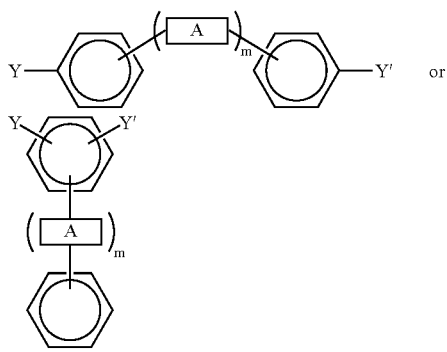

wherein m is 0 or 1, Y and Y' each, independently of the other, is fluorine or chlorine, and A is as defined therein, (iii) a compound of the formula

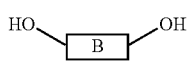

wherein B is as defined therein, and (iv) a carbonate base; and (B) heating the reaction mixture and removing generated water from the reaction mixture, thereby effecting a polymerization reaction. Also disclosed are polymers prepared by this process and imaging members containing these polymers.

BACKGROUND

Disclosed herein are branched polyarylene ether polymers and processes for preparing these polymers. More specifically, disclosed herein are methods for preparing branched polyarylene polymers by depolymerization of linear polyarylene ether polymers. One embodiment disclosed herein is directed to a process for preparing a branched polyarylene ether polymer which comprises (A) providing a reaction mixture which comprises (i) an optional solvent, (ii) a polyfunctional phenol compound of the formula $Ar(OH)_x$ wherein $x \geq 3$ and wherein Ar is an aryl moiety or an alkylaryl moiety, provided that when Ar is an alkylaryl moiety at least three of the —OH groups are bonded to an aryl portion thereof, (iii) one or more linear polymers of the formula

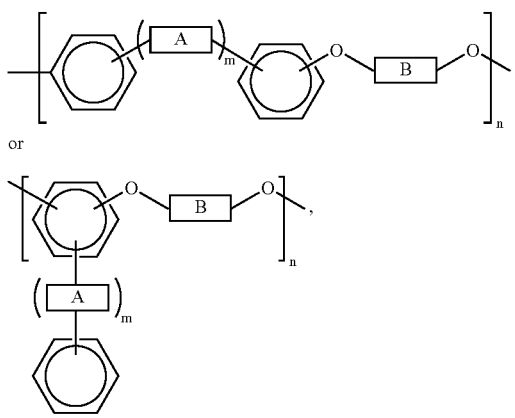

wherein each m, independently of the others, is an integer of 0 or 1, each A, independently of the others, is

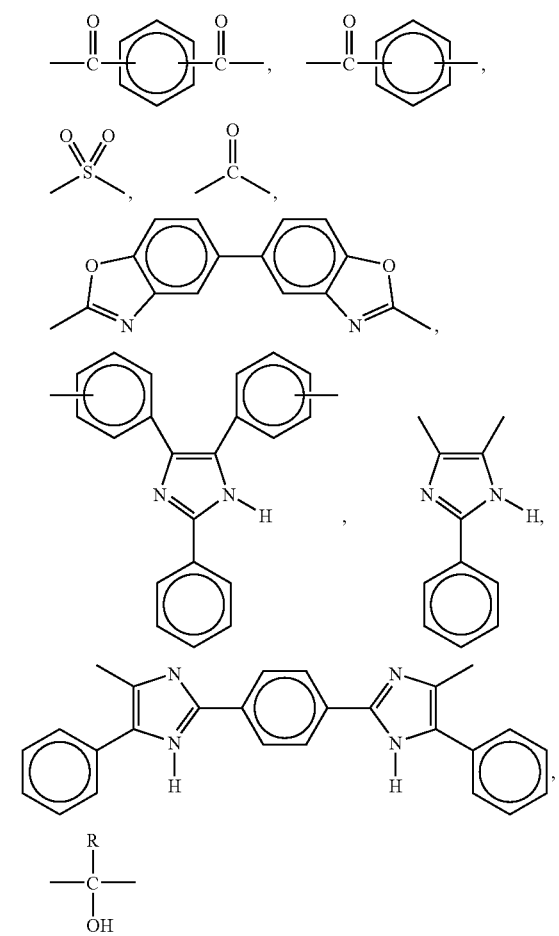

wherein R is a hydrogen atom, an alkyl group, an aryl group, an arylalkyl group, an alkylaryl group, or mixtures thereof,

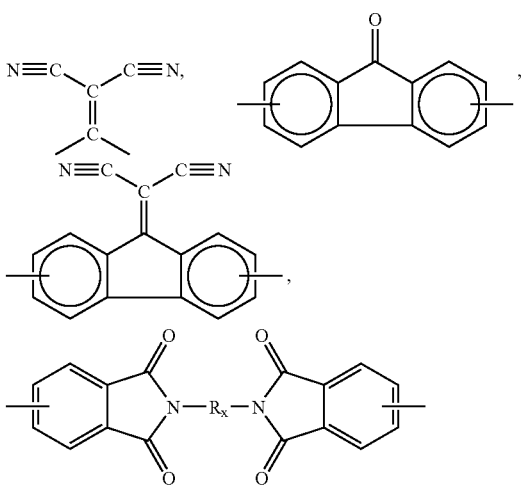

wherein $R_x$ is an alkylene group, an arylene group, an arylalkylene group, an alkylarylene group, or mixtures thereof,

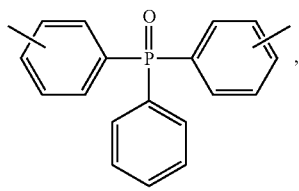 , 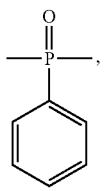 ,
or mixtures thereof, each B, independently of the others, is
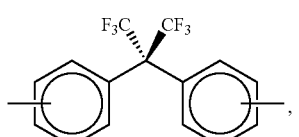 ,
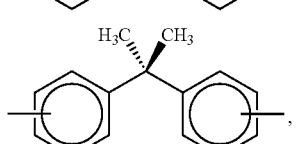 ,
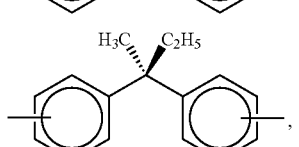 ,
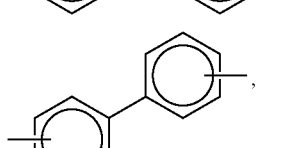 ,
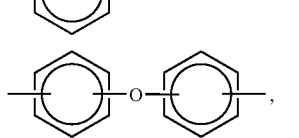 ,
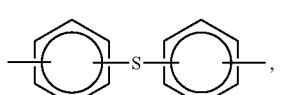 ,
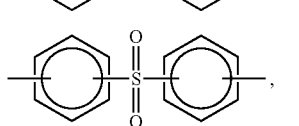 ,
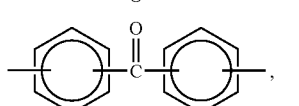 , 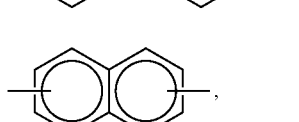 ,
 ,
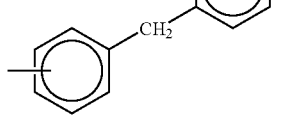 ,
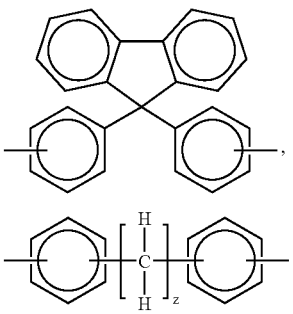 ,
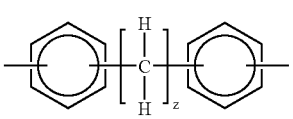
wherein z is an integer of from 2 to about 20,
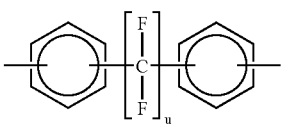
wherein u is an integer of from 1 to about 20,
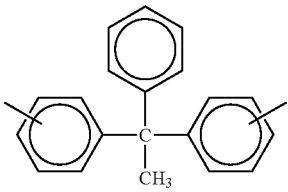 ,
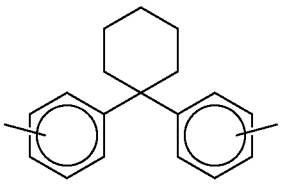 ,
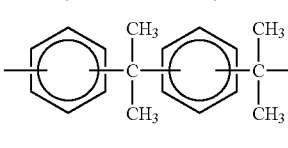 ,
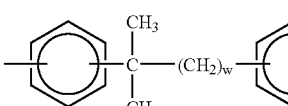 ,
wherein w is an integer of from 1 to about 20,
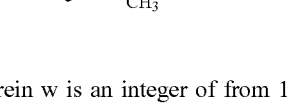 , -continued

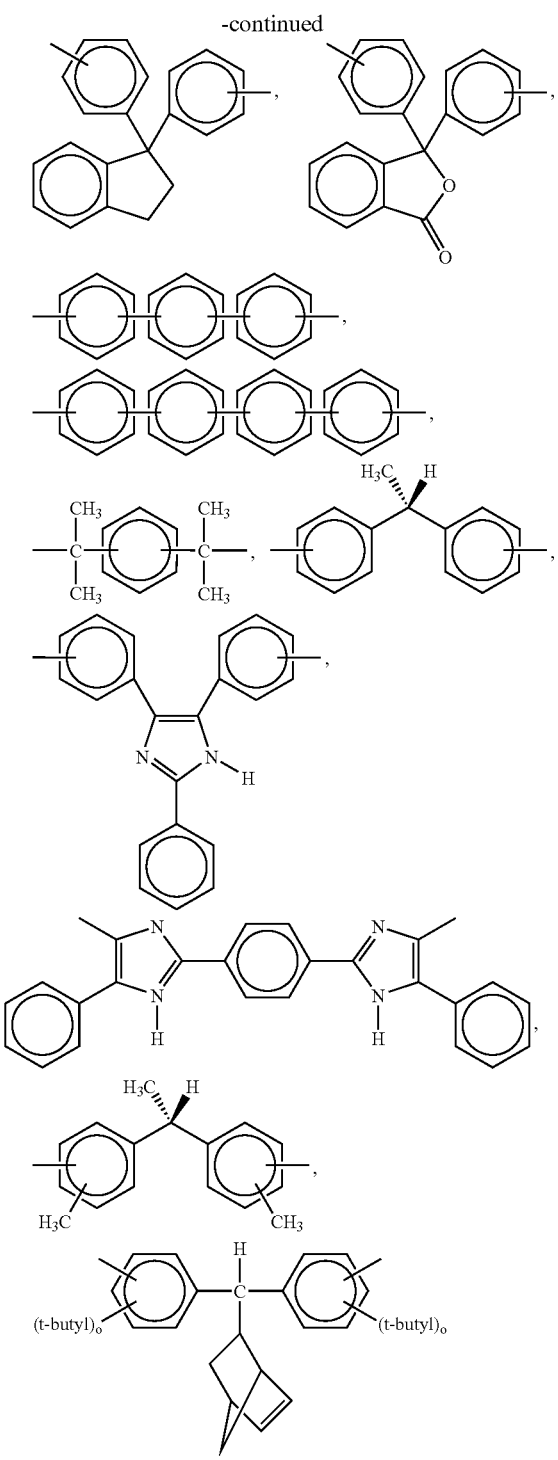

wherein each o, independently of the other, is an integer of 1, 2, 3, or 4,

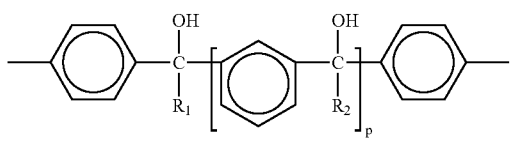

wherein $R_1$ and $R_2$ each, independently of the other, are hydrogen atoms, alkyl groups, aryl groups, arylalkyl groups, alkylaryl groups, or mixtures thereof, and p is an integer of 0 or 1,

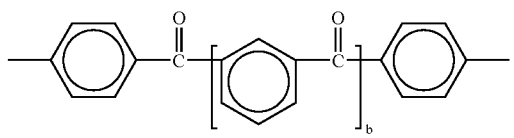

wherein b is an integer of 0 or 1,

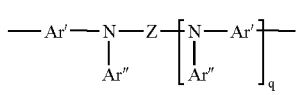

wherein (1) Z is

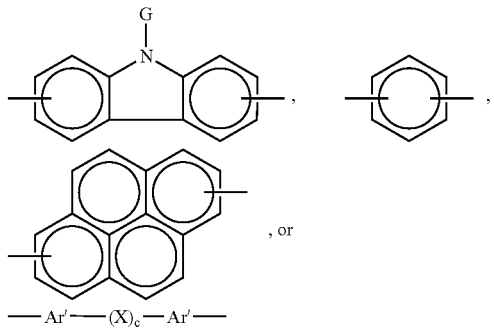

wherein c is 0 or 1; (2) Ar' is

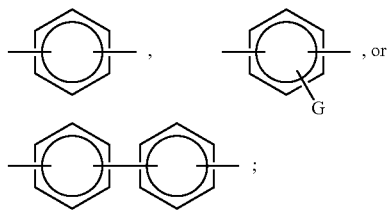

(3) G is an alkyl group selected from alkyl groups containing from about 2 to about 10 carbon atoms; (4) Ar″ is

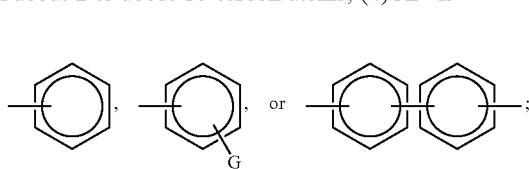

(5) X is

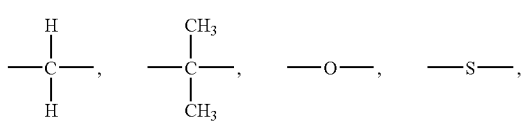

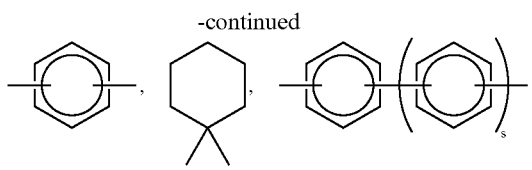

wherein s is 0, 1, or 2,

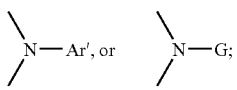

and (6) q is 0 or 1; or mixtures thereof, and n is an integer representing the number of repeat monomer units, (iv) optionally, a compound of the formula

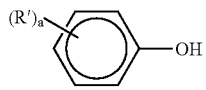

wherein a is an integer of from 1 to 5 and R' is a hydrogen atom, an alkyl group, an aryl group, an arylalkyl group, an alkylaryl group, or a mixture thereof, wherein two or more R' groups can be joined together to form a ring, and (v) a carbonate base; and (B) heating the reaction mixture and removing generated water from the reaction mixture, thereby effecting a polymerization reaction.

In microelectronics applications, there is a great need for low dielectric constant, high glass transition temperature, thermally stable, photopatternable polymers for use as interlayer dielectric layers and as passivation layers which protect microelectronic circuitry. Poly(imides) are widely used to satisfy these needs; these materials, however, have disadvantageous characteristics such as relatively high water sorption and hydrolytic instability. There is thus a need for high performance polymers which can be effectively photopatterned and developed at high resolution.

Polyarylene ethers are known polymers for use as high performance engineering thermoplastics. They exhibit outstanding physical properties and high chemical resistance. The use of these materials as photoresists when substituted with photoactive substituents is also known. These materials are suitable for use in applications such as thermal ink jet printheads, other microelectronics applications, printed circuit boards, lithographic printing processes, interlayer dielectrics, and the like.

The formation and development of images on the surface of photoconductive materials by electrostatic means is well known. The basic electrophotographic imaging process, as taught by C. F. Carlson in U.S. Pat. No. 2,297,691, entails placing a uniform electrostatic charge on a photoconductive imaging member, exposing the imaging member to a light and shadow image to dissipate the charge on the areas of the imaging member exposed to the light, and developing the resulting electrostatic latent image by depositing on the image a finely divided electroscopic material known as toner. In charge area development (CAD) systems, the toner will normally be attracted to those areas of the imaging member which retain a charge, thereby forming a toner image corresponding to the electrostatic latent image. In discharge area development (DAD) systems, the toner will normally be attracted to those areas of the imaging member which have less or no charge as a result of exposure to light, thereby forming a toner image corresponding to the electrostatic latent image. This developed image may then be transferred to a substrate such as paper. The transferred image may subsequently be permanently affixed to the substrate by heat, pressure, a combination of heat and pressure, or other suitable fixing means such as solvent or overcoating treatment.

Imaging members for electrophotographic imaging systems comprising selenium alloys vacuum deposited on substrates are known. Imaging members have also been prepared by coating substrates with photoconductive particles dispersed in an organic film forming binder. Coating of rigid drum substrates has been effected by various techniques such as spraying, dip coating, vacuum evaporation, and the like. Flexible imaging members can also be manufactured by processes that entail coating a flexible substrate with the desired photoconducting material.

Some photoresponsive imaging members consist of a homogeneous layer of a single material such as vitreous selenium, and others comprise composite layered devices containing a dispersion of a photoconductive composition. An example of a composite xerographic photoconductive member is described in U.S. Pat. No. 3,121,006, which discloses finely divided particles of a photoconductive inorganic compound dispersed in an electrically insulating organic resin binder. Imaging members prepared according to the teachings of this patent contain a binder layer with particles of zinc oxide uniformly dispersed therein coated on a paper backing. The binders disclosed in this patent include materials such as polycarbonate resins, polyester resins, polyamide resins, and the like.

Photoreceptor materials comprising inorganic or organic materials wherein the charge generating and charge transport functions are performed by discrete contiguous layers are also known. Additionally, layered photoreceptor members are disclosed in the prior art, including photoreceptors having an overcoat layer of an electrically insulating polymeric material. Other layered photoresponsive devices have been disclosed, including those comprising separate photogenerating layers and charge transport layers as described in U.S. Pat. No. 4,265,990, the disclosure of which is totally incorporated herein by reference. Photoresponsive materials containing a hole injecting layer overcoated with a hole transport layer, followed by an overcoating of a photogenerating layer, and a top coating of an insulating organic resin, are disclosed in U.S. Pat. No. 4,251,612, the disclosure of which is totally incorporated herein by reference. Examples of photogenerating layers disclosed in these patents include trigonal selenium and phthalocyanines, while examples of transport layers include certain aryl diamines as illustrated therein.

In addition, U.S. Pat. No. 3,041,167 discloses an overcoated imaging member containing a conductive substrate, a photoconductive layer, and an overcoating layer of an electrically insulating polymeric material. This member can be employed in electrophotographic imaging processes by initially charging the member with an electrostatic charge of a first polarity, followed by exposing it to form an electrostatic latent image that can subsequently be developed to form a visible image.

U.S. Pat. No. 5,994,425 (Narang et al.), U.S. Pat. No. 6,022,095 (Narang et al.), EP 827027, and JP 10120743, the disclosures of each of which are totally incorporated herein by reference, disclose an improved composition comprising a photopatternable polymer containing at least some monomer repeat units with photosensitivity-imparting substituents, said photopatternable polymer being of the general formula

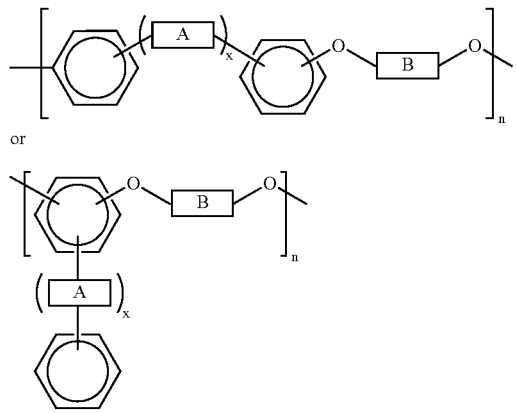

or

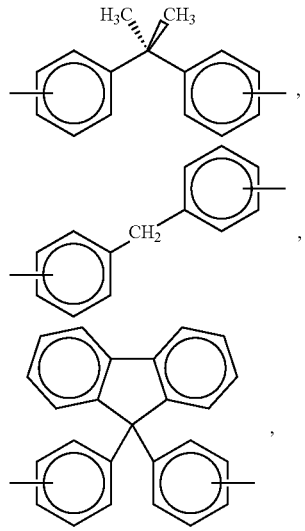

wherein x is an integer of 0 or 1, A is one of several specified groups, such as

B is one of several specified groups, such as or mixtures thereof, and n is an integer representing the number of repeating monomer units. Also disclosed is a process for preparing a thermal ink jet printhead with the aforementioned polymer and a thermal ink jet printhead containing therein a layer of a crosslinked or chain extended polymer of the above formula.

U.S. Pat. No. 5,849,809 (Narang et al.), U.S. Pat. No. 6,203,143 (Narang et al.), EP 827028, and JP 10090895, the disclosures of each of which are totally incorporated herein by reference, disclose a composition which comprises (a) a polymer containing at least some monomer repeat units with photosensitivity-imparting substituents which enable crosslinking or chain extension of the polymer upon exposure to actinic radiation, said polymer being of the formula

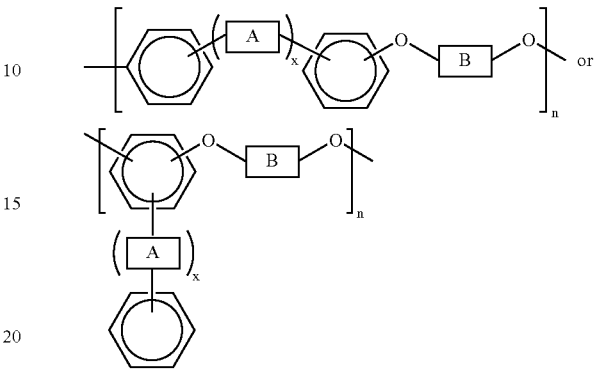

wherein x is an integer of 0 or 1, A is one of several specified groups, such as

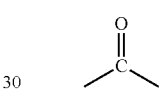

B is one of several specified groups, such as

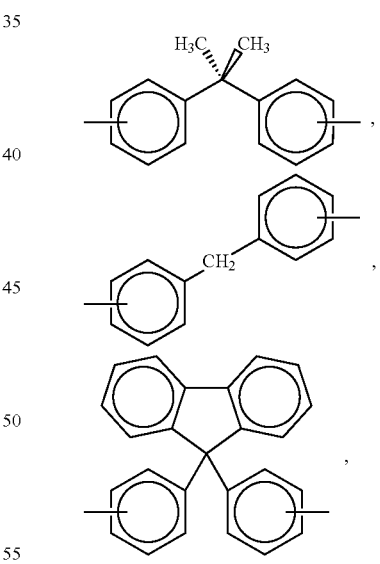

or mixtures thereof, and n is an integer representing the number of repeating monomer units, wherein said photosensitivity-imparting substituents are hydroxyalkyl groups; (b) at least one member selected from the group consisting of photoinitiators and sensitizers; and (c) an optional solvent. Also disclosed are processes for preparing the above polymers and methods of preparing thermal ink jet printheads containing the above polymers.

U.S. Pat. No. 6,124,372 (Smith et al.), U.S. Pat. No. 6,151,042 (Smith et al.), U.S. Pat. No. 6,323,301 (Smith et al.), EP 827029, and JP 10097073, the disclosures of each of which are totally incorporated herein by reference, disclose a composition comprising a polymer with a weight average molecular weight of from about 1,000 to about 100,000, said polymer containing at least some monomer repeat units with a first, photosensitivity-imparting substituent which enables crosslinking or chain extension of the polymer upon exposure to actinic radiation, said polymer also containing a second, thermal sensitivity-imparting substituent which enables further crosslinking or chain extension of the polymer upon exposure to temperatures of about 140° C. and higher, wherein the first substituent is not the same as the second substituent, said polymer being selected from the group consisting of polysulfones, polyphenylenes, polyether sulfones, polyimides, polyamide imides, polyarylene ethers, polyphenylene sulfides, polyarylene ether ketones, phenoxy resins, polycarbonates, polyether imides, polyquinoxalines, polyquinolines, polybenzimidazoles, polybenzoxazoles, polybenzothiazoles, polyoxadiazoles, copolymers thereof, and mixtures thereof.

U.S. Pat. No. 5,889,077 (Fuller et al.), U.S. Pat. No. 6,087,414 (Fuller et al.), EP 827030, and JP 10090894, the disclosures of each of which are totally incorporated herein by reference, disclose a process which comprises reacting a polymer of the general formula

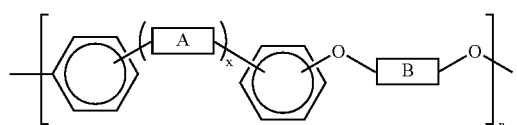

or

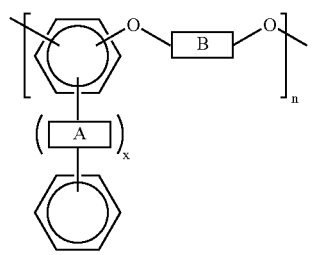

wherein x is an integer of 0 or 1, A is one of several specified groups, such as

B is one of several specified groups, such as

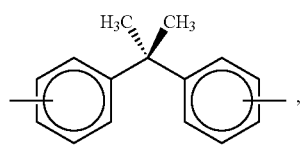

-continued

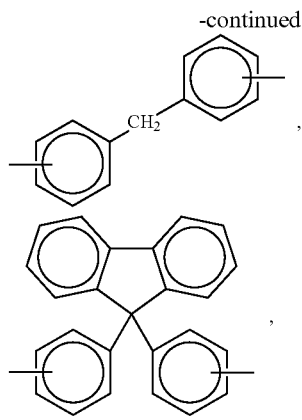

or mixtures thereof, and n is an integer representing the number of repeating monomer units, with (i) a formaldehyde source, and (ii) an unsaturated acid in the presence of an acid catalyst, thereby forming a curable polymer with unsaturated ester groups. Also disclosed is a process for preparing an ink jet printhead with the above polymer.

U.S. Pat. No. 5,739,254 (Fuller et al.), U.S. Pat. No. 5,753,783 (Fuller et al.), EP 826700, and JP 10087817, the disclosures of each of which are totally incorporated herein by reference, disclose a process which comprises reacting a polymer of the general formula

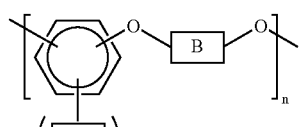

wherein x is an integer of 0 or 1, A is one of several specified groups, such as

B is one of several specified groups, such as

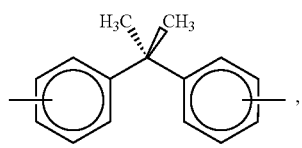

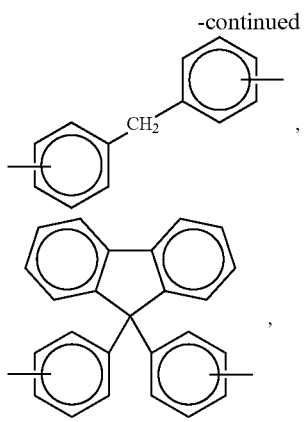

or mixtures thereof, and n is an integer representing the number of repeating monomer units, with an acetyl halide and dimethoxymethane in the presence of a halogen-containing Lewis acid catalyst and methanol, thereby forming a haloalkylated polymer. In a specific embodiment, the haloalkylated polymer is then reacted further to replace at least some of the haloalkyl groups with photosensitivity-imparting groups. Also disclosed is a process for preparing a thermal ink jet printhead with the aforementioned polymer.

U.S. Pat. No. 5,761,809 (Fuller et al.), EP 827026, and JP 10090896, the disclosures of each of which are totally incorporated herein by reference, disclose a process which comprises reacting a haloalkylated aromatic polymer with a material selected from the group consisting of unsaturated ester salts, alkoxide salts, alkylcarboxylate salts, and mixtures thereof, thereby forming a curable polymer having functional groups corresponding to the selected salt. Another embodiment is directed to a process for preparing an ink jet printhead with the curable polymer thus prepared.

U.S. Pat. No. 5,958,995 (Narang et al.), U.S. Pat. No. 6,184,263 (Narang et al.), EP 827031, and JP 10104836, the disclosures of each of which are totally incorporated herein by reference, disclose a composition which comprises a mixture of (A) a first component comprising a polymer, at least some of the monomer repeat units of which have at least one photosensitivity-imparting group thereon, said polymer having a first degree of photosensitivity-imparting group substitution measured in milliequivalents of photosensitivity-imparting group per gram and being of the general formula

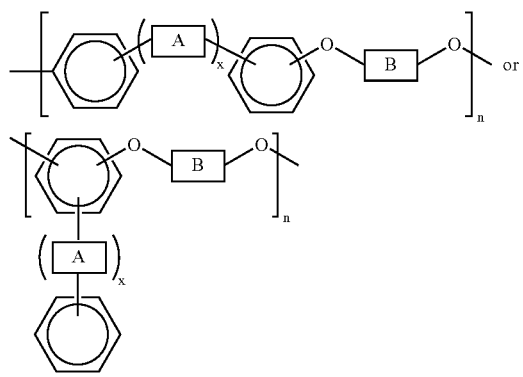

wherein x is an integer of 0 or 1, A is one of several specified groups, such as

B is one of several specified groups, such as

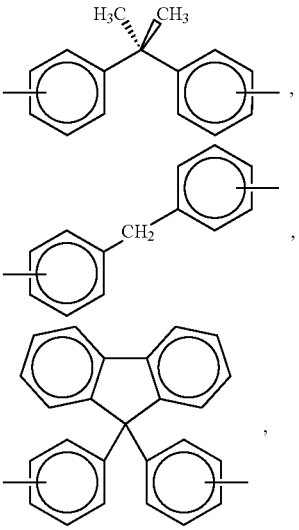

or mixtures thereof, and n is an integer representing the number of repeating monomer units, and (B) a second component which comprises either (1) a polymer having a second degree of photosensitivity-imparting group substitution measured in milliequivalents of photosensitivity-imparting group per gram lower than the first degree of photosensitivity-imparting group substitution, wherein said second degree of photosensitivity-imparting group substitution may be zero, wherein the mixture of the first component and the second component has a third degree of photosensitivity-imparting group substitution measured in milliequivalents of photosensitivity-imparting group per gram which is lower than the first degree of photosensitivity-imparting group substitution and higher than the second degree of photosensitivity-imparting group substitution, or (2) a reactive diluent having at least one photosensitivity-imparting group per molecule and having a fourth degree of photosensitivity-imparting group substitution measured in milliequivalents of photosensitivity-imparting group per gram, wherein the mixture of the first component and the second component has a fifth degree of photosensitivity-imparting group substitution measured in milliequivalents of photosensitivity-imparting group per gram which is higher than the first degree of photosensitivity-imparting group substitution and lower than the fourth degree of photosensitivity-imparting group substitution; wherein the weight average molecular weight of the mixture is from about 10,000 to about 50,000; and wherein the third or fifth degree of photosensitivity-imparting group substitution is from about 0.25 to about 2 milliequivalents of photosensitivity-imparting groups per gram of mixture. Also disclosed is a process for preparing a thermal ink jet printhead with the aforementioned composition.

U.S. Pat. No. 5,945,253 (Narang et al.), U.S. Pat. No. 6,365,323 (Narang et al.), EP 827033, and JP 10090897, the disclosures of each of which are totally incorporated herein by reference, disclose a composition which comprises a polymer containing at least some monomer repeat units with photosensitivity-imparting substituents which enable crosslinking or chain extension of the polymer upon exposure to actinic radiation, said polymer being of the formula

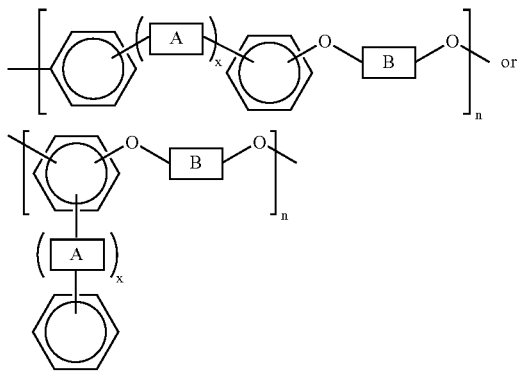

wherein x is an integer of 0 or 1, A is one of several specified groups, such as

B is one of several specified groups, such as

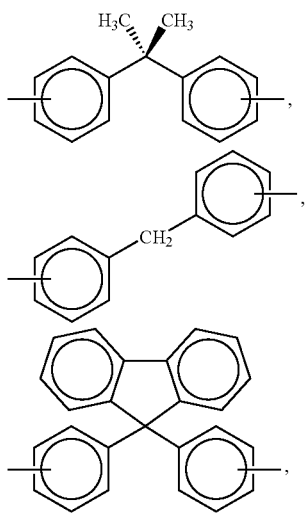

or mixtures thereof, and n is an integer representing the number of repeating monomer units, wherein said photosensitivity-imparting substituents are allyl ether groups, epoxy groups, or mixtures thereof. Also disclosed are a process for preparing a thermal ink jet printhead containing the aforementioned polymers and processes for preparing the aforementioned polymers.

U.S. Pat. No. 5,863,963 (Narang et al.), U.S. Pat. No. 6,090,453 (Narang et al.), and JP 10090899, the disclosures of each of which are totally incorporated herein by reference, disclose a process which comprises the steps of (a) providing a polymer containing at least some monomer repeat units with halomethyl group substituents which enable crosslinking or chain extension of the polymer upon exposure to a radiation source which is electron beam radiation, x-ray radiation, or deep ultraviolet radiation, said polymer being of the formula

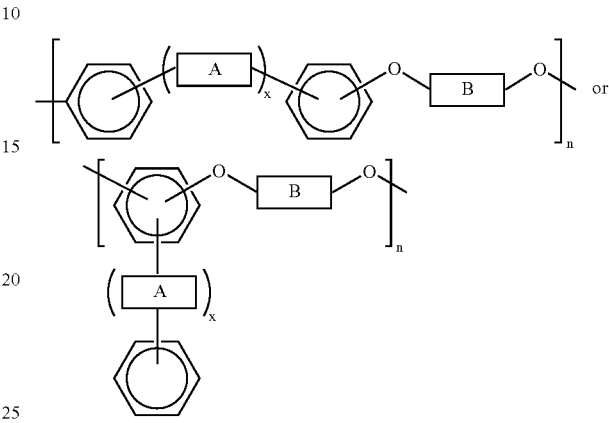

wherein x is an integer of 0 or 1, A is one of several specified groups, such as

B is one of several specified groups, such as

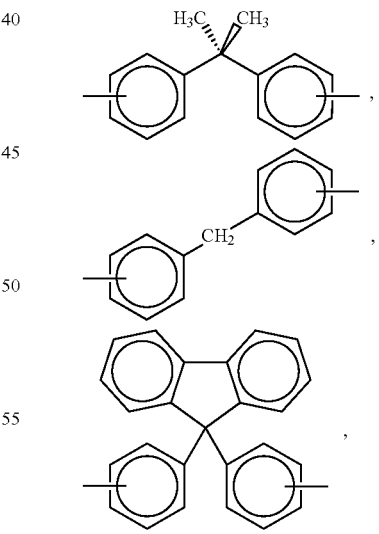

or mixtures thereof, and n is an integer representing the number of repeating monomer units, and (b) causing the polymer to become crosslinked or chain extended through the photosensitivity-imparting groups. Also disclosed is a process for preparing a thermal ink jet printhead by the aforementioned curing process.

U.S. Pat. No. 6,007,877 (Narang et al.), U.S. Pat. No. 6,273,543 (Narang et al.), EP 827032, and JP 10090898, the disclosures of each of which are totally incorporated herein by reference, disclose a composition which comprises a polymer containing at least some monomer repeat units with water-solubility- or water-dispersability-imparting substituents and at least some monomer repeat units with photosensitivity-imparting substituents which enable crosslinking or chain extension of the polymer upon exposure to actinic radiation, said polymer being of the formula

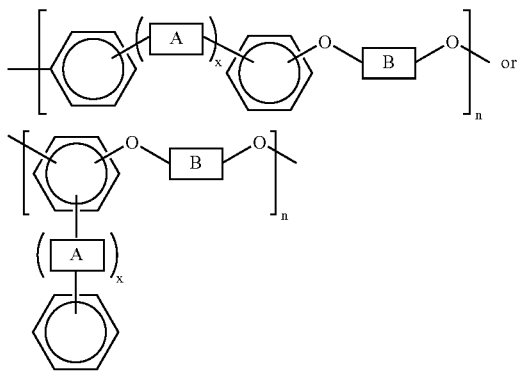

wherein x is an integer of 0 or 1, A is one of several specified groups, such as

B is one of several specified groups, such as

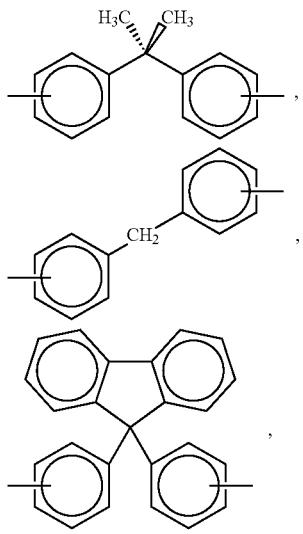

or mixtures thereof, and n is an integer representing the number of repeating monomer units. In one embodiment, a single functional group imparts both photosensitivity and water solubility or dispersability to the polymer. In another embodiment, a first functional group imparts photosensitivity to the polymer and a second functional group imparts water solubility or dispersability to the polymer. Also disclosed is a process for preparing a thermal ink jet printhead with the aforementioned polymers.

U.S. Pat. No. 5,814,426 (Fuller et al.), EP 918257, and JP 11218943, the disclosures of each of which are totally incorporated herein by reference, disclose an imaging member which comprises a conductive substrate, a photogenerating material, and a binder which comprises a polymer of the formulae I, II, III, IV, V, VI, VII, VIII, IX, or X as further defined therein.

U.S. Pat. No. 5,882,814 (Fuller et al.), EP 918256, and JP 11223956, the disclosures of each of which are totally incorporated herein by reference, disclose an imaging member which comprises a conductive substrate, a photogenerating layer, and a charge transport layer comprising a polymer of the formulae I, II, III, IV, V, VI, VII, VIII, IX, or X as further defined therein.

U.S. Pat. No. 5,874,192 (Fuller et al.), EP 918258, and JP 11223955, the disclosures of each of which are totally incorporated herein by reference, disclose an imaging member which comprises a conductive substrate, a photogenerating material, a charge transport material, and a polymeric binder comprising (a) a first polymer comprising a polycarbonate, and (b) a second polymer of the formulae I, II, III, IV, V, VI, VII, VIII, IX, or X as further defined therein.

U.S. Pat. No. 6,273,985 (DeLouise et al.), the disclosure of which is totally incorporated herein by reference, discloses a process for bonding a first article to a second article which comprises (a) providing a first article comprising a polymer having photosensitivity-imparting substituents; (b) providing a second article comprising metal, plasma nitride, silicon, or glass; (c) applying to at least one of the first article and the second article an adhesion promoter selected from silanes, titanates, or zirconates having (i) alkoxy, aryloxy, or arylalkyloxy functional groups and (ii) functional groups including at least one photosensitive aliphatic >C═C< linkage; (d) placing the first article in contact with the second article; and (e) exposing the first article, second article, and adhesion promoter to radiation, thereby bonding the first article to the second article with the adhesion promoters. In one embodiment, the adhesion promoter is employed in microelectrical mechanical systems such as thermal ink jet printheads.

U.S. Pat. No. 6,260,956 (Narang et al.), the disclosure of which is totally incorporated herein by reference, discloses an ink jet printhead which comprises (i) an upper substrate with a set of parallel grooves for subsequent use as ink channels and a recess for subsequent use as a manifold, the grooves being open at one end for serving as droplet emitting nozzles, and (ii) a lower substrate in which one surface thereof has an array of heating elements and addressing electrodes formed thereon, said lower substrate having an insulative layer deposited on the surface thereof and over the heating elements and addressing electrodes and patterned to form recesses therethrough to expose the heating elements and terminal ends of the addressing electrodes, the upper and lower substrates being aligned, mated, and bonded together to form the printhead with the grooves in the upper substrate being aligned with the heating elements in the lower substrate to form droplet emitting nozzles, said upper substrate comprising a material formed by crosslinking or chain extending a polymer of formula I or II.

U.S. Pat. No. 6,117,967 (Fuller et al.) and JP 200119761, the disclosures of each of which are totally incorporated herein by reference, discloses a polymer of the formula

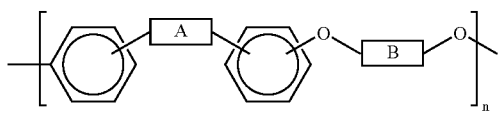

wherein A is

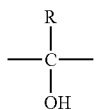

or a mixture of

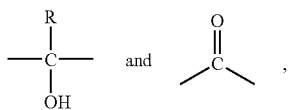

wherein R is a hydrogen atom, an alkyl group, an aryl group, or mixtures thereof, B is one of specified groups, such as

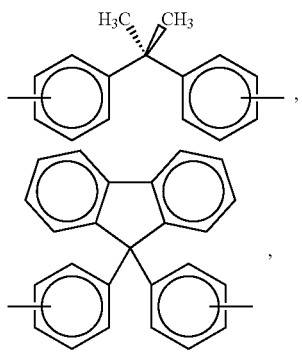

or mixtures thereof, and n is an integer representing the number of repeating monomer units.

U.S. Pat. No. 6,177,238 (Fuller et al.), the disclosure of which is totally incorporated herein by reference, discloses an ink jet printhead containing a polymer of the formula

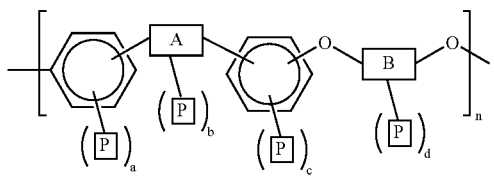

wherein P is a substituent which enables crosslinking of the polymer, a, b, c, and d are each integers of 0, 1, 2, 3, or 4, provided that at least one of a, b, c, and d is equal to or greater than 1 in at least some of the monomer repeat units of the polymer, A is

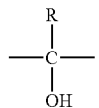

or a mixture of

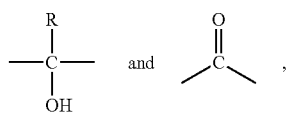

wherein R is a hydrogen atom, an alkyl group, an aryl group, or mixtures thereof, B is one of specified groups, such as

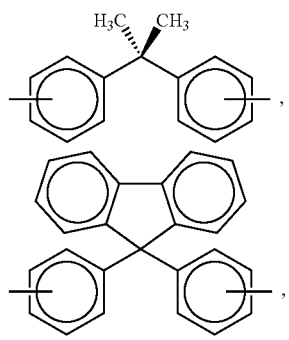

or mixtures thereof, and n is an integer representing the number of repeating monomer units.

U.S. Pat. No. 6,174,636 (Fuller et al.), the disclosure of which is totally incorporated herein by reference, discloses an imaging member which comprises a conductive substrate, a photogenerating material, and a binder comprising a polymer of the formula

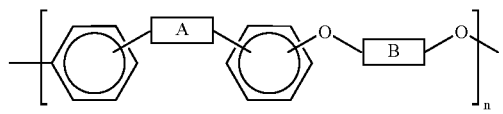

wherein A is

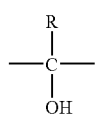

or a mixture of

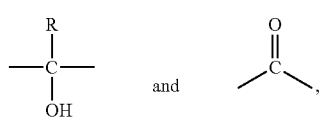

wherein R is a hydrogen atom, an alkyl group, an aryl group, or mixtures thereof, B is one of specified groups, such as

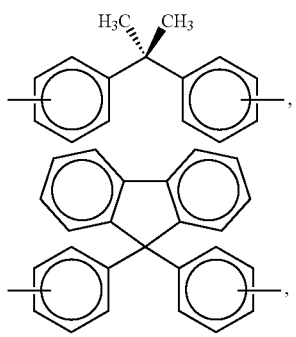

or mixtures thereof, and n is an integer representing the number of repeating monomer units.

U.S. Pat. No. 6,187,512 (Foucher et al.) and JP 2000344884, the disclosures of each of which are totally incorporated herein by reference, disclose a process which comprises reacting a polymer of the general formula

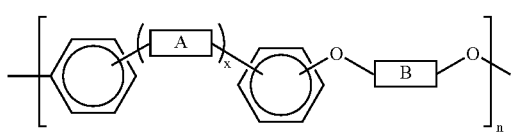

or

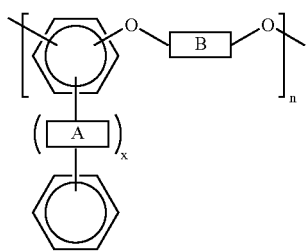

wherein x is an integer of 0 or 1, A is one of several specified groups, such as

B is one of several specified groups, such as

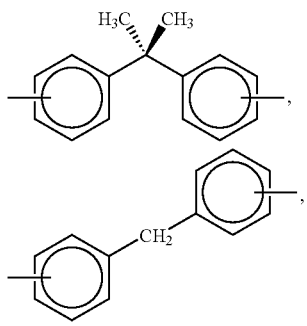

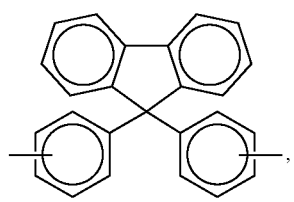

or mixtures thereof, and n is an integer representing the number of repeating monomer units, with a halomethyl alkyl ether, an acetyl halide, and methanol in the presence of a halogen-containing Lewis acid catalyst, thereby forming a halomethylated polymer.

U.S. Pat. No. 6,020,119 (Foucher et al.), the disclosure of which is totally incorporated herein by reference, discloses a process which comprises reacting a polymer of the general formula

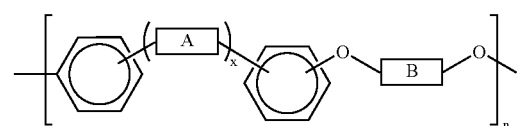

or

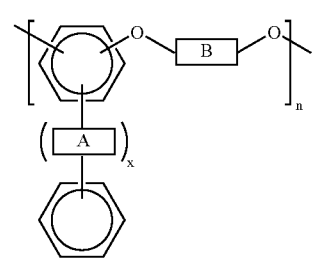

wherein x is an integer of 0 or 1, A is one of several specified groups, such as

B is one of several specified groups, such as

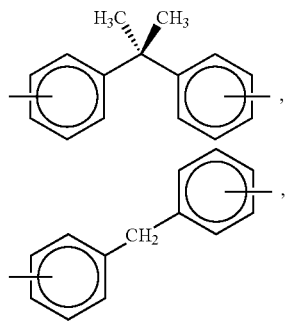

-continued

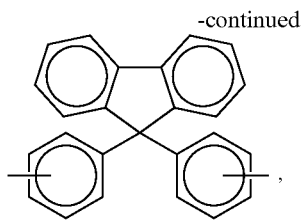

or mixtures thereof, and n is an integer representing the number of repeating monomer units, with a halomethylethyl ether, a hydrohalic acid, and acetic acid in the presence of a halogen-containing Lewis acid catalyst, thereby forming a halomethylated polymer.

U.S. Pat. No. 6,139,920 (Smith et al.) and U.S. Pat. No. 6,260,949 (Smith et al.), the disclosures of each of which are totally incorporated herein by reference, disclose a composition comprising a blend of (a) a thermally reactive polymer selected from the group consisting of resoles, novolacs, thermally reactive polyarylene ethers, and mixtures thereof; and (b) a photoreactive epoxy resin that is photoreactive in the absence of a photocationic initiator.

U.S. Pat. No. 5,773,553 (Fuller et al.) and U.S. Pat. No. 5,869,595 (Fuller et al.), the disclosures of each of which are totally incorporated herein by reference, disclose a process which comprises reacting a polyimide precursor with borane. Also disclosed is a thermal ink jet printhead containing a layer comprising the product of this reaction.

U.S. Pat. No. 5,939,206 (Kneezel et al.) and JP 10100410, the disclosures of each of which are totally incorporated herein by reference, disclose an apparatus which comprises at least one semiconductor chip mounted on a substrate, said substrate comprising a porous, electrically conductive member having electrophoretically deposited thereon a coating of a polymeric material. In one embodiment, the semiconductor chips are thermal ink jet printhead subunits.

U.S. Pat. No. 6,485,130 (DeLouise et al.), the disclosure of which is totally incorporated herein by reference, discloses a process for bonding a first article to a second article which comprises (a) providing a first article comprising a polymer having photosensitivity-imparting substituents; (b) providing a second article comprising metal, plasma nitride, silicon, or glass; (c) applying to at least one of the first article and the second article an adhesion promoter selected from silanes, titanates, or zirconates having (i) alkoxy, aryloxy, or arylalkyloxy functional groups and (ii) functional groups including at least one photosensitive aliphatic >C=C< linkage; (d) placing the first article in contact with the second article; and (e) exposing the first article, second article, and adhesion promoter to radiation, thereby bonding the first article to the second article with the adhesion promoter. In one embodiment, the adhesion promoter is employed in microelectrical mechanical systems such as thermal ink jet printheads.

"Cyclodepolymerisation of bisphenol A polysulfone: evidence for self-complementarity in macrocyclic poly(ether sulfones)," Ian Baxter et al., Chem. Commun., 1998, page 2213, the disclosure of which is totally incorporated herein by reference, discloses bisphenol A polysulfone undergoing fluoride-promoted cyclodepolymerisation; high molar mass polymer was thus transformed into a series of macrocyclic oligomers containing up to at least 72 aromatic rings; those containing up to 24 rings were isolated as pure compounds, and single-crystal X-ray studies of the cyclotrimer and cyclotetramer revealed shape-complementary pairs and chains of macrocyles, respectively.

"Hyperbranched Polymers 10 Years After," Y. H. Kim, Journal of Polymer Science: Part A: Polymer Chemistry, Vol. 36, 1685–1698 (1998), the disclosure of which is totally incorporated herein by reference, discloses that hyperbranched polymers, as well as dendrimers, may find utilities in the areas where the structural uniqueness of these polymers gives merit. There has been much progress in the structural understanding and the methods of synthesis of these polymers. However, functional understanding and utility of these polymers are still in infancy. Better understanding on physical properties of these polymers, such as solubility and miscibility of these polymers in solvents or with polymers, and functional group dependency to the thermal relaxation process are needed for further development of the subject.

"Randomly Branched Bisphenol A Polycarbonates. I. Molecular Weight Distribution Modeling, Interfacial Synthesis, and Characterization," M. J. Marks et al., Journal of Polymer Science: Part A: Polymer Chemistry, Vol. 38, 560–570 (2000), the disclosure of which is totally incorporated herein by reference, discloses that randomly branched bisphenol A polycarbonates (PCs) were prepared by interfacial polymerization methods to explore the limits of gel-free compositions available by the adjustment of various composition and process variables. A molecular weight distribution (MWD) model was devised to predict the MWD, G, and weight-average molecular weight per arm ($M_w$/arm) values based on the composition variables. The amounts of the monomer, branching agent, and chain terminator were adjusted such that the weight-average functionality of the phenolic monomers (FOH) was less than 2 to preclude gel formation in both the long- and short-chain branched (SCB) PCs. Several series of SCB and long-chain branched PCs were prepared, and those lacking gels showed molecular weights measured by gel permeation chromatography-UV and gel permeation chromatography-LS consistent with model calculations. In SCB PCs, the minimum $M_w$/arm that could be realized without gel formation depended on both composition (molecular weight, terminator type) and process (terminator addition point, coupling catalyst) variables. The minimum $M_w$/arm achieved in the low molecular weight series studied ranged from ~3300 to ~1000. The use of long chain alkyl phenol terminators gave branched PCs with lower glass-transition temperatures but a higher gel-free minimum $M_w$/arm. SCB PCs where $M_w$/arm was less than ~$M_c$ spontaneously cracked after compression molding, a result attributed to their lack of polymer chain entanglements.

"Hyperbranched poly(arylene ether phosphine oxide)s," H. S. Lee et al., Polymer Bulletin, 45, 319–326 (2000), the disclosure of which is totally incorporated herein by reference, discloses that new $AB_2$ and $A_2B$ monomers, bis(4-fluorophenyl)-4'-hydroxyphenylphosphine oxide and bis(4-hydroxyphenyl)-4'-fluorophenyl-phosphine oxide, were prepared and converted to corresponding hyperbranched poly(arylene ether phosphineoxide)s with hydroxyphenyl and fluorophenyl end functional groups. While the dihydroxy monomer gave a low molecular weight polymer, the difluoro monomer produced a high molecular weight hyperbranched polymer. The glass transition temperature of the obtained polymers was 266° C. and 230° C., and 5% weight loss temperature was 491° C. and 391° C., respectively. The fluorophenyl-terminated hyperbranched polymer was soluble in $CHCl_3$, but the hydroxyphenyl-terminated polymer was not soluble in $CHCl_3$ even though it has lower molecular weight than the fluorophenyl-terminated polymer, indicating that properties of the hyperbranched polymers markedly depend on end functional groups as well as their molecular weight.

Hyperbranched polymers and processes for the preparation thereof are known. Known syntheses, however, frequently entail the use of custom-synthesized monomers, which can take, for example, two to five steps to prepare prior to synthesis of the hyperbranched polymer. Accordingly, processes which enable the preparation of branched polyarylene ether polymers by simpler processes are desirable. Hyperbranched polymers can have several advantages over linear polymers of the same class. For example, branched polymers (hyperbranches and dendrimers) can exhibit a lower solution and melt viscosities compared to their linear analogs owing to their lower hydrodynamic volume for the same molecular weight. In addition, hyperbranched polymers are often more soluble than their linear analogs, which is thought to be attributable to a decrease in the ability of the polymeric material to intertwine at a molecular level. Further, hyperbranched polymers can be thought to be a mid-point between linear polymers and crosslinked polymers, since severing of or more of the branches will not result in a large loss of molecular weight.

Accordingly, while known compositions and processes are suitable for their intended purposes, a need remains for branched polyarylene ether polymers. In addition, a need remains for methods for preparing branched polyarylene ether polymers. Further, a need remains for methods for preparing branched polyarylene ether polymers wherein the synthesis can be carried out by depolymerization of linear polymers. There is also a need for methods for preparing branched polyarylene ether polymers that enables control of the degree of branching within the polymer and the introduction of branching in a well-defined manner. In addition, there is a need for methods for preparing branched polyarylene ether polymers that can be carried out at desirably low cost levels. Further, there is a need for methods for preparing branched polyarylene ether polymers wherein variations in the ratio of monomers can result in control over the degree of branching and the length of the linear units. Additionally, there is a need for improved photosensitive imaging members. A need also remains for improved binders for photosensitive imaging members. In addition, there is a need for polymeric binders suitable for use in photogenerating layers in imaging members. Further, a need remains for polymeric binders suitable for use in charge transport layers in imaging members. Additionally, a need remains for polymeric binders suitable for use in photosensitive imaging members that can, in some embodiments, impart improved wear resistance to the members, particularly under bias charging roll charging conditions. There is also a need for polymeric binders suitable for use in photosensitive imaging members that can solubilize charge transport materials and other small molecule dopants used to tailor the physical and/or mechanical properties of the imaging members.

SUMMARY

Disclosed herein is a process for preparing a branched polyarylene ether polymer which comprises (A) providing a reaction mixture which comprises (i) an optional solvent, (ii) a polyfunctional phenol compound of the formula $Ar(OH)_x$ wherein $x \geq 3$ and wherein Ar is an aryl moiety or an alkylaryl moiety, provided that when Ar is an alkylaryl moiety at least three of the —OH groups are bonded to an aryl portion thereof, (iii) one or more linear polymers of the formula

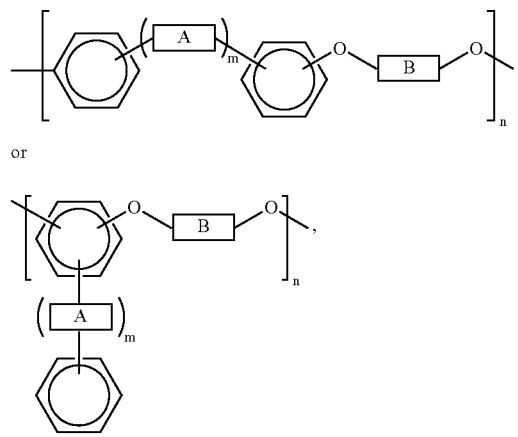

wherein each m, independently of the others, is an integer of 0 or 1, each A, independently of the others, is

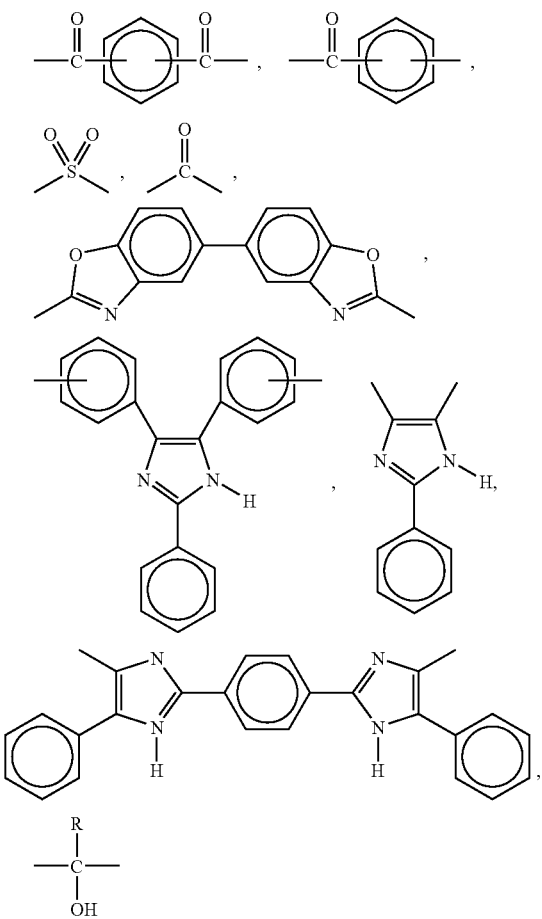

wherein R is a hydrogen atom, an alkyl group, an aryl group, an arylalkyl group, an alkylaryl group, or mixtures thereof,

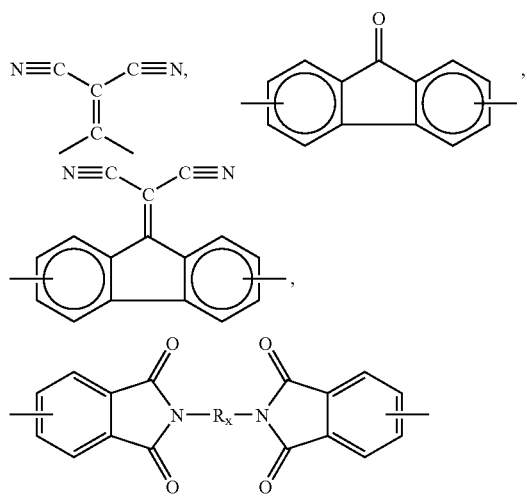
wherein $R_x$ is an alkylene group, an arylene group, an arylalkylene group, an alkylarylene group, or mixtures thereof,
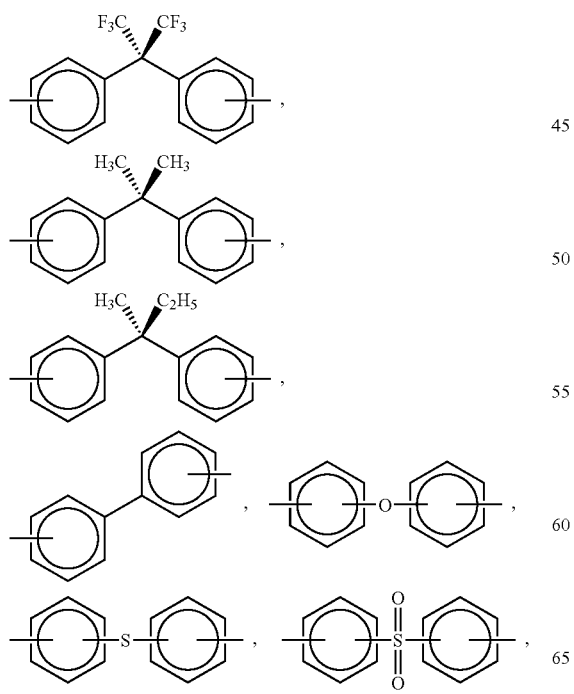
or mixtures thereof, each B, independently of the others, is
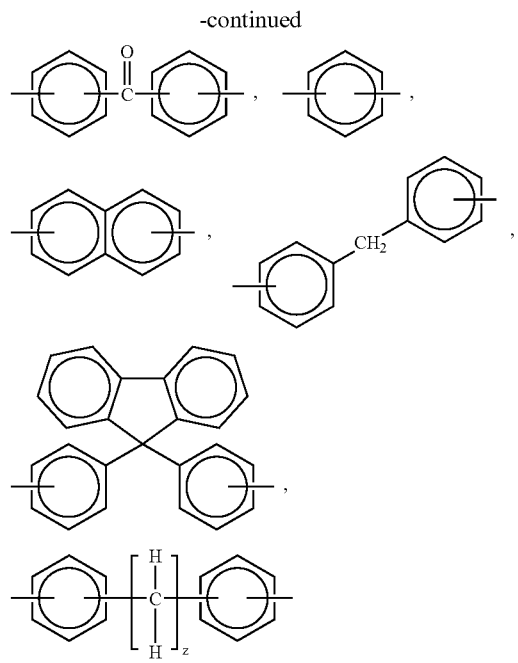
wherein z is an integer of from 2 to about 20,
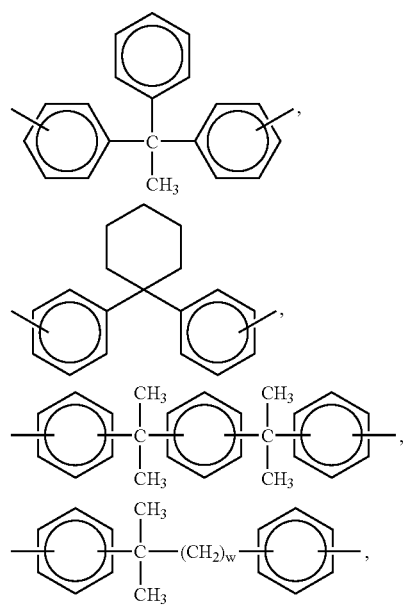
wherein u is an integer of from 1 to about 20,
wherein w is an integer of from 1 to about 20,

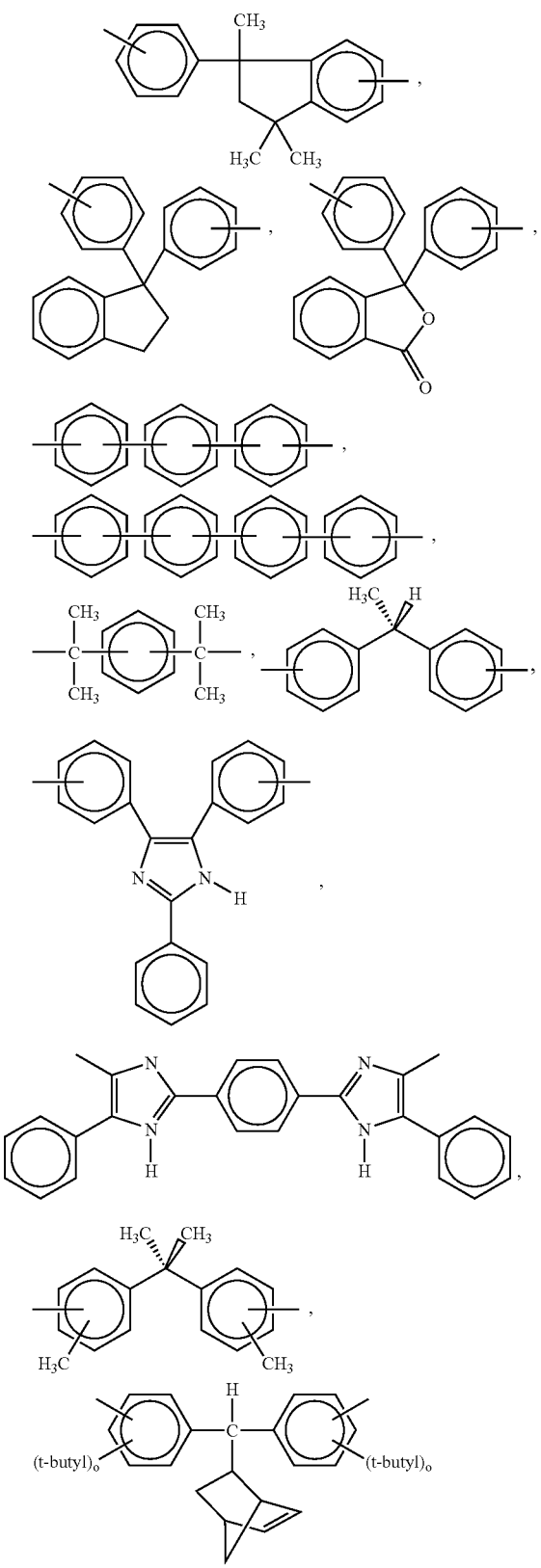
wherein each o, independently of the other, is an integer of 1, 2, 3, or 4,
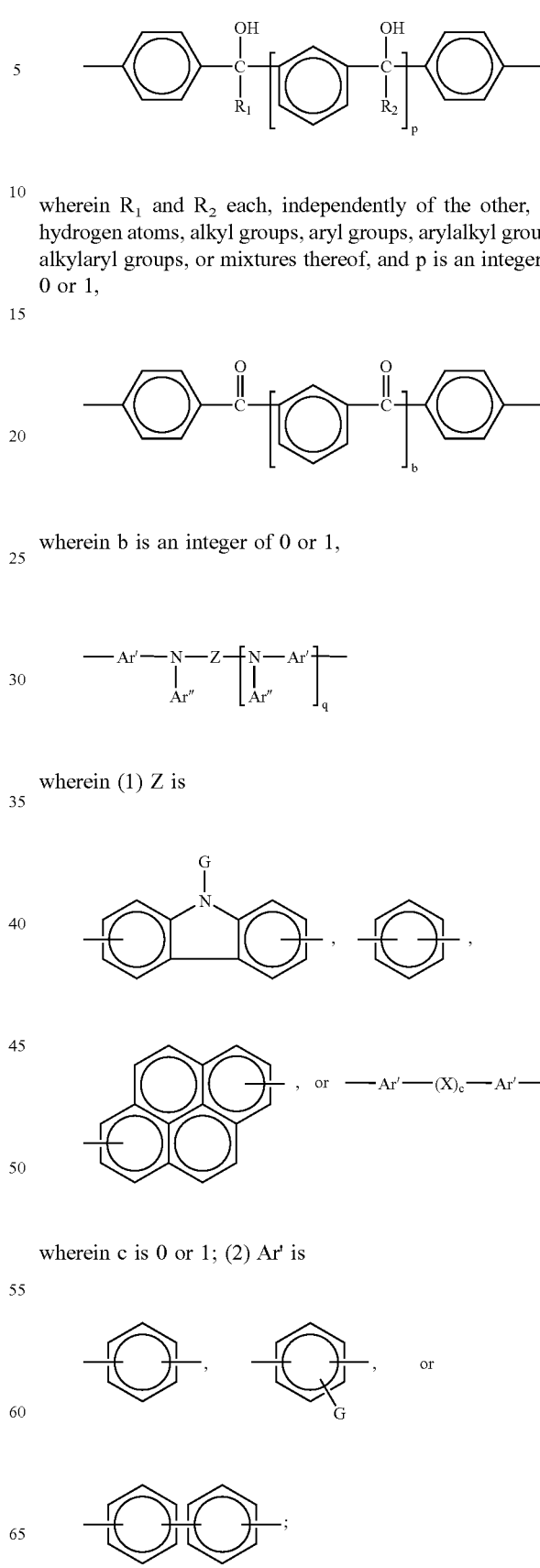
wherein $R_1$ and $R_2$ each, independently of the other, are hydrogen atoms, alkyl groups, aryl groups, arylalkyl groups, alkylaryl groups, or mixtures thereof, and p is an integer of 0 or 1,
wherein b is an integer of 0 or 1,
wherein (1) Z is
wherein c is 0 or 1; (2) Ar' is (3) G is an alkyl group selected from alkyl groups containing from about 2 to about 10 carbon atoms; (4) Ar' is

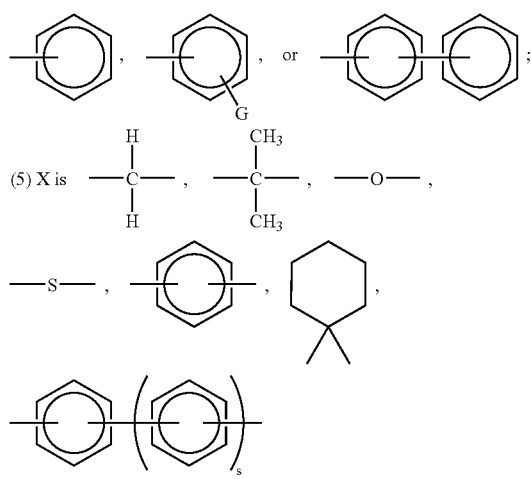

wherein s is 0, 1, or 2,

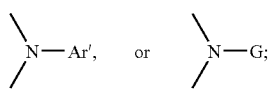

and (6) q is 0 or 1; or mixtures thereof, and n is an integer representing the number of repeat monomer units, (iv) optionally, a compound of the formula

wherein a is an integer of from 1 to 5 and R' is a hydrogen atom, an alkyl group, an aryl group, an arylalkyl group, an alkylaryl group, or a mixture thereof, wherein two or more R' groups can be joined together to form a ring, and (v) a carbonate base; and (B) heating the reaction mixture and removing generated water from the reaction mixture, thereby effecting a polymerization reaction.

DETAILED DESCRIPTION

Disclosed herein is a process for preparing a branched polyarylene ether polymer which comprises (A) providing a reaction mixture which comprises (i) an optional solvent, (ii) a polyfunctional phenol compound of the formula $Ar(OH)_x$ wherein $x \geq 3$ and wherein Ar is an aryl moiety (including substituted and unsubstituted aryl moieties, and wherein hetero atoms, such as oxygen, nitrogen, sulfur, silicon, phosphorus, and the like either may or may not be present in the aryl moiety), in one embodiment with at least about 4 carbon atoms, in another embodiment with at least about 5 carbon atoms, and in yet another embodiment with at least about 6 carbon atoms, and in one embodiment with no more than about 20 carbon atoms, in another embodiment with no more than about 15 carbon atoms, and in yet another embodiment with no more than about 10 carbon atoms, although the number of carbon atoms can be outside of these ranges, or an alkylaryl moiety (including substituted and unsubstituted alkylaryl moieties, and wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the aryl portion and the alkyl portion of the alkylaryl moiety), in one embodiment with at least about 5 carbon atoms, in another embodiment with at least about 6 carbon atoms, and in yet another embodiment with at least about 7 carbon atoms, and in one embodiment with no more than about 20 carbon atoms, in another embodiment with no more than about 15 carbon atoms, and in yet another embodiment with no more than about 9 carbon atoms, although the number of carbon atoms can be outside of these ranges, such as tolyl or the like, wherein the substituents on the substituted aryl and alkylaryl groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring, provided that when Ar is an alkylaryl moiety at least three of the —OH groups are bonded to an aryl portion thereof, (iii) one or more linear polymers of the formula

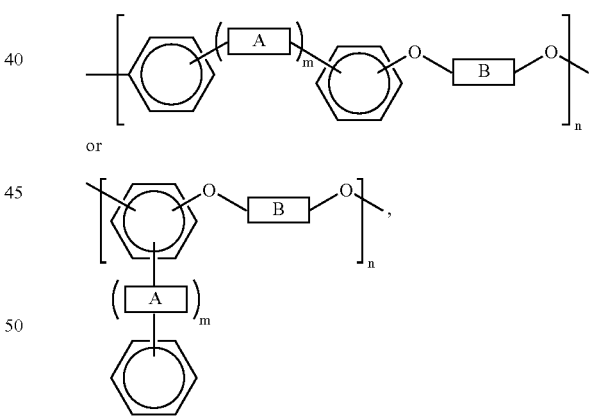

wherein each m, independently of the others, is an integer of 0 or 1, each A, independently of the others, is

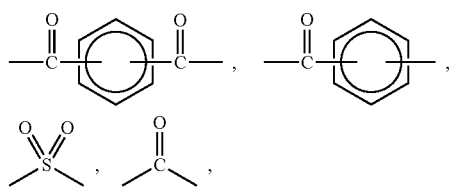

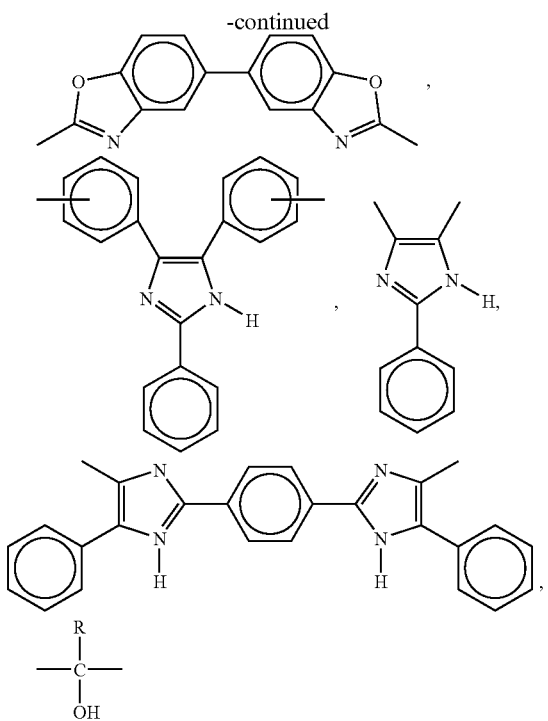

wherein R is a hydrogen atom, an alkyl group (including linear, branched, cyclic, saturated, unsaturated, substituted, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, and in one embodiment with no more than about 20 carbon atoms, in another embodiment with no more than about 10 carbon atoms, and in yet another embodiment with no more than about 5 carbon atoms, although the number of carbon atoms can be outside of these ranges, an aryl group (including substituted and unsubstituted aryl groups, and wherein hetero atoms, such as oxygen, nitrogen, sulfur, silicon, phosphorus, and the like either may or may not be present in the aryl group), in one embodiment with at least about 4 carbon atoms, in another embodiment with at least about 5 carbon atoms, and in yet another embodiment with at least about 6 carbon atoms, and in one embodiment with no more than about 18 carbon atoms, in another embodiment with no more than about 12 carbon atoms, and in yet another embodiment with no more than about 6 carbon atoms, although the number of carbon atoms can be outside of these ranges, an arylalkyl group (including substituted and unsubstituted arylalkyl groups, and wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the aryl portion and the alkyl portion of the arylalkyl group), in one embodiment with at least about 5 carbon atoms, in another embodiment with at least about 6 carbon atoms, and in yet another embodiment with at least about 7 carbon atoms, and in one embodiment with no more than about 25 carbon atoms, in another embodiment with no more than about 12 carbon atoms, and in yet another embodiment with no more than about 7 carbon atoms, although the number of carbon atoms can be outside of these ranges, such as benzyl or the like, an alkylaryl group (including substituted and unsubstituted alkylaryl groups, and wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the aryl portion and the alkyl portion of the alkylaryl group), in one embodiment with at least about 5 carbon atoms, in another embodiment with at least about 6 carbon atoms, and in yet another embodiment with at least about 7 carbon atoms, and in one embodiment with no more than about 25 carbon atoms, in another embodiment with no more than about 12 carbon atoms, and in yet another embodiment with no more than about 7 carbon atoms, although the number of carbon atoms can be outside of these ranges, such as tolyl or the like, or mixtures thereof, wherein the substituents on the substituted alkyl, aryl, arylalkyl, and alkylaryl groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring,

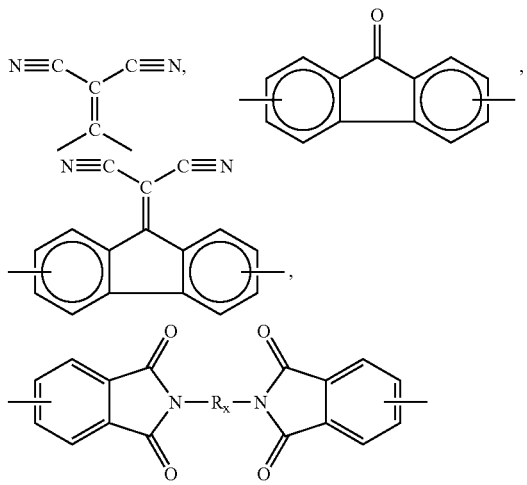

wherein $R_x$ is an alkylene group (including linear, branched, cyclic, saturated, unsaturated, substituted, and unsubstituted alkylene groups, and wherein hetero atoms, such as oxygen, nitrogen, sulfur, silicon, phosphorus, and the like either may or may not be present in the alkylene group), in one embodiment with at least 1 carbon atom, and in one embodiment with no more than about 20 carbon atoms, in another embodiment with no more than about 10 carbon atoms, and in yet another embodiment with no more than about 5 carbon atoms, although the number of carbon atoms can be outside of these ranges, an arylene group (including substituted and unsubstituted arylene groups, and wherein hetero atoms, such as oxygen, nitrogen, sulfur, silicon, phosphorus, and the like either may or may not be present in the arylene group), in one embodiment with at least about 4 carbon atoms, in another embodiment with at least about 5 carbon atoms, and in yet another embodiment with at least about 6 carbon atoms, and in one embodiment with no more than about 18 carbon atoms, in another embodiment with no more than about 12 carbon atoms, and in yet another embodiment with no more than about 6 carbon atoms, although the number of carbon atoms can be outside of these ranges, an arylalkylene group (including substituted and unsubstituted arylalkylene groups, and wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the aryl portion and the alkyl portion of the arylalkylene group), in one embodiment with at least about 5 carbon atoms, in another embodiment with at least about 6 carbon atoms, and in yet another embodiment with at least about 7 carbon atoms, and in one embodiment with no more than about 25 carbon atoms, in another embodiment with no more than about 12 carbon atoms, and in yet another embodiment with no more than about 7 carbon atoms, although the number of carbon atoms can be outside of these ranges, such as benzylene or the like, an alkylarylene group (including substituted and unsubstituted alkylarylene groups, and wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the aryl portion and the alkyl portion of the alkylarylene group), in one embodiment with at least about 5 carbon atoms, in another embodiment with at least about 6 carbon atoms, and in yet another embodiment with at least about 7 carbon atoms, and in one embodiment with no more than about 25 carbon atoms, in another embodiment with no more than about 12 carbon atoms, and in yet another embodiment with no more than about 7 carbon atoms, although the number of carbon atoms can be outside of these ranges, such as tolylene or the like, or mixtures thereof, wherein the substituents on the substituted alkylene, arylene, arylalkylene, and alkylarylene groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring,

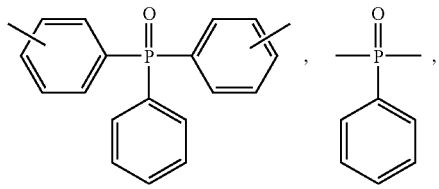, 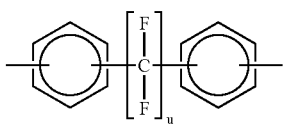, or mixtures thereof, each B, independently of the others, is

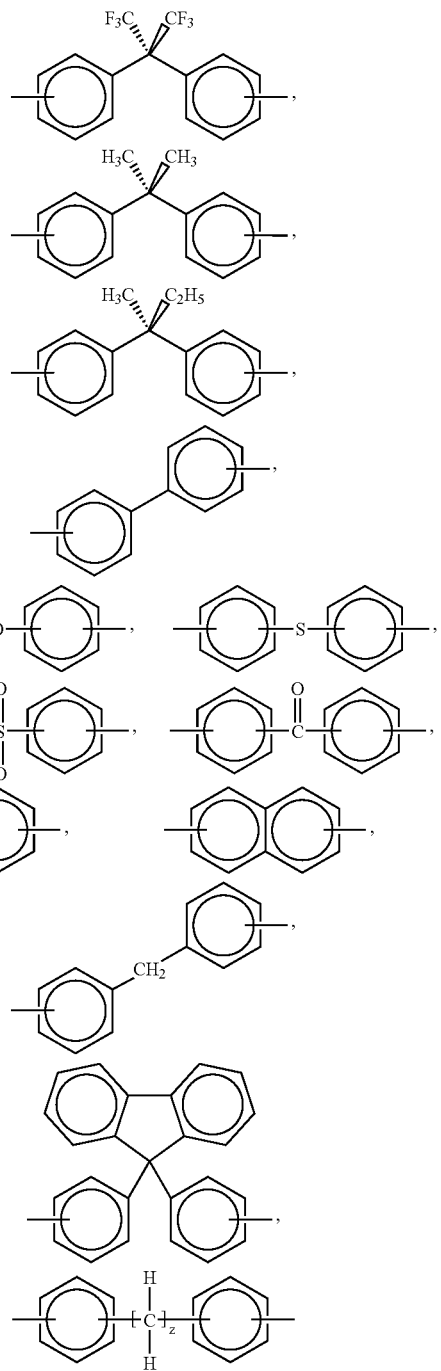

wherein z is an integer of from 2 to about 20, wherein u is an integer of from 1 to about 20,

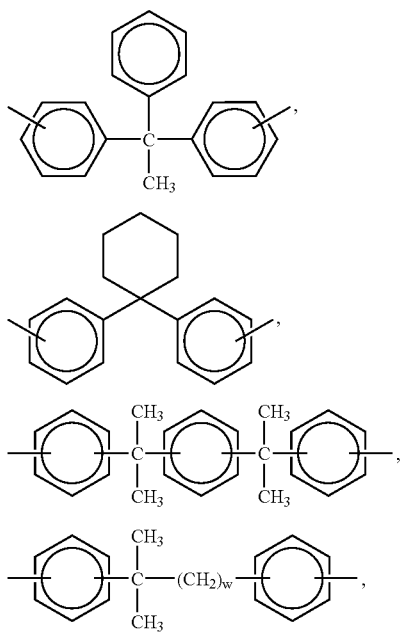

wherein w is an integer of from 1 to about 20,

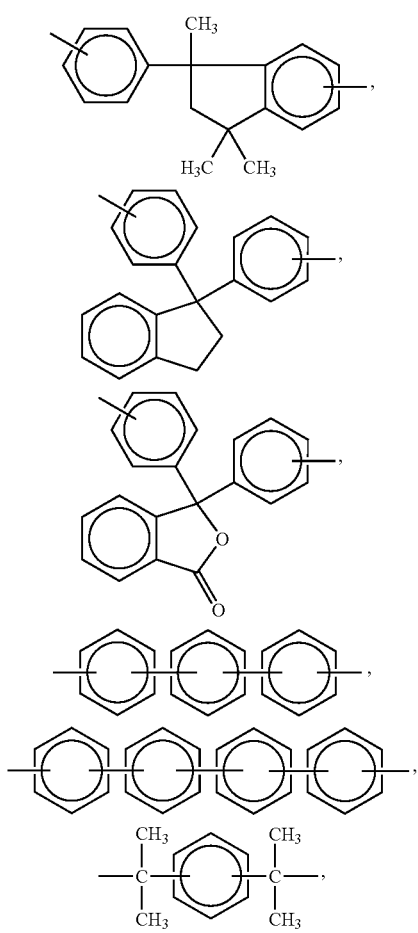

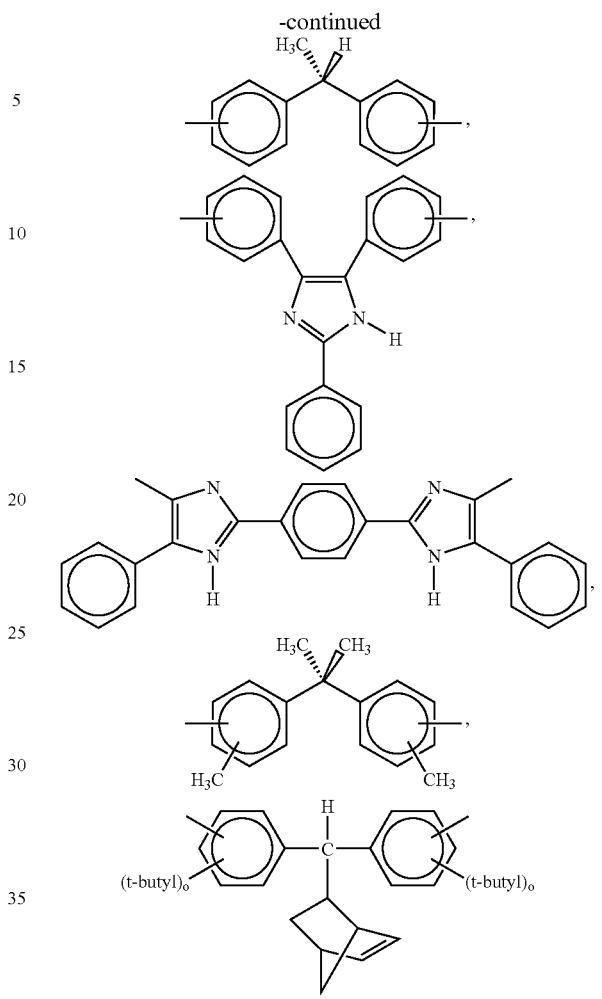

wherein each o, independently of the other, is an integer of 1, 2, 3, or 4,

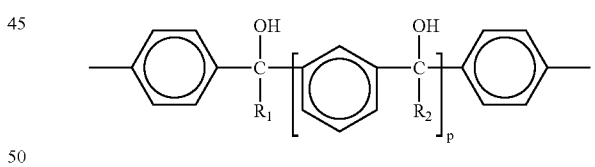

wherein $R_1$ and $R_2$ each, independently of the other, are hydrogen atoms, alkyl groups (including linear, branched, cyclic, saturated, unsaturated, substituted, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, and in one embodiment with no more than about 20 carbon atoms, in another embodiment with no more than about 10 carbon atoms, and in yet another embodiment with no more than about 5 carbon atoms, although the number of carbon atoms can be outside of these ranges, aryl groups (including substituted and unsubstituted aryl groups, and wherein hetero atoms, such as oxygen, nitrogen, sulfur, silicon, phosphorus, and the like either may or may not be present in the aryl group), in one embodiment with at least about 4 carbon atoms, in another embodiment with at least about 5 carbon atoms, and in yet another embodiment with at least about 6 carbon atoms, and in one embodiment with no more than about 18 carbon atoms, in another embodiment with no more than about 12 carbon atoms, and in yet another embodiment with no more than about 6 carbon atoms, although the number of carbon atoms can be outside of these ranges, arylalkyl groups (including substituted and unsubstituted arylalkyl groups, and wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the aryl portion and the alkyl portion of the arylalkyl group), in one embodiment with at least about 5 carbon atoms, in another embodiment with at least about 6 carbon atoms, and in yet another embodiment with at least about 7 carbon atoms, and in one embodiment with no more than about 25 carbon atoms, in another embodiment with no more than about 12 carbon atoms, and in yet another embodiment with no more than about 7 carbon atoms, although the number of carbon atoms can be outside of these ranges, such as benzyl or the like, alkylaryl groups (including substituted and unsubstituted alkylaryl groups, and wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the aryl portion and the alkyl portion of the alkylaryl group), in one embodiment with at least about 5 carbon atoms, in another embodiment with at least about 6 carbon atoms, and in yet another embodiment with at least about 7 carbon atoms, and in one embodiment with no more than about 25 carbon atoms, in another embodiment with no more than about 12 carbon atoms, and in yet another embodiment with no more than about 7 carbon atoms, although the number of carbon atoms can be outside of these ranges, such as tolyl or the like, or mixtures thereof, wherein the substituents on the substituted alkyl, aryl, arylalkyl, and alkylaryl groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring, and p is an integer of 0 or 1,

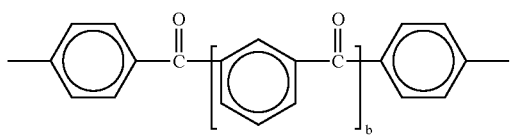

wherein b is an integer of 0 or 1,

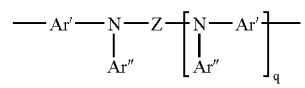

wherein (1) Z is

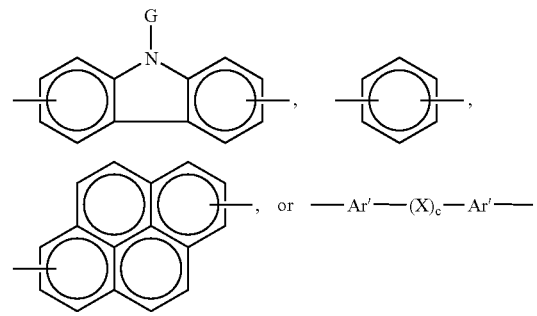

wherein c is 0 or 1; (2) Ar' is

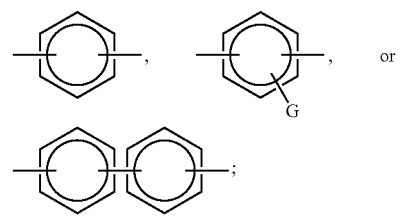

(3) G is an alkyl group selected from alkyl groups containing from about 2 to about 10 carbon atoms; (4) Ar" is

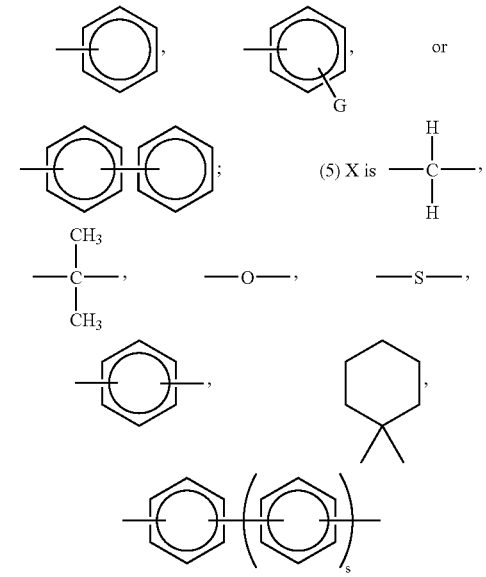

wherein s is 0, 1, or 2,

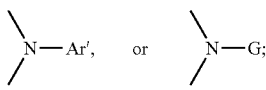

and (6) q is 0 or 1; or mixtures thereof, and n is an integer representing the number of repeat monomer units, (iv) optionally, a compound of the formula

wherein a is an integer of from 1 to 5 and R' is a hydrogen atom, an alkyl group (including linear, branched, cyclic, saturated, unsaturated, substituted, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, and in one embodiment with no more than about 20 carbon atoms, in another embodiment with no more than about 8 carbon atoms, and in yet another embodiment with no more than about 4 carbon atoms, although the number of carbon atoms can be outside of these ranges, an aryl group (including substituted and unsubstituted aryl groups, and wherein hetero atoms, such as oxygen, nitrogen, sulfur, silicon, phosphorus, and the like either may or may not be present in the aryl group), in one embodiment with at least about 4 carbon atoms, in another embodiment with at least about 5 carbon atoms, and in yet another embodiment with at least about 6 carbon atoms, and in one embodiment with no more than about 14 carbon atoms, in another embodiment with no more than about 12 carbon atoms, and in yet another embodiment with no more than about 10 carbon atoms, although the number of carbon atoms can be outside of these ranges, an arylalkyl group (including substituted and unsubstituted arylalkyl groups, and wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the aryl portion and the alkyl portion of the arylalkyl group), in one embodiment with at least about 5 carbon atoms, in another embodiment with at least about 6 carbon atoms, and in yet another embodiment with at least about 7 carbon atoms, and in one embodiment with no more than about 50 carbon atoms, in another embodiment with no more than about 23 carbon atoms, and in yet another embodiment with no more than about 11 carbon atoms, although the number of carbon atoms can be outside of these ranges, such as benzyl or the like, an alkylaryl group (including substituted and unsubstituted alkylaryl groups, and wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the aryl portion and the alkyl portion of the alkylaryl group), in one embodiment with at least about 5 carbon atoms, in another embodiment with at least about 6 carbon atoms, and in yet another embodiment with at least about 7 carbon atoms, and in one embodiment with no more than about 50 carbon atoms, in another embodiment with no more than about 23 carbon atoms, and in yet another embodiment with no more than about 11 carbon atoms, although the number of carbon atoms can be outside of these ranges, such as tolyl or the like, or a mixture thereof, wherein two or more R' groups can be joined together to form a ring, wherein the substituents on the substituted alkyl, aryl, arylalkyl, and alkylaryl groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring, and (v) a carbonate base; and (B) heating the reaction mixture and removing generated water from the reaction mixture, thereby effecting a polymerization reaction.

In the polymers of the above formulae, the phenyl groups and the A and/or B groups can be either substituted or unsubstituted. Substituents can be placed thereon either prior to or subsequent to polymerization. Examples of suitable substituents include (but are not limited to) alkyl groups, aryl groups, arylalkyl groups, alkylaryl groups, hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring.

The polyfunctional phenol material is of the formula $Ar(OH)_x$ wherein $x \geq 3$ and wherein Ar is an aryl moiety or an alkylaryl moiety, provided that when Ar is an alkylaryl moiety at least three of the —OH groups are bonded to an aryl portion thereof. Many polyfunctional phenolic compounds are commercially available, such as 1,1,1-tris(4-hydroxyphenyl)ethane (available from Aldrich Chemical Company, Mississauga, Ontario), of the formula

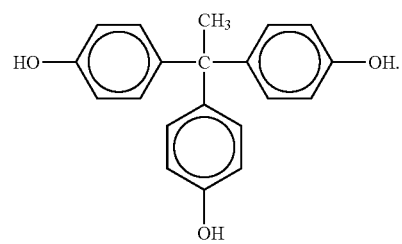

Compounds of this type can also be prepared by any desired or effective method. For example, the reaction of anisole with a carboxylic acid chloride (for example propionyl chloride) under standard Friedel-Crafts conditions gives a disubstituted ketone compound (for example ethyl-(4-methoxyphenyl)ketone). Reaction of this disubstituted ketone with phenol under acidic (protic) and dehydrating conditions gives a 1,1-bis(4-hydroxyphenyl)-1-(4-methoxyphenyl)-substituted methane derivative (for example 1,1-bis(4-hydroxyphenyl)-1-(4-methoxyphenyl)-propane). Demethylation using boron tribromide gives the desired trifunctional 1,1,1-tris(4-hydroxyphenyl)-substituted methane derivative (for example 1,1,1-tris(4-hydroxyphenyl)-propane). The reaction proceeds as follows:

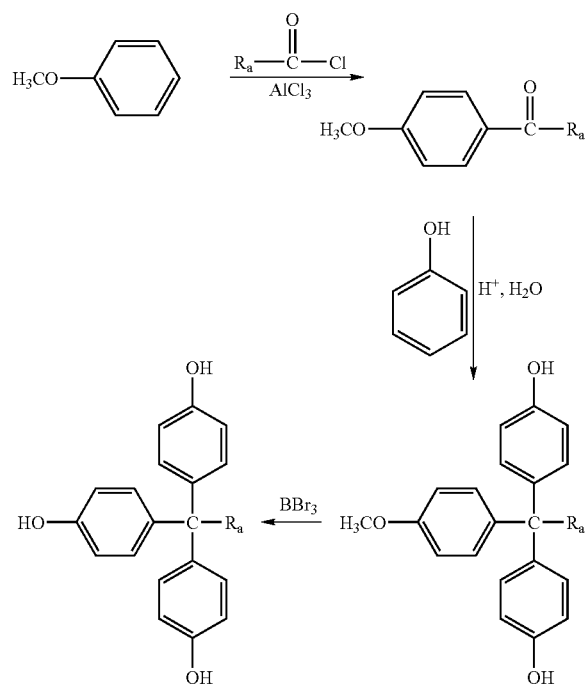

wherein $R_a$ is an alkyl group (including linear, branched, cyclic, saturated, unsaturated, substituted, and unsubstituted alkyl groups, and wherein hetero atoms, such as oxygen, nitrogen, sulfur, silicon, phosphorus, and the like either may or may not be present in the alkyl group), an aryl group (including substituted and unsubstituted aryl groups, and wherein hetero atoms, such as oxygen, nitrogen, sulfur, silicon, phosphorus, and the like either may or may not be present in the aryl group), an arylalkyl group (including substituted and unsubstituted arylalkyl groups, and wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the aryl portion and the alkyl portion of the arylalkyl group), or an alkylaryl group (including substituted and unsubstituted alkylaryl groups, and wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the aryl portion and the alkyl portion of the alkylaryl group).

Higher polyfunctional phenolic compounds can be made in an analogous manner by the reaction of anisole with an αω-dicarboxylic acid chloride (for example adipoyl chloride) under standard Friedel-Crafts conditions to give an α,ω-diketone compound (for example 1,6-dioxo-1,6-bis(4-methoxyphenyl)hexane)). Reaction of this α,ω-diketone with phenol under acidic (protic) and dehydrating conditions gives an α,α,ω,ω-tetrakis(4-hydroxyphenyl)-α,ω-bis(4-methoxyphenyl)-substituted alkane derivative (for example 1,1,6,6-tetrakis(4-hydroxyphenyl)-1,6-bis(4-methoxyphenyl)-hexane). Demethylation using boron tribromide gives the desired hexafunctional α,α,α,ω,ω,ω-hexakis(4-hydroxyphenyl)-substituted alkane derivative (for example 1,1,1,6,6,6-hexakis(4-hydroxyphenyl)-hexane). The reaction proceeds as follows:

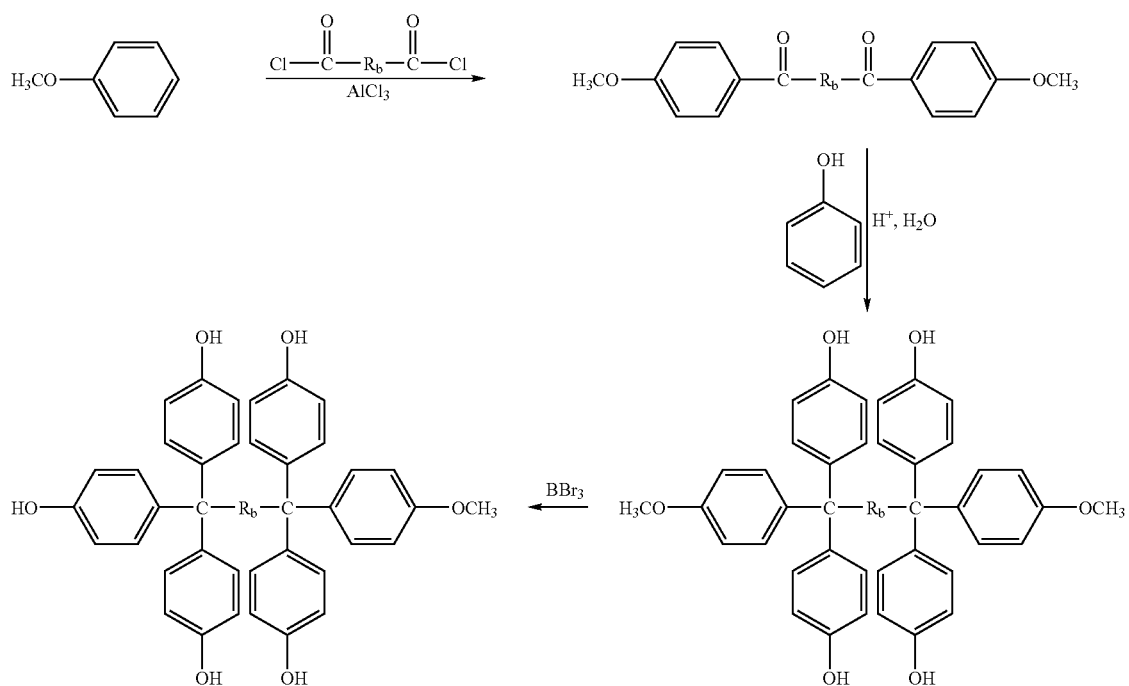

wherein $R_b$ is an alkylene group (including linear, branched, cyclic, saturated, unsaturated, substituted, and unsubstituted alkylene groups, and wherein hetero atoms, such as oxygen, nitrogen, sulfur, silicon, phosphorus, and the like either may or may not be present in the alkylene group), an arylene group (including substituted and unsubstituted arylene groups, and wherein hetero atoms, such as oxygen, nitrogen, sulfur, silicon, phosphorus, and the like either may or may not be present in the arylene group), an arylalkylene group (including substituted and unsubstituted arylalkylene groups, and wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the aryl portion and the alkyl portion of the arylalkylene group), or an alkylarylene group (including substituted and unsubstituted alkylarylene groups, and wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the aryl portion and the alkyl portion of the alkylarylene group).

Even higher polyfunctional phenolic compounds can be made in an analogous manner by the reaction of anisole with a polycarboxylic acid chloride under standard Friedel-Crafts conditions to give a polyketone compound. Reaction of this polyketone with phenol under acidic (protic) and dehydrating conditions gives an analogous poly(4-hydroxyphenyl)/(4-methoxyphenyl) derivative. Demethylation using boron tribromide gives the desired poly(4-hydroxyphenyl)-substituted derivative. The reaction proceeds as follows:

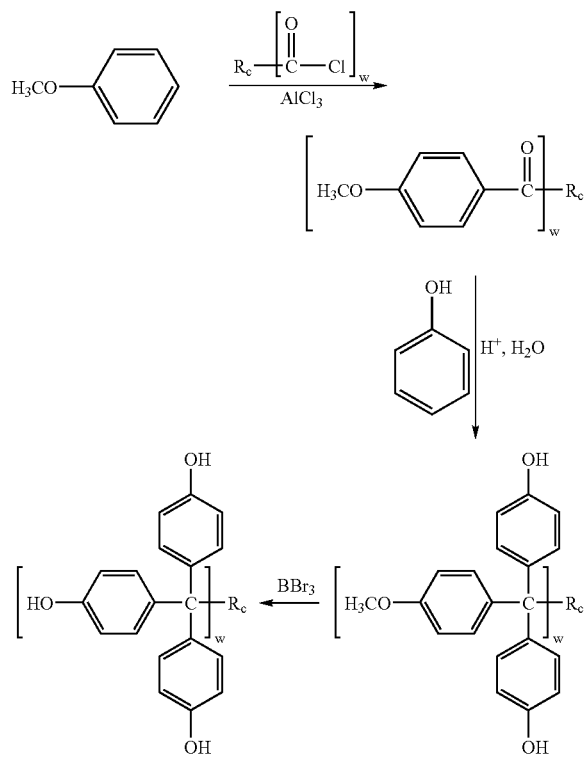

wherein $R_c$ is an alkyl group (including linear, branched, cyclic, saturated, unsaturated, substituted, and unsubstituted alkyl groups, and wherein hetero atoms, such as oxygen, nitrogen, sulfur, silicon, phosphorus, and the like either may or may not be present in the alkyl group), an aryl group (including substituted and unsubstituted aryl groups, and wherein hetero atoms, such as oxygen, nitrogen, sulfur, silicon, phosphorus, and the like either may or may not be present in the aryl group), an arylalkyl group (including substituted and unsubstituted arylalkyl groups, and wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the aryl portion and the alkyl portion of the arylalkyl group), or an alkylaryl group (including substituted and unsubstituted alkylaryl groups, and wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the aryl portion and the alkyl portion of the alkylaryl group). Some examples of suitable polyfunctional phenol compounds include (but are not limited to) those of the formula

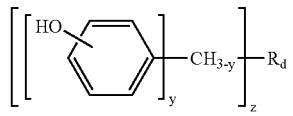

wherein y is an integer of 1, 2, or 3, z is an integer representing the number of HO-ϕ-CH$_{3-y}$— groups on $R_d$, being in one embodiment at least 1, and in one embodiment no more than about 10, in another embodiment no more than about 3, and in yet another embodiment no more than about 2, although the value of z can be outside of these ranges, provided that the total number of phenolic groups in the compound is at least 3, $R_d$ is a monovalent moiety, such as (but not limited to) a hydrogen atom, a hydroxy group, a halogen atom, an amine group, an imine group, an ammonium group, a cyano group, a pyridine group, a pyridinium group, an ether group, an aldehyde group, a ketone group, an ester group, an amide group, a carbonyl group, a thiocarbonyl group, a sulfate group, a sulfonate group, a sulfonic acid group, a sulfide group, a sulfoxide group, a phosphine group, a phosphonium group, a phosphate group, a nitrile group, a mercapto group, a nitro group, a nitroso group, a sulfone group, an acyl group, an acid anhydride group, an azide group, an azo group, a cyanato group, an isocyanato group, a thiocyanato group, an isothiocyanato group, a carboxylate group, a carboxylic acid group, a urethane group, a urea group, mixtures thereof, an alkyl group (including linear, branched, cyclic, saturated, unsaturated, substituted, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, and in one embodiment with no more than about 30 carbon atoms, in another embodiment with no more than about 10 carbon atoms, and in yet another embodiment with no more than about 7 carbon atoms, although the number of carbon atoms can be outside of these ranges, an aryl group (including substituted and unsubstituted aryl groups, and wherein hetero atoms, such as oxygen, nitrogen, sulfur, silicon, phosphorus, and the like either may or may not be present in the aryl group), in one embodiment with at least about 4 carbon atoms, in another embodiment with at least about 5 carbon atoms, and in yet another embodiment with at least about 6 carbon atoms, and in one embodiment with no more than about 30 carbon atoms, in another embodiment with no more than about 10 carbon atoms, and in yet another embodiment with no more than about 8 carbon atoms, although the number of carbon atoms can be outside of these ranges, an arylalkyl group (including substituted and unsubstituted arylalkyl groups, and wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the aryl portion and the alkyl portion of the arylalkyl group), in one embodiment with at least about 5 carbon atoms, in another embodiment with at least about 6 carbon atoms, and in yet another embodiment with at least about 7 carbon atoms, and in one embodiment with no more than about 30 carbon atoms, in another embodiment with no more than about 10 carbon atoms, and in yet another embodiment with no more than about 8 carbon atoms, although the number of carbon atoms can be outside of these ranges, such as benzyl or the like, an alkylaryl group (including substituted and unsubstituted alkylaryl groups, and wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the aryl portion and the alkyl portion of the alkylaryl group), in one embodiment with at least about 5 carbon atoms, in another embodiment with at least about 6 carbon atoms, and in yet another embodiment with at least about 7 carbon atoms, and in one embodiment with no more than about 30 carbon atoms, in another embodiment with no more than about 10 carbon atoms, and in yet another embodiment with no more than about 8 carbon atoms, although the number of carbon atoms can be outside of these ranges, such as tolyl or the like, wherein the substituents on the substituted alkyl, aryl, arylalkyl, and alkylaryl groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring, or the like. Other examples of polyfunctional phenol compounds include (but are not limited to) those of the formula

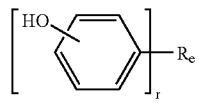

wherein r is an integer of at least about 3, and in one embodiment is no more than about 10, in another embodiment is no more than about 5, and in yet another embodiment is no more than 3, although the value of r can be outside of these ranges, and $R_e$ is an alkyl group (including linear, branched, cyclic, saturated, unsaturated, substituted, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, and in one embodiment with no more than about 10 carbon atoms, in another embodiment with no more than about 8 carbon atoms, and in yet another embodiment with no more than about 6 carbon atoms, although the number of carbon atoms can be outside of these ranges, an aryl group (including substituted and unsubstituted aryl groups, and wherein hetero atoms, such as oxygen, nitrogen, sulfur, silicon, phosphorus, and the like either may or may not be present in the aryl group), in one embodiment with at least about 4 carbon atoms, in another embodiment with at least about 5 carbon atoms, and in yet another embodiment with at least about 6 carbon atoms, and in one embodiment with no more than about 15 carbon atoms, in another embodiment with no more than about 10 carbon atoms, and in yet another embodiment with no more than about 8 carbon atoms, although the number of carbon atoms can be outside of these ranges, an arylalkyl group (including substituted and unsubstituted arylalkyl groups, and wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the aryl portion and the alkyl portion of the arylalkyl group), in one embodiment with at least about 5 carbon atoms, in another embodiment with at least about 6 carbon atoms, and in yet another embodiment with at least about 7 carbon atoms, and in one embodiment with no more than about 15 carbon atoms, in another embodiment with no more than about 10 carbon atoms, and in yet another embodiment with no more than about 8 carbon atoms, although the number of carbon atoms can be outside of these ranges, such as benzyl or the like, or an alkylaryl group (including substituted and unsubstituted alkylaryl groups, and wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the aryl portion and the alkyl portion of the alkylaryl group), in one embodiment with at least about 5 carbon atoms, in another embodiment with at least about 6 carbon atoms, and in yet another embodiment with at least about 7 carbon atoms, and in one embodiment with no more than about 15 carbon atoms, in another embodiment with no more than about 10 carbon atoms, and in yet another embodiment with no more than about 8 carbon atoms, although the number of carbon atoms can be outside of these ranges, such as tolyl or the like, wherein the substituents on the substituted alkyl, aryl, arylalkyl, and alkylaryl groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring, those of the formula

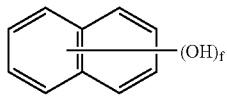

wherein f is an integer of at least 3 and in one embodiment is no more than about 6, in another embodiment no more than about 4, and in yet another embodiment no more than 3, those of the formula

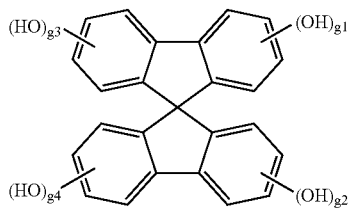

wherein $g_1$, $g_2$, $g_3$, and $g_4$ are each integers of 0, 1, 2, 3, or 4, provided that the sum of $g_1+g_2+g_3+g_4 \geq 3$, with the sum of $g_1+g_2+g_3+g_4$ being in one embodiment no more than about 6, in another embodiment no more than about 4, and in yet another embodiment no more than 3, those of the formula

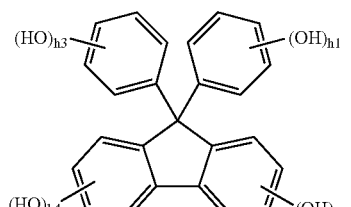

wherein $h_1$, $h_2$, $h_3$, and $h_4$ are each integers of 0, 1, 2, 3, or 4, provided that the sum of $h_1+h_2+h_3+h_4 \geq 3$, with the sum of $h_1+h_2+h_3+h_4$ being in one embodiment no more than about 6, in another embodiment no more than about 4, and in yet another embodiment no more than 3, those of the formula

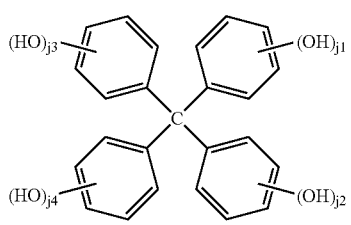

wherein $j_1$, $j_2$, $j_3$, and $j_4$ are each integers of 0, 1, 2, 3, or 4, provided that the sum of $j_1+j_2+j_3+j_4 \geq 3$, with the sum of $j_1+j_2+j_3+j_4$ being in one embodiment no more than about 6, in another embodiment no more than about 4, and in yet another embodiment no more than 3, and the like. Some specific examples of suitable polyfunctional phenol compounds include (but are not limited to) 1,1,1-tris(4-hydroxyphenyl)ethane, of the formula

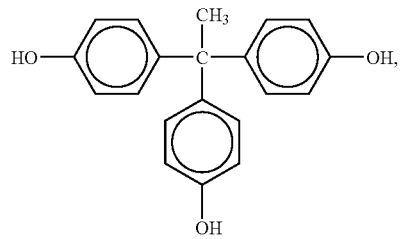

those of the formula

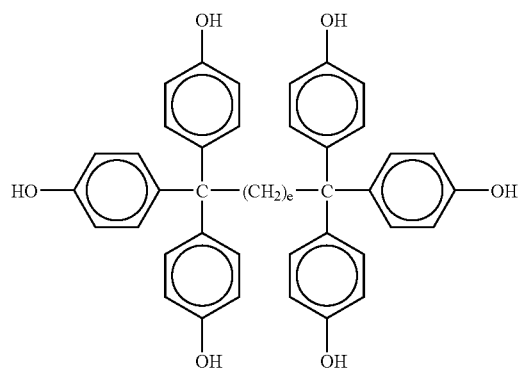

wherein e is an integer representing the number of repeat —($CH_2$)— groups, such as 1, 2, 3, 4, 5, 6, 7, 8, 9, 10, 11, 12, 13, 14, 15, 16, 17, 18, 19, 20, or higher, 1,1,3-tris(2-methyl-4-hydroxy-5-tert-butylphenyl)butane, of the formula

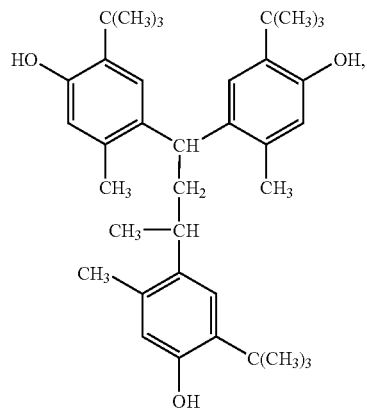

3,3,3',3'-tetramethyl-1,1'-spirobisindane-5,5',6,6'-tetrol, of the formula

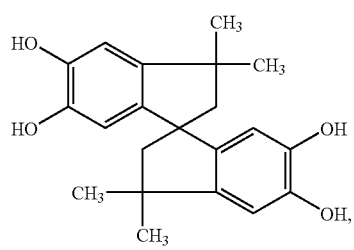

pyrogallol, of the formula

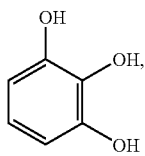

1,2,4-benzenetriol, of the formula

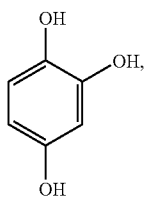

phloroglucinol dihydrate, of the formula

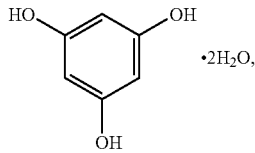

dithranol, of the formula

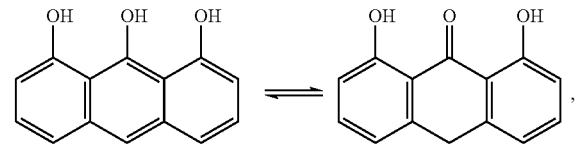

nordihydroguaiaretic acid, of the formula

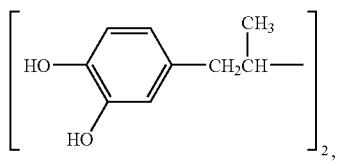

C-methylcalix[4] resorcinarene, of the formula

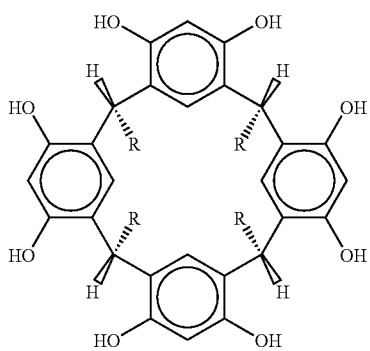

wherein R is $CH_3$, C-undecylcalix[4]-resorcinarene monohydrate, of the formula

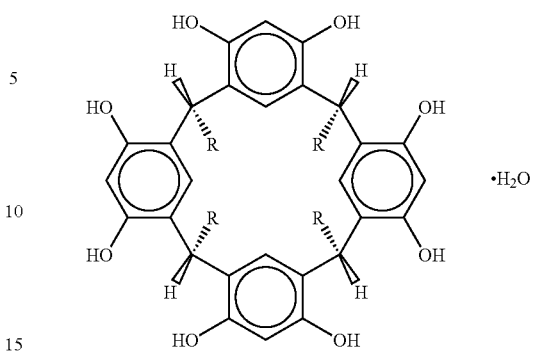

wherein R is —$CH_2(CH_2)_9CH_3$, catechin hydrate, of the formula

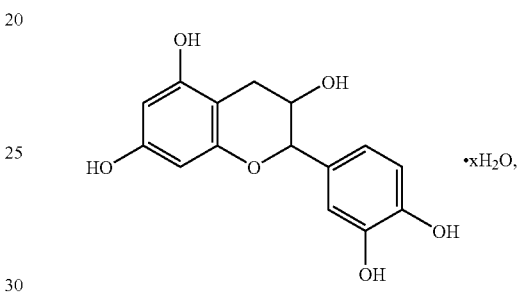

epicatechin, of the formula

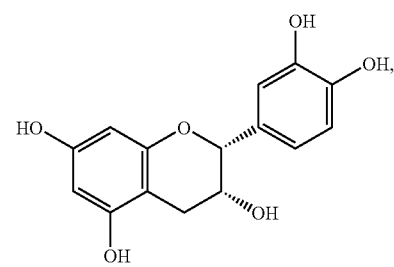

all available from Aldrich Chemical Co., Milwaukee, Wis., and the like, as well as mixtures thereof.

The linear polymer or polymers of the formula

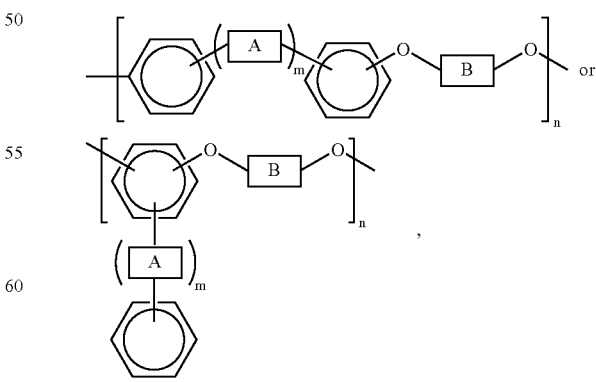

can be obtained commercially. For example, the following materials are commercially available: ULTRASON™

E3010, BASF Corporation, Plastics Materials, Parsippany, N.J., and VICTREX™ PES 4800G, ICI Advanced Materials Business Group, Wilmington, Del., both of the Formula

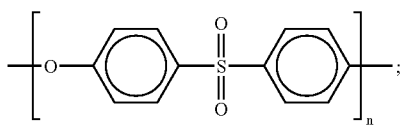

UDEL™ P-1700, Amoco Performance Products Inc., Alpharetta, Ga., and ULTRASON™ S2010, BASF Corporation, Plastics Materials, Parsippany, N.J., both of the formula

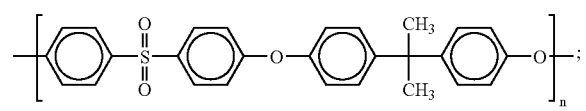

RADEL™ R-5000, Amoco Performance Products Inc., Alpharetta, Ga., of the formula

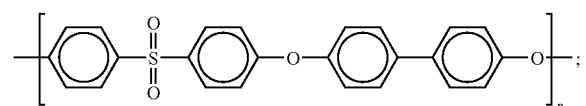

RADEL™ A-200, Amoco Performance Products Inc., Alpharetta, Ga., of the formula

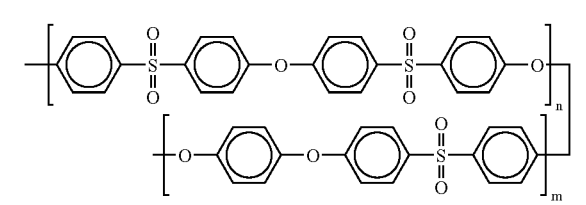

wherein n/m=4.7; ASTREL™360 (x:y=60-70:30-40), 3M Company, Chemical Division, St. Paul, Minn., and VICTREX™ 720P (x=y), ICI Advanced Materials Business Group, Wilmington, Del., both of the Formula

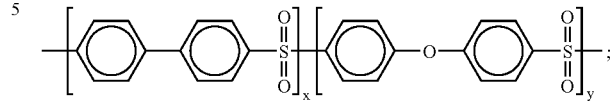

VICTREX™ HTA, ICI Advanced Materials Business Group, Wilmington, Del., of the formula

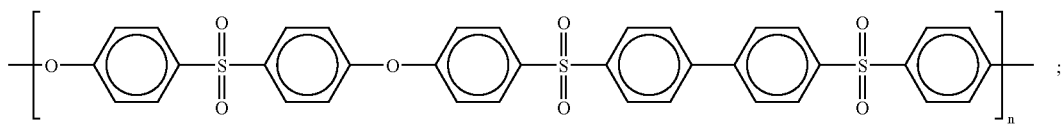

VICTREX™ PEK, ICI Advanced Materials Business Group, Wilmington, Del., and STILAN™ 1000, Raychem Cooperation, Materials Division, Menlo Park, Calif., both of the formula

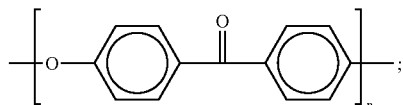

VICTREX™ PEEK 450 G, ICI Advanced Materials Business Group, Wilmington, Del., and KADEL™ E-1000, Amoco Performance Products Inc., Alpharetta, Ga., both of the formula

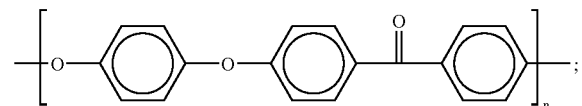

HOSTATEC™, Hoechst AG, 6529 Frankfurt am Main, Germany, of the Formula

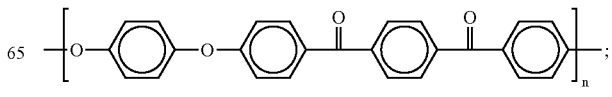

ULTRAPEK™ A-2000, BASF AG, D-6700 Ludwigshafen, Germany, of the Formula

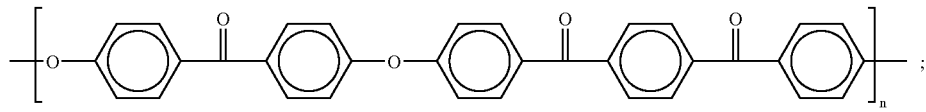

PEKK, DuPont Polymers, Specialty Polymers, Wilmington, Del., of the Formula

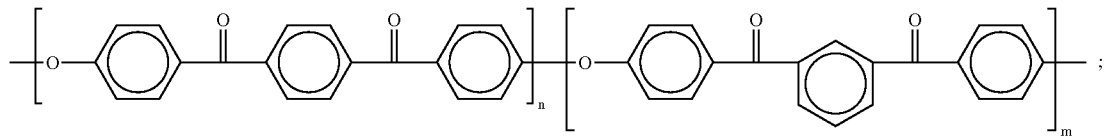

ULTEM™ 1000, GE Plastics, Pittsfield, Mass., of the formula

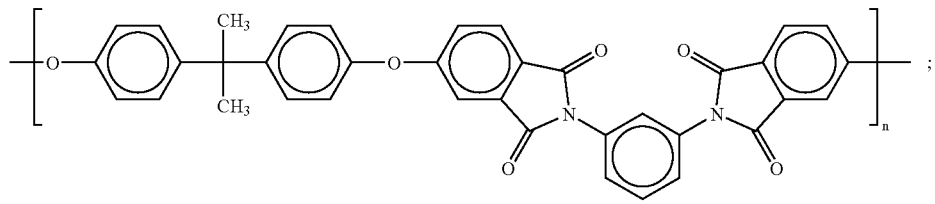

and the like. In addition, these linear polymers can be prepared by known methods, as described in, for example, U.S. Pat. Nos. 5,994,425, 6,022,095, 5,849,809, 6,203,143, 6,124,372, 6,151,042, 6,323,301, 5,889,077, 6,087,414, 5,739,254, 5,753,783, 5,761,809, 5,958,995, 6,184,263, 5,945,253, 6,365,323, 5,863,963, 6,090,453, 6,007,877, 6,273,543, 5,814,426, 5,882,814, 5,874,192, 6,117,967, 6,187,512, 6,020,119, 6,139,920, 6,260,949, Copending application U.S. Ser. No. 10/322,110, Copending application U.S. Ser. No. 10/040,850, Copending application U.S. Ser. No. 10/036,469, and Copending application U.S. Ser. No. 10/717,295, filed Nov. 19, 2003, entitled "Unsaturated Ester Substituted Polymers with Reduced Halogen Content," with the named inventors Christine J. DeVisser and Timothy P. Bender, the disclosures of each of which are totally incorporated herein by reference.

The reaction can, if desired, be carried out neat in the absence of a solvent, such as in a melt extruder. When an optional solvent is used, the selected solvent can be any polar aprotic solvent suitable for this particular reaction. Examples of suitable solvents include (but are not limited to) N,N-dimethylacetamide, sulfolane (also called tetramethylene sulfone, or TMS), dimethyl formamide, dimethyl sulfoxide, N-methylpyrrolidinone, hexamethylphosphoric triamide (HMPA), and the like, as well as mixtures thereof.

When present, the optional solvent is present in the reaction mixture in any desired or effective relative amount, in one embodiment at least about 1 percent by weight solid reactants in the solvent, in another embodiment at least about 5 percent by weight solid reactants in the solvent, and in yet another embodiment at least about 10 percent by weight solid reactants in the solvent, and in one embodiment no more than about 75 percent by weight solid reactants in the solvent, in another embodiment no more than about 50 percent by weight solid reactants in the solvent, and in yet another embodiment no more than about 35 percent by weight solid reactants in the solvent, although the relative amount of solvent can be outside of these ranges.

Optionally, if it is desired to have the branched polymer terminated with a group other than phenol, the reaction mixture can also contain a material of the formula

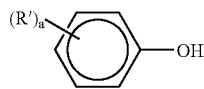

wherein a is an integer of at least 1, in one embodiment being no more than about 5, in another embodiment being no more than about 3, and in yet another embodiment being 1 and having the R' group situated para to the hydroxy group, R' is a hydrogen atom, an alkyl group (including linear, branched, cyclic, saturated, unsaturated, substituted, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, and in one embodiment with no more than about 20 carbon atoms, in another embodiment with no more than about 8 carbon atoms, and in yet another embodiment with no more than about 4 carbon atoms, although the number of carbon atoms can be outside of these ranges, an aryl group (including substituted and unsubstituted aryl groups, and wherein hetero atoms, such as oxygen, nitrogen, sulfur, silicon, phosphorus, and the like either may or may not be present in the aryl group), in one embodiment with at least about 4 carbon atoms, in another embodiment with at least about 5 carbon atoms, and in yet another embodiment with at least about 6 carbon atoms, and in one embodiment with no more than about 14 carbon atoms, in another embodiment with no more than about 12 carbon atoms, and in yet another embodiment with no more than about 10 carbon atoms, although the number of carbon atoms can be outside of these ranges, an arylalkyl group (including substituted and unsubstituted arylalkyl groups, and wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the aryl portion and the alkyl portion of the arylalkyl group), in one embodiment with at least about 5 carbon atoms, in another embodiment with at least about 6 carbon atoms, and in yet another embodiment with at least about 7 carbon atoms, and in one embodiment with no more than about 50 carbon atoms, in another embodiment with no more than about 23 carbon atoms, and in yet another embodiment with no more than about 11 carbon atoms, although the number of carbon atoms can be outside of these ranges, such as benzyl or the like, or an alkylaryl group (including substituted and unsubstituted alkylaryl groups, and wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the aryl portion and the alkyl portion of the alkylaryl group), in one embodiment with at least about 5 carbon atoms, in another embodiment with at least about 6 carbon atoms, and in yet another embodiment with at least about 7 carbon atoms, and in one embodiment with no more than about 50 carbon atoms, in another embodiment with no more than about 23 carbon atoms, and in yet another embodiment with no more than about 11 carbon atoms, although the number of carbon atoms can be outside of these ranges, such as tolyl or the like, wherein two or more R' groups can be joined together to form a ring, wherein the substituents on the substituted alkyl, aryl, arylalkyl, and alkylaryl groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring. Because the alkyl, aryl, arylalkyl, and alkyl groups can include heteroatoms therein, the possibilities for R' as defined also include alkoxy groups, aryloxy groups, arylalkyloxy groups, alkylaryloxy groups, polyalkyleneoxy groups, including (but not limited to) those wherein each repeat alkylene oxide unit, independently of the others in the polyalkyleneoxy group, has in one embodiment at least about 2 carbon atoms, and in one embodiment no more than about 100 carbon atoms, in another embodiment no more than about 20 carbon atoms, and in yet another embodiment no more than about 6 carbon atoms, although the number of carbon atoms can be outside of these ranges, and wherein the polyalkyleneoxy group can contain two or more different kinds of repeat alkylene oxide repeat monomer units (such as block or random copolymers of polyethylene oxide and polypropylene oxide or the like), the polyalkyleneoxy group having in one embodiment at least about 2 repeat alkyleneoxy units, and in one embodiment no more than about 500 repeat alkyleneoxy units, in another embodiment no more than about 10 repeat alkyleneoxy units, and in yet another embodiment no more than about 4 repeat alkyleneoxy units, although the number of repeat alkyleneoxy units can be outside of these ranges. These monofunctional phenols can also, in some instances, reduce or eliminate crosslinking in the branched polyarylene ether polymer prepared as disclosed herein. Specific examples of suitable materials of this formula include (but are not limited to) 2-methyl phenol, 3-methyl phenol, 4-methyl phenol, 2-ethyl phenol, 3-ethyl phenol, 4-ethyl phenol, 2-n-propyl phenol, 3-n-propyl phenol, 4-n-propyl phenol, 2-isopropyl phenol, 3-isopropyl phenol, 4-isopropyl phenol, 2-n-butyl phenol, 3-n-butyl phenol, 4-n-butyl phenol, 2-isobutyl phenol, 3-isobutyl phenol, 4-isobutyl phenol, 2-sec-butyl phenol, 3-sec-butyl phenol, 4-sec-butyl phenol, 2-t-butyl phenol, 3-t-butyl phenol, 4-t-butyl phenol, all possible isomers (including branched and linear) of pentyl phenol, all possible isomers (including branched and linear) of hexyl phenol, all possible isomers (including branched and linear) of heptyl phenol, all possible isomers (including branched and linear) of octyl phenol, all possible isomers (including branched and linear) of nonyl phenol, all possible isomers (including branched and linear) of decyl phenol, all possible isomers of undecyl phenol, all possible isomers (including branched and linear) of dodecyl phenol, 2-phenyl phenol, 3-phenyl phenol, 4-phenyl phenol, 2-tolyl phenol, 3-tolyl phenol, 4-tolyl phenol, 2-benzyl phenol, 3-benzyl phenol, 4-benzyl phenol, 2-methoxy phenol, 3-methoxy phenol, 4-methoxy phenol, 2-ethoxy phenol, 3-ethoxy phenol, 4-ethoxy phenol, 2-n-propoxy phenol, 3-n-propoxy phenol, 4-n-propoxy phenol, 2-isopropoxy phenol, 3-isopropoxy phenol, 4-isopropoxy phenol, 2-n-butoxy phenol, 3-n-butoxy phenol, 4-n-butoxy phenol, 2-isobutoxy phenol, 3-isobutoxy phenol, 4-isobutoxy phenol, 2-sec-butoxy phenol, 3-sec-butoxy phenol, 4-sec-butoxy phenol, 2-t-butoxy phenol, 3-t-butoxy phenol, 4-t-butoxy phenol, all possible isomers of pentyloxy phenol, all possible isomers (including branched and linear) of hexyloxy phenol, all possible isomers (including branched and linear) of heptyloxy phenol, all possible isomers (including branched and linear) of octyloxy phenol, all possible isomers (including branched and linear) of nonyloxy phenol, all possible isomers (including branched and linear) of decyloxy phenol, all possible isomers (including branched and linear) of undecyloxy phenol, all possible isomers (including branched and linear) of dodecylocy phenol, 2-phenoxy phenol, 3-phenoxy phenol, 4-phenoxy phenol, 2-tolyloxy phenol, 3-tolyloxy phenol, 4-tolyloxy phenol, 2-benzyloxy phenol, 3-benzyloxy phenol, 4-benzyloxy phenol, 2-(polyethyleneoxy) phenol, 3-(polyethyleneoxy) phenol, 4-(polyethyleneoxy) phenol, 2-(polypropyleneoxy) phenol, 3-(polypropyleneoxy) phenol, 4-(polypropyleneoxy) phenol, 2-(polybutyleneoxy) phenol, 3-(polybutyleneoxy) phenol, 4-(polybutyleneoxy) phenol, all 2,3-disubstituted variants of the above compounds, all 2,4-disubstituted variants of the above compounds, all 2-5-disubstituted variants of the above compounds, all 2-6-disubstituted variants of the above compounds, all 3,4-disubstituted variants of the above compounds, all 3,5-disubstituted variants of the above compounds, all 2,3,4- trisubstituted variants of the above compounds, all 2,3,5-trisubstituted variants of the above compounds, all 2,3,6-trisubstituted variants of the above compounds, all 2,4,5-trisubstituted variants of the above compounds, all 2,4,6-trisubstituted variants of the above compounds, all 3,4,5-trisubstituted variants of the above compounds, all 3,4,6-trisubstituted variants of the above compounds, all 2,3,4,5-tetrasubstituted variants of the above compounds, all 2,3,4,6-tetrasubstituted variants of the above compounds, all 2,3,5,6-tetrasubstituted variants of the above compounds, all pentasubstituted variants of the above compounds, mononaphthols, such as 1-naphthol and 2-naphthol, and the like, as well as mixtures thereof.

When the optional monophenolic compound of the formula

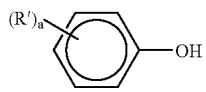

is present, generally the reaction mixture also contains one or more dihalide monomers of the formula

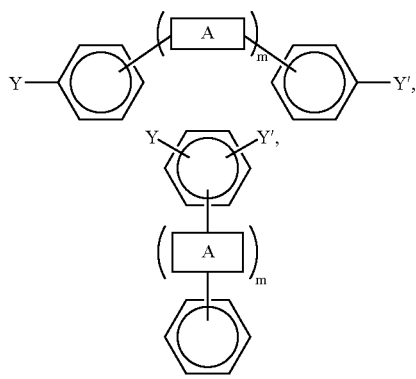

or mixtures thereof, wherein A and m are as defined hereinabove and Y and Y' each, independently of the other, is a fluorine atom or a chlorine atom. Specific examples of suitable materials of the formula

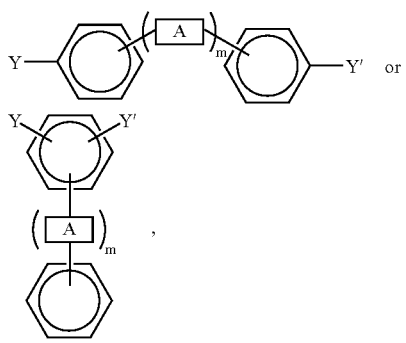

include (but are not limited to) 4,4'-difluorobenzophenone, of the formula

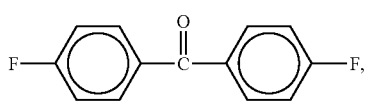

4,4'-dichlorobenzophenone, of the formula

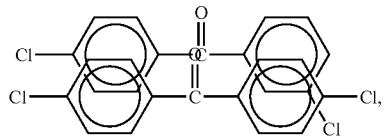

3,4'-difluorobenzophenone, of the formula

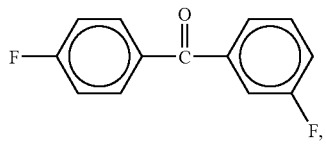

3,4'-dichlorobenzophenone, of the formula

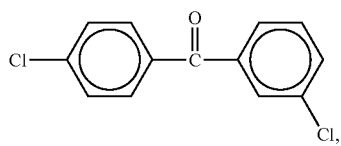

3,3'-difluorobenzophenone, of the formula

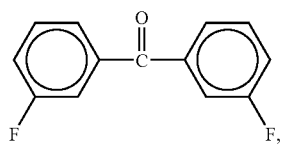

3,3'-dichlorobenzophenone, of the formula

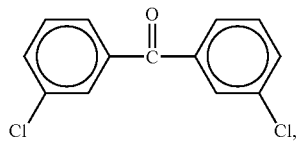

2,4'-difluorobenzophenone, of the formula

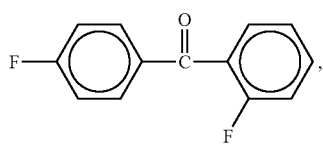

2,4'-dichlorobenzophenone, of the formula
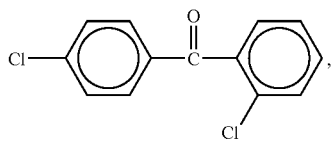
2,3'-difluorobenzophenone, of the formula
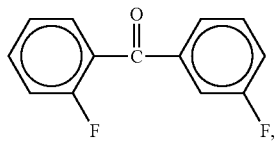
2,3'-dichlorobenzophenone, of the formula
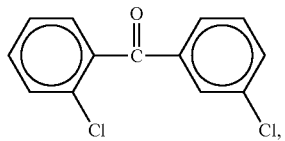
2,2'-difluorobenzophenone, of the formula
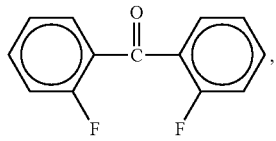
2,2'-dichlorobenzophenone, of the formula
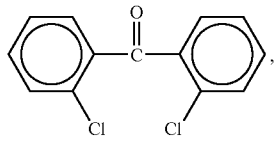
compounds of the formulae
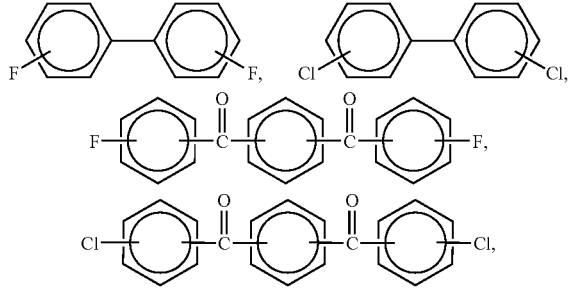
-continued
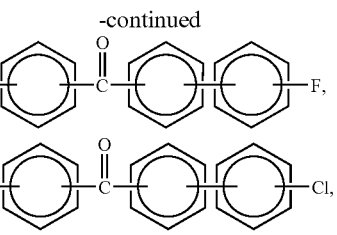
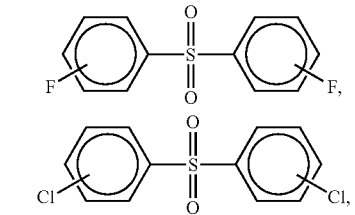
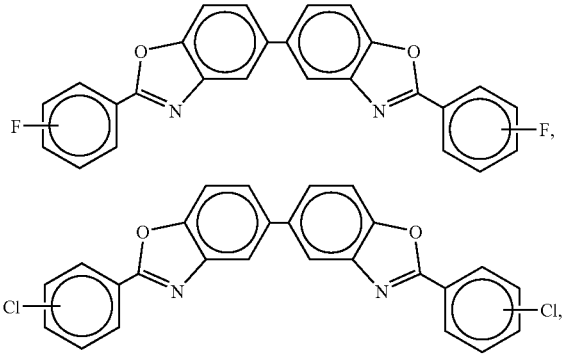
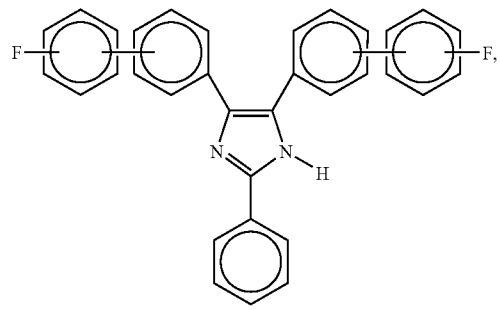
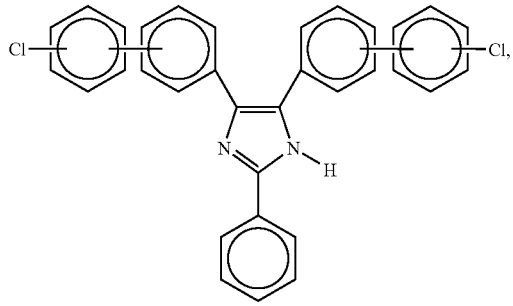
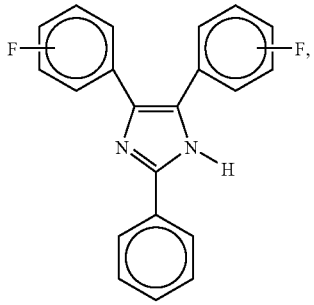

-continued

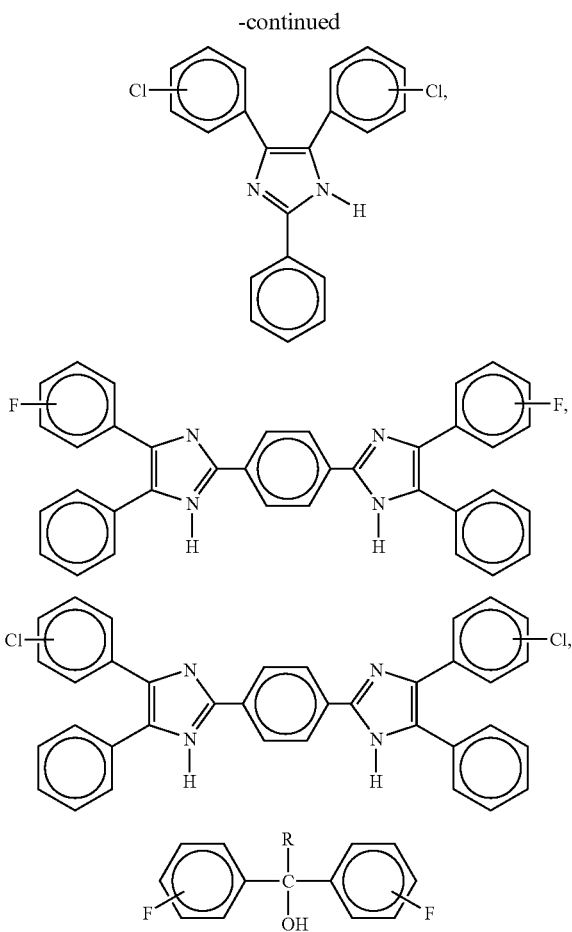

wherein R is a hydrogen atom, an alkyl group, an aryl group, an arylalkyl group, an alkylaryl group, or mixtures thereof,

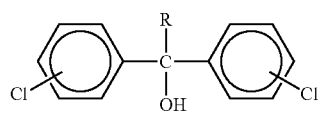

wherein R is a hydrogen atom, an alkyl group, an aryl group, an arylalkyl group, an alkylaryl group, or mixtures thereof,

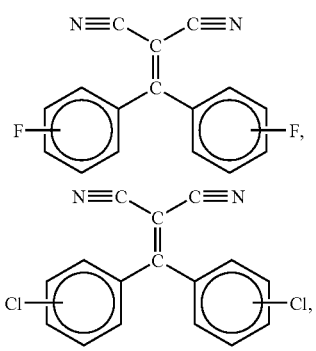

-continued

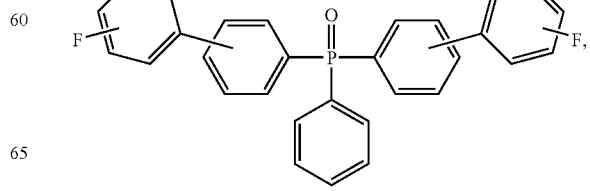

wherein $R_x$ is an alkylene group, an arylene group, an arylalkylene group, an alkylarylene group, or mixtures thereof, wherein $R_x$ is an alkylene group, an arylene group, an arylalkylene group, an alkylarylene group, or mixtures thereof, -continued -continued

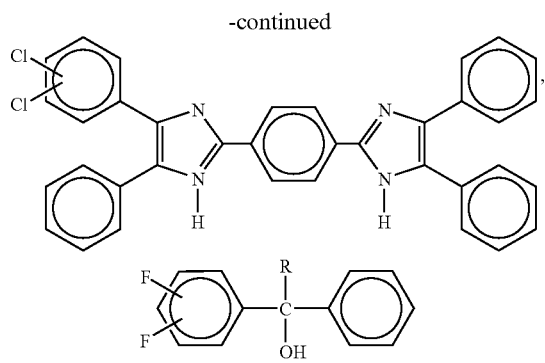

wherein R is a hydrogen atom, an alkyl group, an aryl group, an arylalkyl group, an alkylaryl group, or mixtures thereof,

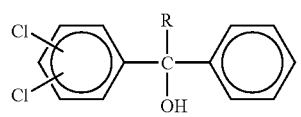

wherein R is a hydrogen atom, an alkyl group, an aryl group, an arylalkyl group, an alkylaryl group, or mixtures thereof,

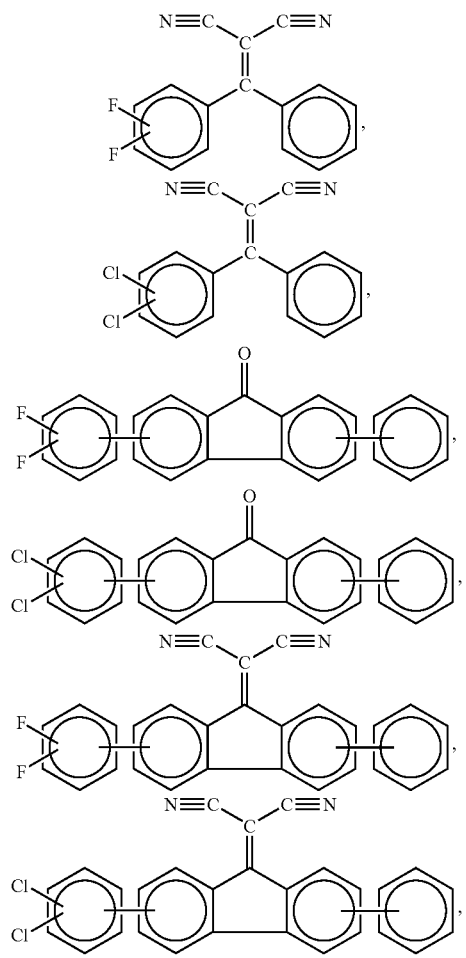

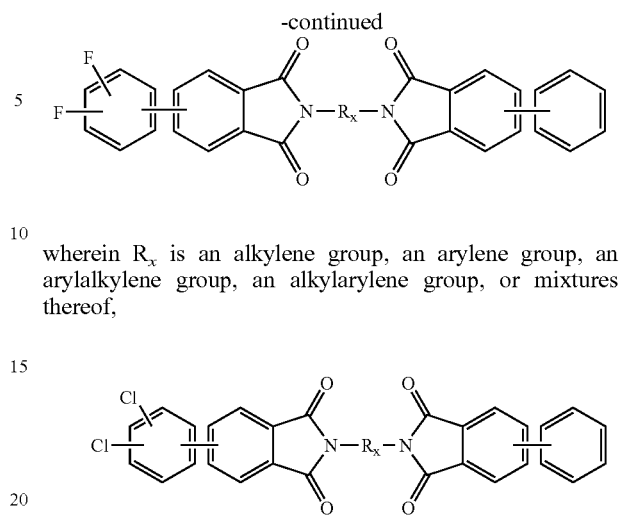

wherein $R_x$ is an alkylene group, an arylene group, an arylalkylene group, an alkylarylene group, or mixtures thereof, wherein $R_x$ is an alkyl group, an aryl group, an arylalkyl group, an alkylaryl group, or mixtures thereof,

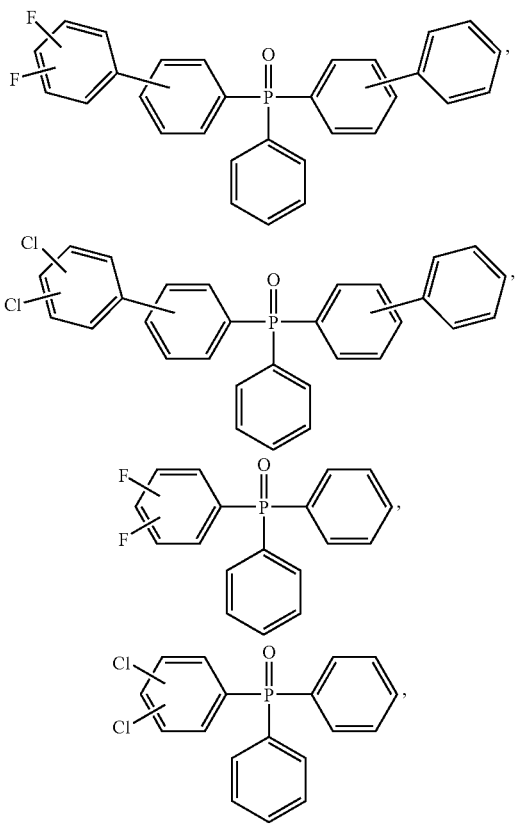

and the like. In addition, Y and Y' need not be the same within a molecule, and one can be fluorine while the other is chlorine, as in the case of a fluorochlorobenzophenone. Mixtures of two or more compounds of this formula can also be employed. In this embodiment, the dihalogenated compound is present in the reaction mixture in any desired or effective amount, in one embodiment at least about 0.4 mole of dihalogenated compound per every one mole of monophenolic phenol compound, and in one embodiment no more than about 0.6 mole of dihalogenated compound per every one mole of monophenolic phenol compound, although the relative amounts can be outside of these ranges.

A dihalogenated monomer of the formula

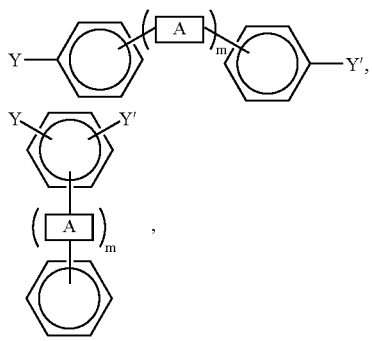

or mixtures thereof can also be added to the reaction mixture even in the absence of a monophenolic endcapping compound if it is desired to terminate the branched polymers with groups other than phenolic groups or those corresponding to the monophenolic endcapping compound. For example, halogen-terminated polymers can be prepared by including in the reaction mixture one or more dihalogenated monomers in an amount corresponding stoichiometrically to the polyfunctional phenol functional groups. For example, when the polyfunctional phenol is a trifunctional phenol, in one embodiment, at least about 1.4 moles of dihalogenated monomers are present per every one mole of trifunctional phenol, and in another embodiment no more than about 1.6 moles of dihalogenated monomers are present per every one mole of trifunctional phenol, although the relative amounts can be outside of these ranges.

The reaction mixture also contains a carbonate base. The carbonate base can be any desired material, such as lithium carbonate, sodium carbonate, potassium carbonate, cesium carbonate, or the like. The carbonate base is present in the reaction mixture in any desired or effective amount, generally in a molar excess with respect to the polyfunctional phenol and, if present, the optional monophenol. For example, the carbonate base can be present in an amount of in one embodiment at least about 10 moles of carbonate base per every mole of polyfunctional phenol, in another embodiment at least about 25 moles of carbonate base per every mole of polyfunctional phenol, and in yet another embodiment at least about 50 moles of carbonate base per every mole of polyfunctional phenol, although the amount can be outside of these ranges. When the optional monophenol is present, an additional amount of polycarbonate can be added in an amount of in one embodiment at least about 3 moles of carbonate base per every one mole of monofunctional phenol, in another embodiment at least about 8 moles of carbonate base per every one mole of monofunctional phenol, and in yet another embodiment at least about 16 moles of carbonate base per every one mole of monofunctional phenol, although the amount can be outside of these ranges.

Further information regarding the optional end-capping additive and the carbonate base are disclosed in, for example, Copending Application U.S. Ser. No. 10/040,850, the disclosure of which is totally incorporated herein by reference.

The material of the formula Ar(OH)$_x$, the polymer or polymers of the formula

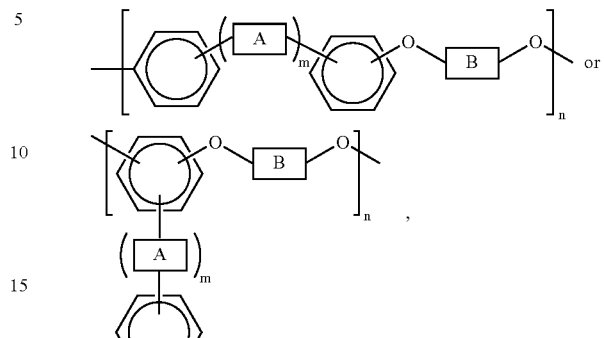

and, if present, the optional material of the formula

are each present in the reaction mixture in any desired or effective amounts, in one embodiment such that the total solids content (i.e. the sum total amount of each of these three materials) in the reaction mixture is at least about 1 percent by weight solids content, in another embodiment at least about 20 percent by weight solids content, and in yet another embodiment at least about 25 percent by weight solids content, and in one embodiment no more than about 75 percent by weight solids content, in another embodiment no more than about 50 percent by weight solids content, and in yet another embodiment no more than about 45 percent by weight solids content, although the solids content of the reaction mixture can be outside of these ranges.

The reaction mixture is heated to any effective temperature for reaction to take place. When an optional solvent is used, for example, the temperature can be that at which reflux occurs. This temperature generally depends on the solvent employed and on the pressure at which the reaction is carried out. For example, when carried out at 1 atmosphere of pressure with an N,N-dimethylacetamide solvent, the reaction temperature is in one embodiment at least about 145° C., in another embodiment at least about 155° C., and in yet another embodiment at least about 160° C., and in one embodiment no more than about 200° C., in another embodiment no more than about 180° C., and in yet another embodiment no more than about 170° C., although the temperature can be outside of these ranges.

Heating of the reaction mixture occurs for any period of time effective to complete the polymerization reaction. Completion of the reaction can be determined when 3 consecutive samples of polymer taken from the reactor at periods of from about 10 to about 30 minutes apart exhibit about the same molecular weight value (±about 500 Daltons) and about the same polydispersity value (±about 2). Reaction times are in one embodiment at least about 4 hours, in another embodiment at least about 6 hours, and in yet another embodiment at least about 8 hours, and in one embodiment no more than about 10 hours, in another embodiment no more than about 9 hours, and in yet another embodiment no more than about 8.5 hours, although the reaction time can be outside of these ranges.

Water is generated during the reaction, and this water is removed from the reaction mixture because of the instability of phenoxide compounds in the presence of water. One method of removing water is by azeotropic distillation with a solvent such as toluene. Any other desired or effective method for removing water from the reaction mixture can also be employed. The toluene is present in the reaction mixture in any effective amount, in one embodiment at least about 1 percent by weight of the reactor contents, and in another embodiment at least about 12 percent by weight of the reactor contents, and in one embodiment no more than about 30 percent by weight of the reactor contents, and in another embodiment no more than about 15 percent by weight of the reactor contents, although the amount of toluene can be outside of these ranges.

The polymer formed by the process disclosed herein can be of any desired molecular weight. In one specific embodiment, the weight average molecular weight ($M_w$) in Daltons is in one embodiment at least about 2,000 in another embodiment at least about 4,000, and in yet another embodiment at least about 8,000, and in one embodiment no more than about 500,000, in another embodiment no more than about 250,000, and in yet another embodiment no more than about 100,000, although the weight average molecular weight can be outside of these ranges. The number average molecular weight (Mn) is in one embodiment at least about 2,000, in another embodiment at least about 4,000, and in yet another embodiment at least about 8,000, and in one embodiment no more than about 500,000, in another embodiment no more than about 250,000, and in yet another embodiment no more than about 100,000, although the number average molecular weight can be outside of these ranges.

Molecular weight values recited herein are values measured using gel permeation chromatography and are relative to polystyrene standards.

The polyfunctional phenol material of the formula Ar(OH)$_x$ and the linear polymer or polymers of the formula

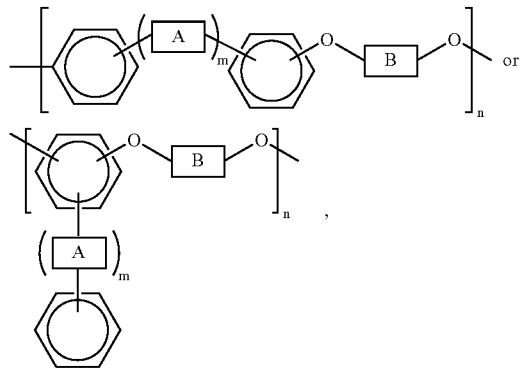

are present in the reaction mixture in any desired or effective relative amounts. The ratio of linear polymer to polyfunctional phenol material is in one embodiment at least about 2 moles of linear polymer per every one mole of polyfunctional phenol material, in another embodiment at least about 5 moles of linear polymer per every one mole of polyfunctional phenol material, and in yet another embodiment at least about 10 moles of linear polymer per every one mole of polyfunctional phenol material, and in one embodiment no more than about 250 moles of linear polymer per every one mole of polyfunctional phenol material, in another embodiment no more than about 175 moles of linear polymer per every one mole of polyfunctional phenol material, and in yet another embodiment no more than about 100 moles of linear polymer per every one mole of polyfunctional phenol material, although the relative amounts of linear polymer and polyfunctional phenol material can be outside of these ranges.

When an optional monofunctional phenol compound is present in the reaction mixture, the polyfunctional phenol material of the formula Ar(OH)$_x$ and the monofunctional phenol compound of the formula

are present in the reaction mixture in any desired or effective relative amounts. The ratio of polyfunctional phenol material to monofunctional phenol is in one embodiment at least about 0.1 mole of polyfunctional phenol material per every one mole of monofunctional phenol, in another embodiment at least about 0.25 mole of polyfunctional phenol material per every one mole of monofunctional phenol, and in yet another embodiment at least about 0.33 mole of polyfunctional phenol material per every one mole of monofunctional phenol, and in one embodiment no more than about 1 mole of polyfunctional phenol material per every one mole of monofunctional phenol, in another embodiment no more than about 0.66 mole of polyfunctional phenol material per every one mole of monofunctional phenol, and in yet another embodiment no more than about 0.5 mole of polyfunctional phenol material per every one mole of monofunctional phenol, although the relative amounts of polyfunctional phenol material and monofunctional phenol can be outside of these ranges.

When an optional monofunctional phenol compound is present in the reaction mixture, the linear polymer of the formula

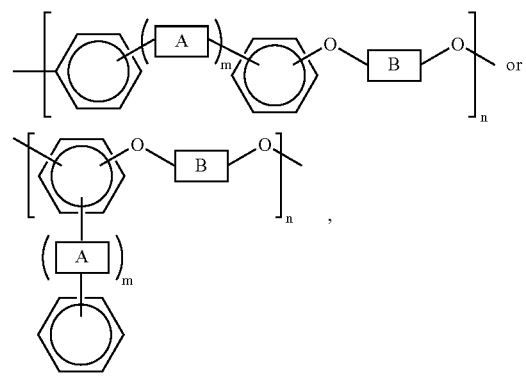

and the monofunctional phenol compound of the formula

are present in the reaction mixture in any desired or effective relative amounts. The ratio of linear polymer to monofunctional phenol is in one embodiment at least about 2 moles of linear polymer per every one mole of monofunctional phenol, in another embodiment at least about 4 moles of linear polymer per every one mole of monofunctional phenol, and in yet another embodiment at least about 6 moles of linear polymer per every one mole of monofunctional phenol, and in one embodiment no more than about 10 moles of linear polymer per every one mole of monofunctional phenol, in another embodiment no more than about 8 moles of linear polymer per every one mole of monofunctional phenol, and in yet another embodiment no more than about 7 moles of linear polymer per every one mole of monofunctional phenol, although the relative amounts of linear polymer and monofunctional phenol can be outside of these ranges.

While not being limited to any particular theory, it is believed that formation of the branched portions of the polymer occurs when the carbonate base (potassium carbonate in the illustrated examples) reacts with the hydroxy groups on the polyfunctional phenol compound to form a salt:

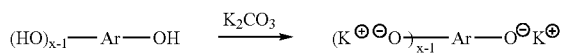

Thereafter, the polyfunctional phenol compound initiates a nucleophilic aromatic substitution reaction with halogen-terminated endgroups on the linear polymers, as follows (illustrated in the following examples for the situation wherein Y is a fluorine atom):

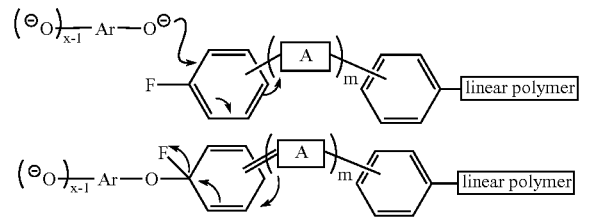

For example, when the "A" group is >C=O, m is 1, and the bond between the phenyl group and the "A" group is para to the fluorine atom, this process occurs as follows:

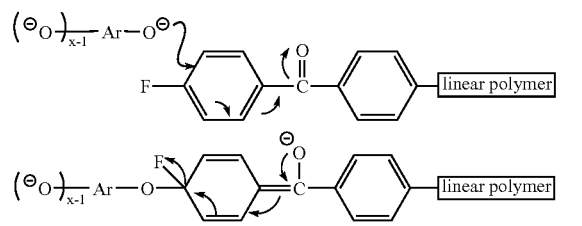

The polyfunctional phenol compound thus becomes bonded through the oxygen atom to the phenyl ring on the "A" moiety:

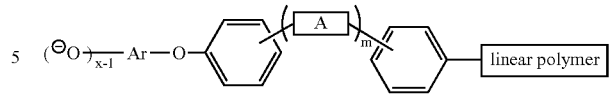

and a branched moiety is formed:

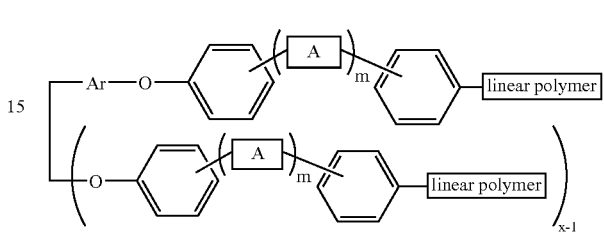

When the optional monophenolic compound is present, the reaction involving the endcapping monophenolic compound (illustrated here for a compound having a single R' group) is believed to proceed by a similar mechanism:

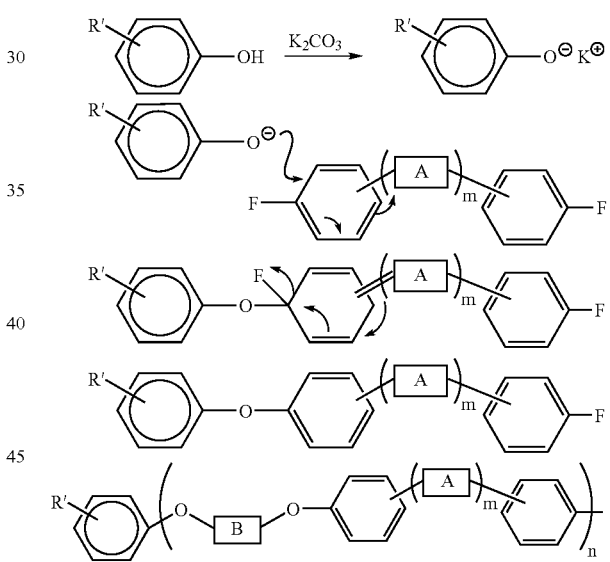

It is also believed that the polyfunctional phenol compound of the formula $Ar(OH)_x$, any phenol-terminated linear polymers, and the monophenolic compound can each initiate a chain cleavage reaction with linear polymer chains, as follows (with all three reactants generalized in the illustrated reaction mechanism as a square with an attached anionic oxygen atom):

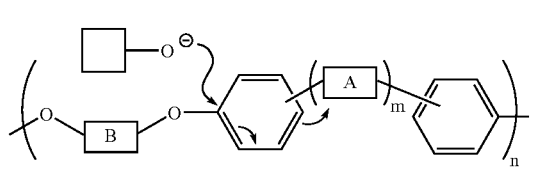

-continued

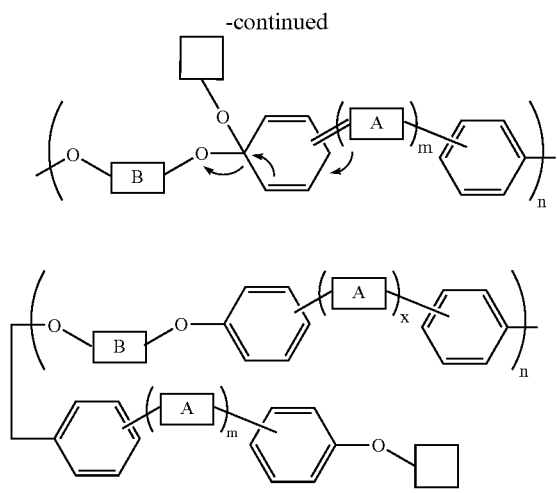

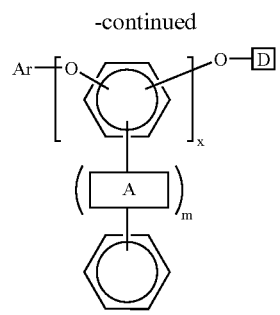

wherein each Ar, independently of the others, is an aryl moiety or an alkylaryl moiety, provided that when Ar is an alkylaryl moiety at least three

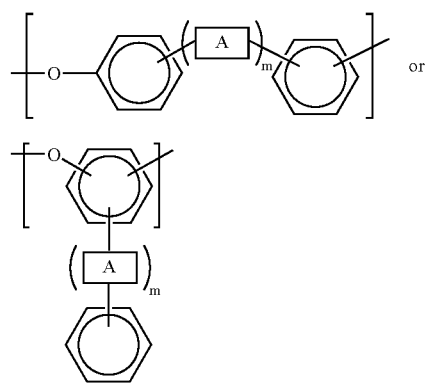

repeating groups are bonded to an aryl portion thereof through the oxygen atoms in the repeating groups, each x, independently of the others, is an integer of 3 or greater, each m, independently of the others, is an integer of 0 or 1, each D, independently of the others, is either (a) another branch point, (b) a terminal group, or (c) of the formula

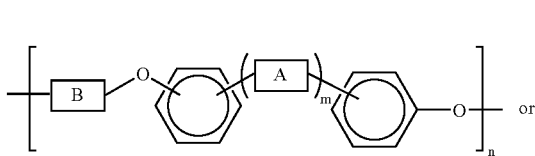

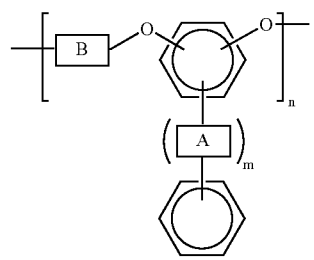

wherein each n, independently of the others, is an integer representing the number of repeat monomer units, each A, independently of the others, is Again, while not being limited to any particular theory, it is believed that the polyfunctional phenol compound, any phenol-terminated linear polymers, and the monophenolic compound all react freely with any halogen-terminated linear polymers, and that there is a constant scrambling of the polymeric chains in an equilibrium state of chain scission and recombination. Accordingly, the entire branched polymer reaches a state of equilibrium under the polymerization conditions. In addition, the optional monofunctional phenol endcapping agent works effectively even if it is added at the beginning of the reaction, and it does not broaden the molecular weight distribution of the system. Further, the optional monofunctional phenol can control the polydispersity and the molecular weight of the resulting polymer by establishment of an equilibrium that balances all of the thermodynamic forces at play in the system. The molecular weight of the branched polyarylene ethers prepared by the process of the present invention can be controlled by varying the stoichiometry of the starting materials, and during the process the molecular weight reaches a nearly constant value after which it neither rises further nor falls further.

The resulting absolute molecular weight of the branched polymer thus formed will very likely not change from that of the linear polymer or polymers used as starting materials, but the measured molecular weight by gas phase chromatography, as indicated by a longer retention time, will very likely decrease, since the hydrodynamic volume of a branched polymer tends to be less than the hydrodynamic volume of its linear analog. The magnitude of the measured decrease in hydrodynamic volume will tend to be proportional to the number of branched points in the polymer.

It is believed that the polymers formed by this process are branched polyarylene ether polymers which comprise a plurality of branch points, each branch point being of the formula

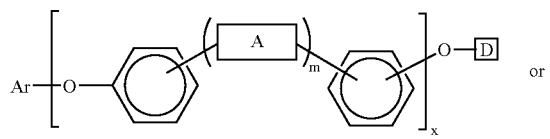

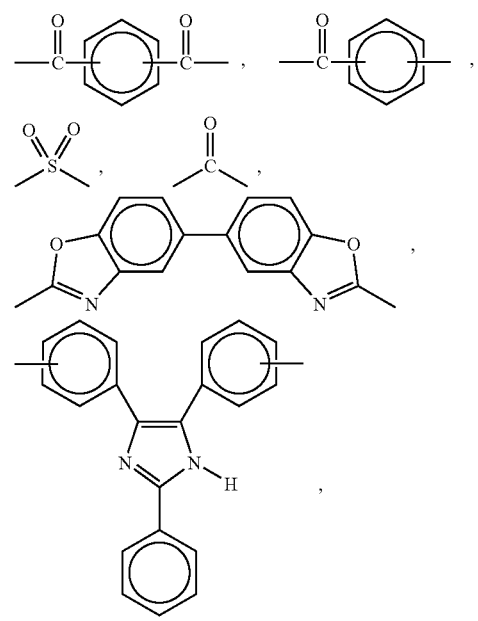
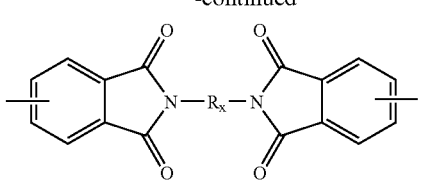
wherein $R_x$ is an alkylene group, an arylene group, an arylalkylene group, an alkylarylene group, or mixtures thereof,
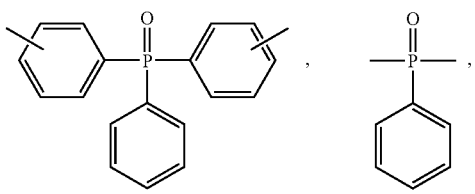
mixtures thereof, each B, independently of the others, is
wherein R is a hydrogen atom, an alkyl group, an aryl group, an arylalkyl group, an alkylaryl group, or mixtures thereof,

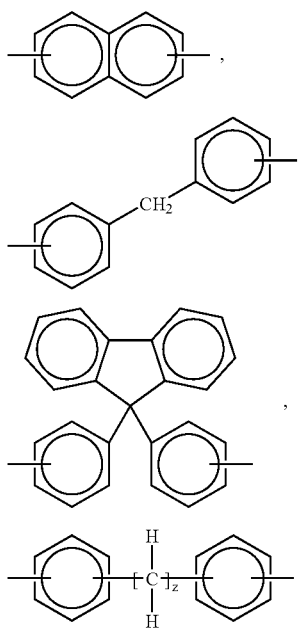
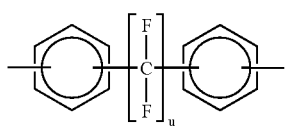
wherein z is an integer of from 2 to about 20,
wherein u is an integer of from 1 to about 20,
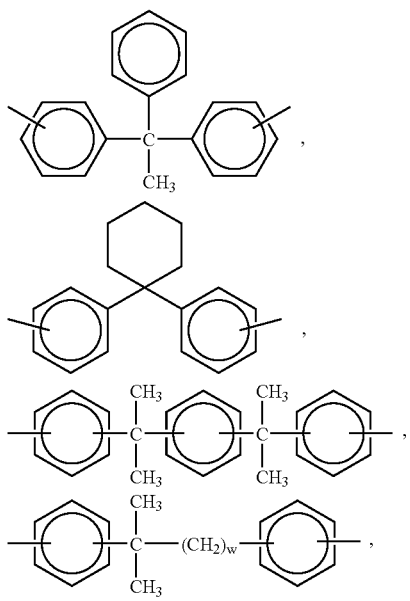
wherein w is an integer of from 1 to about 20,
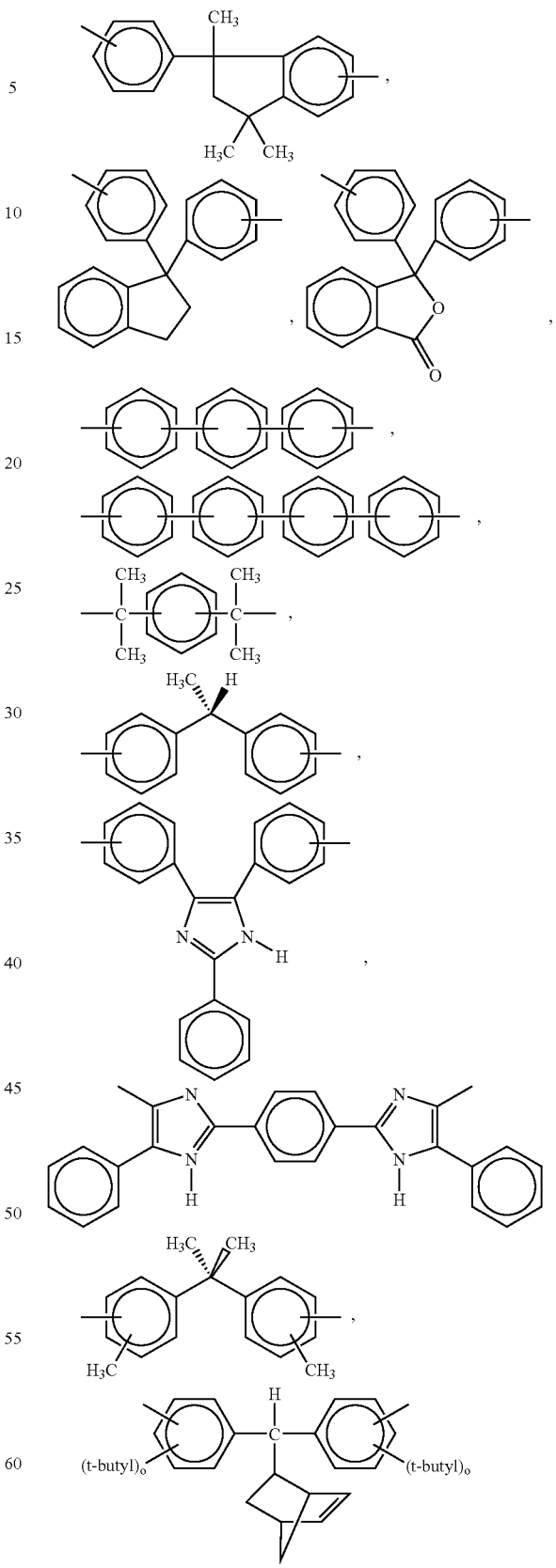
wherein each o, independently of the other, is an integer of 1, 2, 3, or 4,

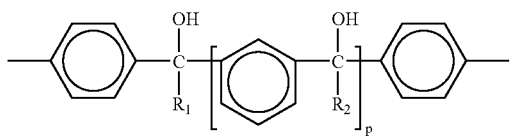

wherein $R_1$ and $R_2$ each, independently of the other, are hydrogen atoms, alkyl groups, aryl groups, arylalkyl groups, alkylaryl groups, or mixtures thereof, and p is an integer of 0 or 1,

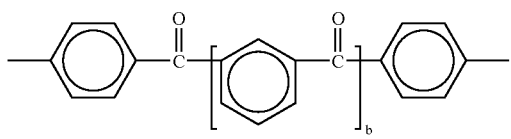

wherein b is an integer of 0 or 1,

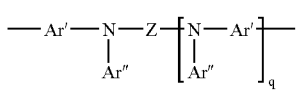

wherein (1) Z is

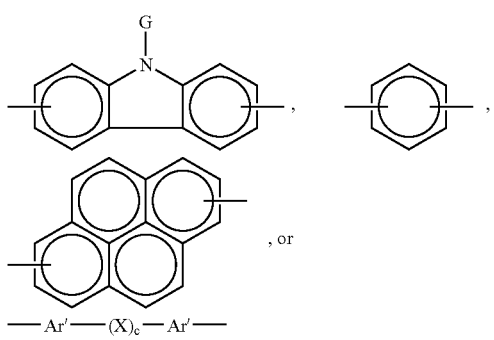

wherein c is 0 or 1; (2) Ar' is

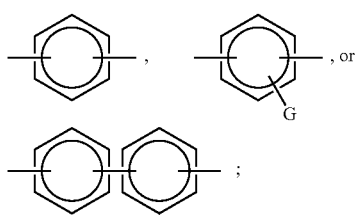

(3) G is an alkyl group selected from alkyl groups containing from about 2 to about 10 carbon atoms; (4) Ar" is

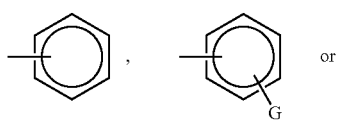

-continued

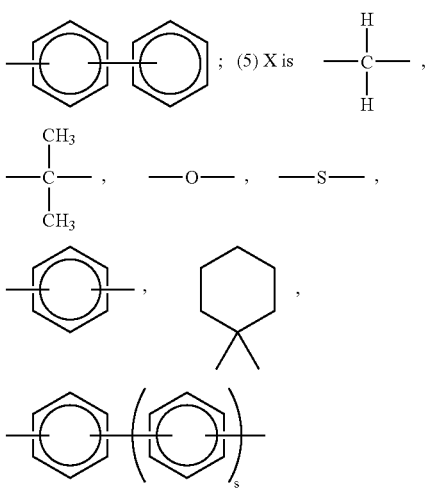

wherein s is 0, 1, or 2,

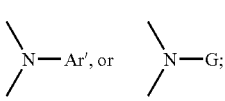

and (6) q is 0 or 1; or mixtures thereof. It is believed that these branched polyarylene ether polymers are of the formula

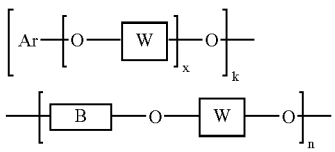

wherein each Ar, independently of the others, is an aryl moiety or an alkylaryl moiety, provided that when Ar is an alkylaryl moiety at least three

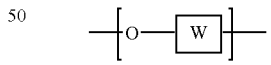

repeating groups are bonded to an aryl portion thereof through the oxygen atoms in the repeating groups, each x, independently of the others, is an integer of 3 or greater, each k and each n, independently of the others, are integers representing the number of repeat monomer units, each W, independently of the others, is

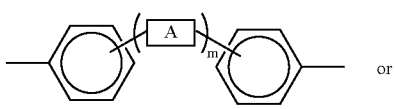 or

-continued

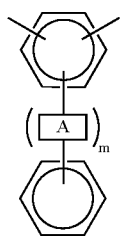

wherein each m, independently of the others, is an integer of 0 or 1, each A, independently of the others, is

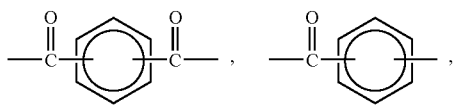

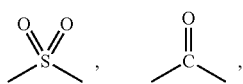

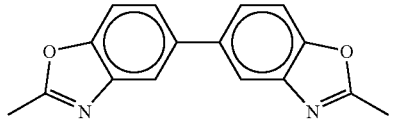

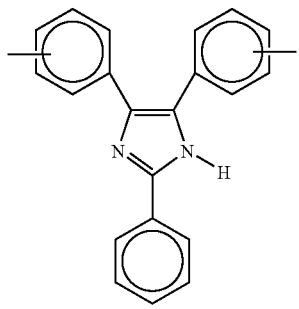

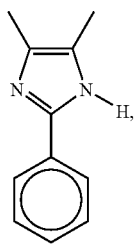

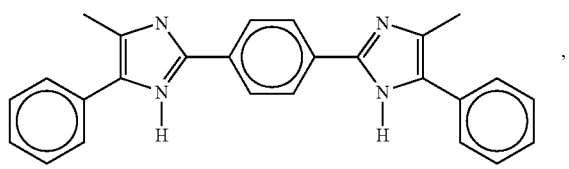

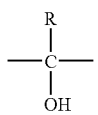

wherein R is a hydrogen atom, an alkyl group, an aryl group, an arylalkyl group, an alkylaryl group, or mixtures thereof,

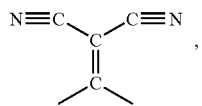

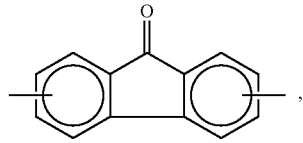

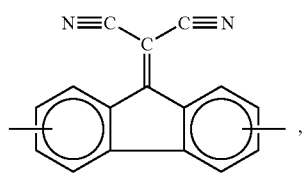

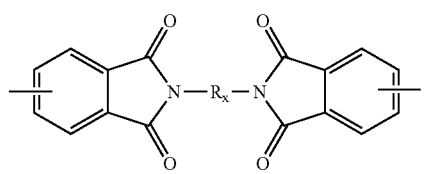

wherein $R_x$ is an alkylene group, an arylene group, an arylalkylene group, an alkylarylene group, or mixtures thereof,

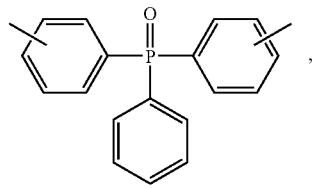 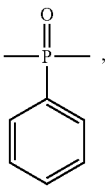

or mixtures thereof, each B, independently of the others, is

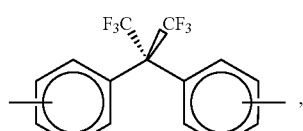

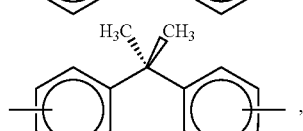

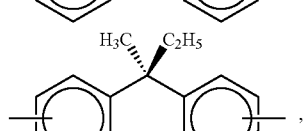

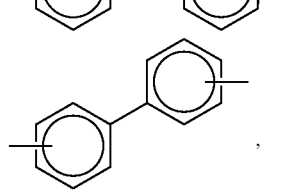

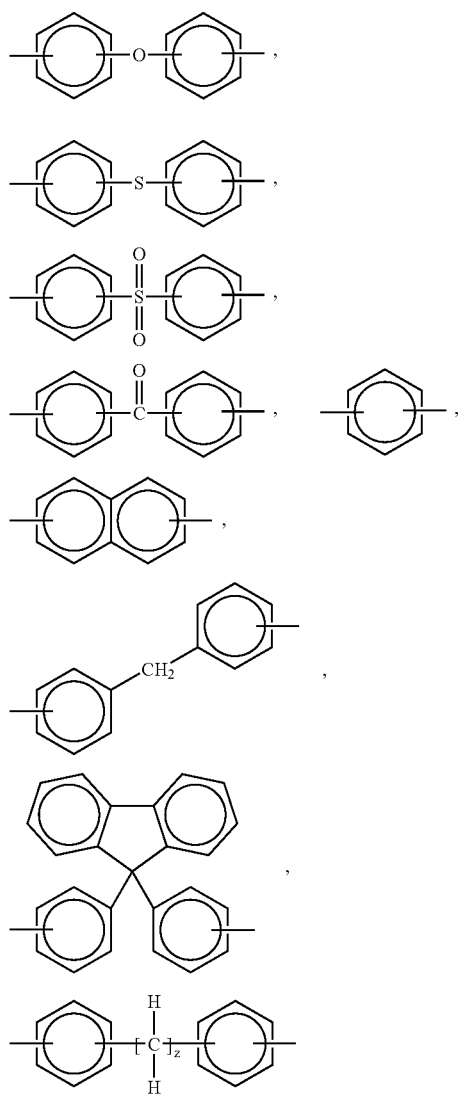
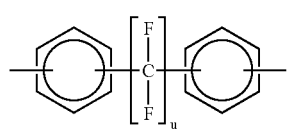
wherein z is an integer of from 2 to about 20,
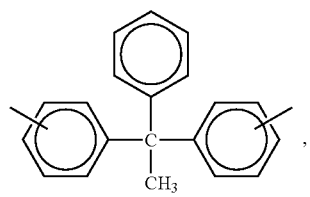
wherein u is an integer of from 1 to about 20,
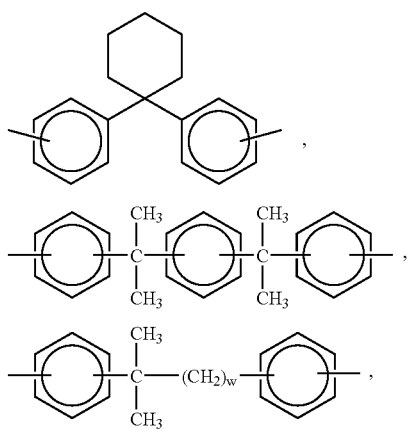
wherein w is an integer of from 1 to about 20,
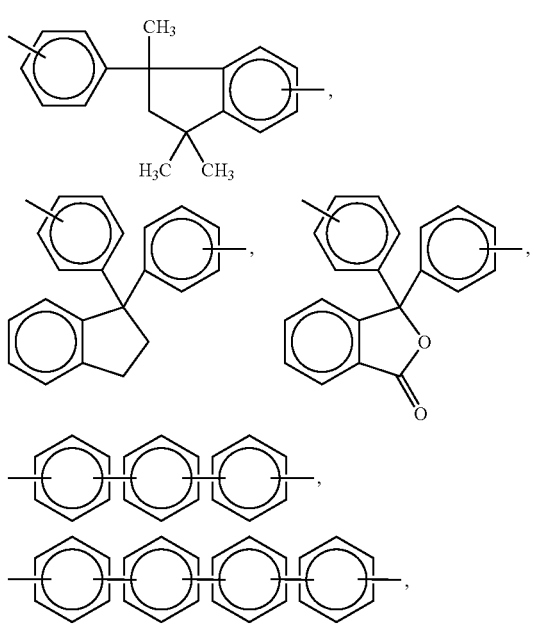
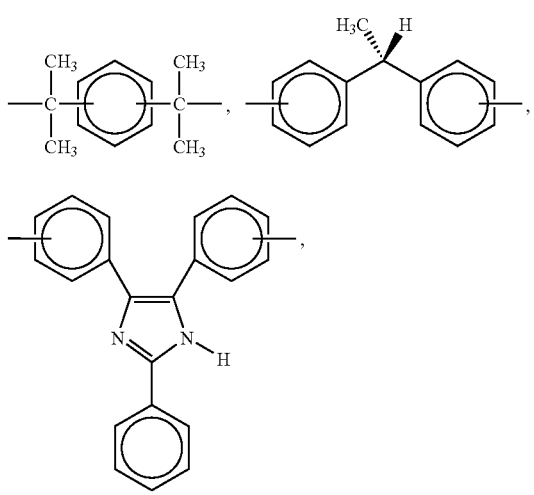

-continued

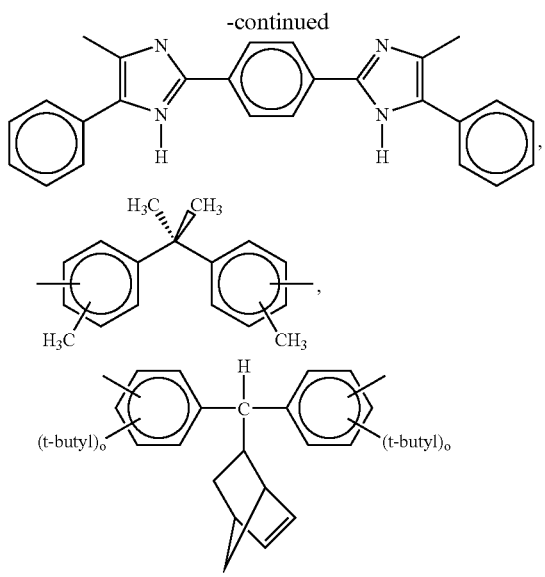

wherein each o, independently of the other, is an integer of 1, 2, 3, or 4,

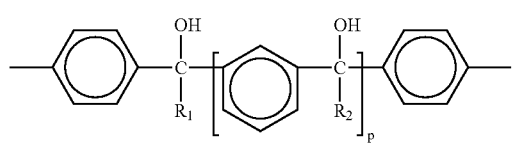

wherein $R_1$ and $R_2$ each, independently of the other, are hydrogen atoms, alkyl groups, aryl groups, arylalkyl groups, alkylaryl groups, or mixtures thereof, and p is an integer of 0 or 1,

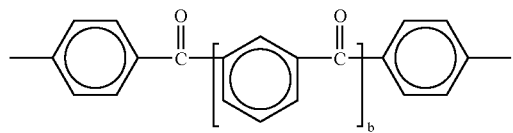

wherein b is an integer of 0 or 1,

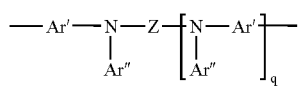

wherein (1) Z is

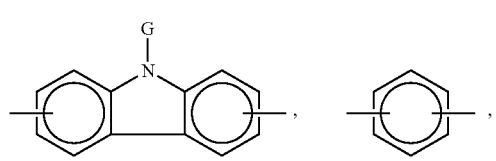

-continued

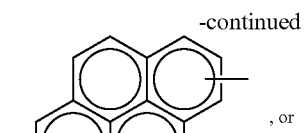

wherein c is 0 or 1; (2) Ar′ is

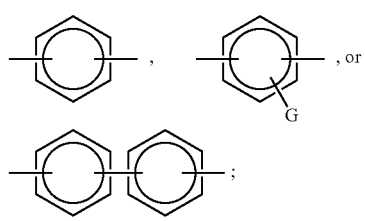

(3) G is an alkyl group selected from alkyl groups containing from about 2 to about 10 carbon atoms; (4) Ar″ is

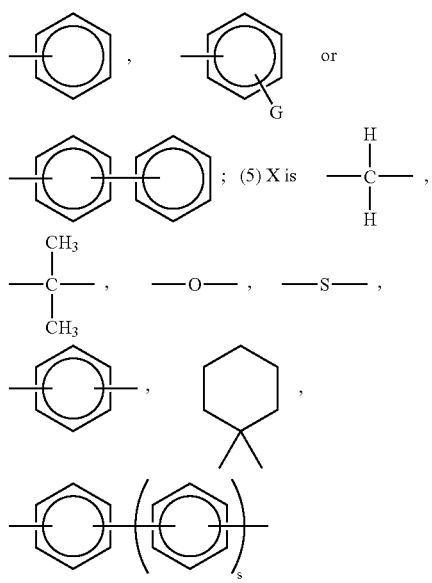

wherein s is 0, 1, or 2,

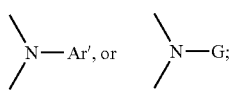

and (6) q is 0 or 1; or mixtures thereof.

Also disclosed herein are imaging members which comprise a conductive substrate, a photogenerating material, and a binder which comprises a polymer prepared as disclosed herein. Examples of suitable imaging member configurations are illustrated in the Figures of, for example, U.S. Pat. No. 6,174,636, the disclosure of which is totally incorporated herein by reference.

The substrate can be formulated entirely of an electrically conductive material, or it can be an insulating material having an electrically conductive surface. The substrate is of any desired or effective thickness, generally up to about 100 mils, and in one embodiment from about 1 to about 50 mils, although the thickness can be outside of this range. The thickness of the substrate layer depends on many factors, including economic and mechanical considerations. Thus, this layer can be of substantial thickness, for example over 100 mils, or of minimal thickness provided that there are no adverse effects on the system. Similarly, the substrate can be either rigid or flexible. In a specific embodiment, the thickness of this layer is from about 3 mils to about 10 mils. For flexible belt imaging members, substrate thicknesses include (but are not limited to) those from about 65 to about 150 microns, and in a more specific embodiment from about 75 to about 100 microns for optimum flexibility and minimum stretch when cycled around small diameter rollers of, for example, 19 millimeter diameter.

The substrate can be opaque or substantially transparent and can comprise numerous suitable materials having the desired mechanical properties. The entire substrate can comprise the same material as that in the electrically conductive surface or the electrically conductive surface can be merely a coating on the substrate. Any suitable electrically conductive material can be employed. Examples of electrically conductive materials include copper, brass, nickel, zinc, chromium, stainless steel, conductive plastics and rubbers, aluminum, semitransparent aluminum, steel, cadmium, silver, gold, zirconium, niobium, tantalum, vanadium, hafnium, titanium, nickel, chromium, tungsten, molybdenum, paper rendered conductive by the inclusion of a suitable material therein or through conditioning in a humid atmosphere to ensure the presence of sufficient water content to render the material conductive, indium, tin, metal oxides, including tin oxide and indium tin oxide, and the like. The conductive layer can vary in thickness over substantially wide ranges depending on the desired use of the electrophotoconductive member. Generally, the conductive layer ranges in thickness from about 50 Angstroms to many centimeters, although the thickness can be outside of this range. When a flexible electrophotographic imaging member is desired, the thickness of the conductive layer in one embodiment is from about 20 Angstroms to about 750 Angstroms, and in another embodiment is from about 100 to about 200 Angstroms for an optimum combination of electrical conductivity, flexibility, and light transmission. When the 1.0 selected substrate comprises a nonconductive base and an electrically conductive layer coated thereon, the substrate can be of any other conventional material, including organic and inorganic materials. Examples of substrate materials include insulating non-conducting materials such as various resins known for this purpose including polycarbonates, polyamides, polyurethanes, paper, glass, plastic, polyesters such as MYLAR (available from DuPont) or MELINEX 447 (available from ICI Americas, Inc.), and the like. The conductive layer can be coated onto the base layer by any suitable coating technique, such as vacuum deposition or the like. If desired, the substrate can comprise a metallized plastic, such as titanized or aluminized MYLAR, wherein the metallized surface is in contact with the photogenerating layer or any other layer situated between the substrate and the photogenerating layer. The coated or uncoated substrate can be flexible or rigid, and can have any number of configurations, such as a plate, a cylindrical drum, a scroll, an endless flexible belt, or the like. The outer surface of the substrate can comprise a metal oxide such as aluminum oxide, nickel oxide, titanium oxide, or the like.

The photoconductive imaging member can optionally contain a charge blocking layer situated between the conductive substrate and the photogenerating layer. Generally, electron blocking layers for positively charged photoreceptors allow holes from the imaging surface of the photoreceptor to migrate toward the conductive layer, while hole blocking layers for negatively charged photoreceptors allow electrons from the imaging surface of the photoreceptor to migrate toward the conductive layer. This layer can comprise metal oxides, such as aluminum oxide and the like, or materials such as silanes and nylons, nitrogen containing siloxanes or nitrogen containing titanium compounds such as trimethoxysilyl propylene diamine, hydrolyzed trimethoxysilyl propyl ethylene diamine, N-beta-(aminoethyl) gamma-amino-propyl trimethoxy silane, isopropyl 4-aminobenzene sulfonyl, di(dodecylbenzene sulfonyl) titanate, isopropyl di(4-aminobenzoyl)isostearoyl titanate, isopropyl tri(N-ethylamino-ethylamino)titanate, isopropyl trianthranil titanate, isopropyl tri(N,N-dimethyl-ethylamino)titanate, titanium-4-amino benzene sulfonate oxyacetate, titanium 4-aminobenzoate isostearate oxyacetate, $[H_2N(CH_2)_4]$ $CH_3Si(OCH_3)_2$, (gamma-aminobutyl) methyl diethoxysilane, and $[H_2N(CH_2)_3]CH_3Si(OCH_3)_2$ (gamma-aminopropyl) methyl diethoxysilane, as disclosed in U.S. Pat. Nos. 4,291,110, 4,338,387, 4,286,033 and 4,291,110, the disclosures of each of which are totally incorporated herein by reference, or the like. Additional examples of suitable materials include gelatin (e.g. GELATIN 225, available from Knox Gelatine Inc.), and/or CARBOSET 515 (B.F. Goodrich Chemical Company) dissolved in water and methanol, polyvinyl alcohol, polyamides, gamma-aminopropyl triethoxysilane, polyisobutyl methacrylate, copolymers of styrene and acrylates such as styrene/n-butyl methacrylate, copolymers of styrene and vinyl toluene, polycarbonates, alkyl substituted polystyrenes, styrene-olefin copolymers, polyesters, polyurethanes, polyterpenes, silicone elastomers, mixtures or blends thereof, copolymers thereof, and the like. One specific blocking layer comprises a reaction product between a hydrolyzed silane and the oxidized surface of a metal ground plane layer. The oxidized surface inherently forms on the outer surface of most metal ground plane layers when exposed to air after deposition. The primary purpose of this layer is to prevent charge injection from the substrate during and after charging. This layer is in one embodiment of a thickness of less than 50 Angstroms to about 10 microns, in another embodiment being no more than about 2 microns, and in yet another embodiment being no more than about 0.2 microns, although the thickness can be outside these ranges.

The blocking layer can be applied by any suitable conventional technique such as spraying, dip coating, draw bar coating, gravure coating, silk screening, air knife coating, reverse roll coating, vacuum deposition, chemical treatment or the like. For convenience in obtaining thin layers, the blocking layers can be applied in the form of a dilute solution, with the solvent being removed after deposition of the coating by conventional techniques such as by vacuum, heating and the like.

In some cases, intermediate adhesive layers between the substrate and subsequently applied layers can be desirable to improve adhesion. If such adhesive layers are utilized, they can have a dry thickness in one embodiment of from about 0.1 micron to about 5 microns, although the thickness can be outside of this range. Examples of adhesive layers include film-forming polymers such as polyesters, polyvinylbutyrals, polyvinylpyrrolidones, polycarbonates, polyurethanes, polymethylmethacrylates, DUPONT 49,000 (available from E.I. duPont de Nemours and Company), VITEL PE100 (available from Goodyear Tire & Rubber), and the like as well as mixtures thereof. The branched polymers disclosed herein can also be employed in the adhesive layer of the imaging member, either alone or in combination with other materials. Since the surface of the substrate can be a charge blocking layer or an adhesive layer, the expression "substrate" as employed herein is intended to include a charge blocking layer with or without an adhesive layer on a charge blocking layer. Adhesive layer thicknesses are in one embodiment from about 0.05 micron (500 Angstroms) to about 0.3 micron (3,000 Angstroms), although the thickness can be outside of this range. Conventional techniques for applying an adhesive layer coating mixture to the substrate include spraying, dip coating, roll coating, wire wound rod coating, gravure coating, Bird bar applicator coating, slot coating, or the like. Drying of the deposited coating can be effected by any suitable conventional technique, such as oven drying, infra red radiation drying, air drying, or the like.

The photogenerating layer can comprise single or multiple layers comprising inorganic or organic compositions and the like. One example of a generator layer is described in U.S. Pat. No. 3,121,006, the disclosure of which is totally incorporated herein by reference, wherein finely divided particles of a photoconductive inorganic compound are dispersed in an electrically insulating organic resin binder. Multi-photogenerating layer compositions can be utilized where a photoconductive layer enhances or reduces the properties of the photogenerating layer. Examples of this type of configuration are described in U.S. Pat. No. 4,415,639, the disclosure of which is totally incorporated herein by reference. Further examples of photosensitive members having at least two electrically operative layers include the charge generator layer and diamine containing transport layer members disclosed in U.S. Pat. Nos. 4,265,990, 4,233,384, 4,306,008, and 4,299,897, the disclosures of each of which are totally incorporated herein by reference; dyestuff generator layer and oxadiazole, pyrazalone, imidazole, bromopyrene, nitrofluorene and nitronaphthalimide derivative containing charge transport layers members, as disclosed in U.S. Pat. No. 3,895,944, the disclosure of which is totally incorporated herein by reference; generator layer and hydrazone containing charge transport layers members, disclosed in U.S. Pat. No. 4,150,987, the disclosure of which is totally incorporated herein by reference; generator layer and a tri-aryl pyrazoline compound containing charge transport layer members, as disclosed in U.S. Pat. No. 3,837,851, the disclosure of which is totally incorporated herein by reference; and the like.

The photogenerating or photoconductive layer contains any desired or suitable photoconductive material. The photoconductive layer or layers can contain inorganic or organic photoconductive materials. Examples of inorganic photoconductive materials include amorphous selenium, trigonal selenium, alloys of selenium with elements such as tellurium, arsenic, and the like, amorphous silicon, cadmium sulfoselenide, cadmium selenide, cadmium sulfide, zinc oxide, titanium dioxide, and the like. Inorganic photoconductive materials can, if desired, be dispersed in a film forming polymer binder.

Examples of organic photoconductors include various phthalocyanine pigments, such as the X-form of metal free phthalocyanine described in U.S. Pat. No. 3,357,989, the disclosure of which is totally incorporated herein by reference, metal phthalocyanines such as vanadyl phthalocyanine, copper phthalocyanine, and the like, quinacridones, including those available from DuPont as Monastral Red, Monastral Violet and Monastral Red Y, substituted 2,4-diamino-triazines as disclosed in U.S. Pat. No. 3,442,781, the disclosure of which is totally incorporated herein by reference, polynuclear aromatic quinones, Indofast Violet Lake B, Indofast Brilliant Scarlet, Indofast Orange, dibromoanthanthrones such as those available from DuPont as Vat orange 1 and Vat orange 3, squarylium, pyrazolones, polyvinylcarbazole-2,4,7-trinitrofluorenone, anthracene, benzimidazole perylene, polynuclear aromatic quinones available from Allied Chemical Corporation under the tradename Indofast Double Scarlet, Indofast Violet Lake B, Indofast Brilliant Scarlet and Indofast Orange, and the like. Many organic photoconductor materials can also be used as particles dispersed in a resin binder.

Examples of suitable binders for the photoconductive materials include thermoplastic and thermosetting resins such as polycarbonates, polyesters, including polyethylene terephthalate, polyurethanes, polystyrenes, polybutadienes, polysulfones, polyarylethers, polyarylsulfones, polyethersulfones, polyethylenes, polypropylenes, polymethylpentenes, polyphenylene sulfides, polyvinyl acetates, polyvinylbutyrals, polysiloxanes, polyacrylates, polyvinyl acetals, polyamides, polyimides, amino resins, phenylene oxide resins, terephthalic acid resins, phenoxy resins, epoxy resins, phenolic resins, polystyrene and acrylonitrile copolymers, polyvinylchlorides, polyvinyl alcohols, poly-(N-vinylpyrrolidinone)s, vinylchloride and vinyl acetate copolymers, acrylate copolymers, alkyd resins, cellulosic film formers, poly(amideimide), styrene-butadiene copolymers, vinylidenechloride-vinylchloride copolymers, vinylacetate-vinylidenechloride copolymers, styrene-alkyd resins, polyvinylcarbazoles, and the like. These polymers can be block, random or alternating copolymers. The branched polymers as disclosed herein can also be employed in the photoconductive layer of the imaging member, either alone or in combination with other materials.

When the photogenerating material is present in a binder material, the photogenerating composition or pigment can be present in the film forming polymer binder compositions in any suitable or desired amounts. For example, in one embodiment from about 10 percent by volume to about 60 percent by volume of the photogenerating pigment can be dispersed in about 40 percent by volume to about 90 percent by volume of the film forming polymer binder composition, and in another embodiment from about 20 percent by volume to about 30 percent by volume of the photogenerating pigment can be dispersed in about 70 percent by volume to about 80 percent by volume of the film forming polymer binder composition. The photoconductive material is present in the photogenerating layer in an amount in one embodiment of from about 5 to about 80 percent by weight, and in another embodiment from about 25 to about 75 percent by weight, and the binder is present in an amount in one embodiment of from about 20 to about 95 percent by weight, and in another embodiment from about 25 to about 75 percent by weight, although the relative amounts can be outside these ranges.

The particle size of the photoconductive compositions and/or pigments in one embodiment is less than the thickness of the deposited solidified layer, and in another embodiment is between about 0.01 micron and about 0.5 micron to facilitate better coating uniformity.

The photogenerating layer containing photoconductive compositions and the resinous binder material in one embodiment ranges in thickness from about 0.05 micron to about 10 microns or more, in another embodiment being from about 0.1 micron to about 5 microns, and in yet another embodiment having a thickness of from about 0.3 micron to about 3 microns, although the thickness can be outside these ranges. The photogenerating layer thickness is related to the relative amounts of photogenerating compound and binder, with the photogenerating material often being present in amounts of from about 5 to about 100 percent by weight. Higher binder content compositions generally require thicker layers for photogeneration. Generally, it is desirable to provide this layer in a thickness sufficient to absorb about 90 percent or more of the incident radiation which is directed upon it in the imagewise or printing exposure step. The maximum thickness of this layer is dependent primarily upon factors such as mechanical considerations, the specific photogenerating compound selected, the thicknesses of the other layers, and whether a flexible photoconductive imaging member is desired.

The photogenerating layer can be applied to underlying layers by any desired or suitable method. Any suitable technique can be utilized to mix and thereafter apply the photogenerating layer coating mixture. Examples of application techniques include spraying, dip coating, roll coating, wire wound rod coating, and the like. Drying of the deposited coating can be effected by any suitable technique, such as oven drying, infra red radiation drying, air drying, and the like.

Any other suitable multilayer photoconductors can also be employed in the imaging member. Some multilayer photoconductors comprise at least two electrically operative layers, a photogenerating or charge generating layer and a charge transport layer. The charge generating layer and charge transport layer as well as the other layers can be applied in any suitable order to produce either positive or negative charging photoreceptors. For example, the charge generating layer can be applied prior to the charge transport layer, as illustrated in U.S. Pat. No. 4,265,990, or the charge transport layer can be applied prior to the charge generating layer, as illustrated in U.S. Pat. No. 4,346,158, the entire disclosures of these patents being incorporated herein by reference.

When present, the optional charge transport layer can comprise any suitable charge transport material. The active charge transport layer can consist entirely of the desired charge transport material, or can comprise an activating compound useful as an additive dispersed in electrically inactive polymeric materials making these materials electrically active. These compounds can be added to polymeric materials which are incapable of supporting the injection of photogenerated holes from the generation material and incapable of allowing the transport of these holes therethrough, thereby converting the electrically inactive polymeric material to a material capable of supporting the injection of photogenerated holes from the generation material and capable of allowing the transport of these holes through the active layer in order to discharge the surface charge on the active layer. One specific transport layer comprises from about 25 percent to about 75 percent by weight of at least one charge transporting compound, and from about 75 percent to about 25 percent by weight of a polymeric film forming resin in which the aromatic amine is soluble.

Examples of charge transport materials include pure selenium, selenium-arsenic alloys, selenium-arsenic-halogen alloys, selenium-halogen, and the like. Generally, from about 10 parts by weight per million to about 200 parts by weight per million of halogen are present in a halogen doped selenium charge transport layer, although the amount can be outside of this range. If a halogen doped transport layer free of arsenic is utilized, the halogen content in one embodiment is less than about 20 parts by weight per million. Transport layers are well known in the art. Examples of transport layers are described, for example, in U.S. Pat. No. 4,609,605 and in U.S. Pat. No. 4,297,424, the disclosures of each of these patents being totally incorporated herein by reference.

Organic charge transport materials can also be employed. Examples of charge transporting materials include the following:

Diamine transport molecules of the type described in U.S. Pat. Nos. 4,306,008, 4,304,829, 4,233,384, 4,115,116, 4,299,897, 4,265,990, and 4,081,274, the disclosures of each of which are totally incorporated herein by reference. Examples of diamine transport molecules include N,N'-diphenyl-N,N'-bis(3"-methylphenyl)-(1,1'-biphenyl)-4,4'-diamine, N,N'-diphenyl-N,N'-bis(4-methylphenyl)-(1,1'-biphenyl)-4,4'-diamine, N,N'-diphenyl-N,N'-bis(2-methylphenyl)-(1,1'-biphenyl)-4,4'-diamine, N,N'-diphenyl-N,N'-bis(3-ethylphenyl)-(1,1'-biphenyl)-4,4'-diamine, N,N'-diphenyl-N,N'-bis(4-ethylphenyl)-(1,1'-biphenyl)-4,4'-diamine, N,N'-diphenyl-N,N'-bis(4-n-butylphenyl)-(1,1'-biphenyl)-4,4'-diamine, N,N'-diphenyl-N,N'-bis(3-chlorophenyl)-[1,1'-biphenyl]-4,4'-diamine, N,N'-diphenyl-N,N'-bis(4-chlorophenyl)-[1,1'-biphenyl]-4,4'-diamine, N,N'-diphenyl-N,N'-bis(phenylmethyl)-[1,1'-biphenyl]-4,4'-diamine, N,N,N',N'-tetraphenyl-[2,2'-dimethyl-1,1'-biphenyl]-4,4'-diamine, N,N,N',N'-tetra-(4-methylphenyl)-[2,2'-dimethyl-1,1'-biphenyl]-4,4'-diamine, N,N'-diphenyl-N,N'-bis(4-methylphenyl)-[2,2'-dimethyl-1,1'-biphenyl]-4,4'-diamine, N,N'-diphenyl-N,N'-bis(2-methylphenyl)-[2,2'-dimethyl-1,1'-biphenyl]-4,4'-diamine, N,N'-diphenyl-N,N'-bis(3-methylphenyl)-[2,2'-dimethyl-1,1'-biphenyl]-4,4'-diamine, N,N'-diphenyl-N,N'-bis(3-methylphenyl)-pyrenyl-1,6-diamine, and the like.

Pyrazoline transport molecules as disclosed in U.S. Pat. Nos. 4,315,982, 4,278,746, and 3,837,851, the disclosures of each of which are totally incorporated herein by reference. Examples of pyrazoline transport molecules include 1-[lepidyl-(2)]-3-(p-diethylaminophenyl)-5-(p-diethylaminophenyl)pyrazoline, 1-[quinolyl-(2)]-3-(p-diethylaminophenyl)-5-(p-diethylaminophenyl)pyrazoline, 1-[pyridyl-(2)]-3-(p-diethylaminostyryl)-5-(p-diethylaminophenyl)pyrazoline, 1-[6-methoxypyridyl-(2)]-3-(p-diethylaminostyryl)-5-(p-diethylaminophenyl) pyrazoline, 1-phenyl-3-[p-dimethylaminostyryl]-5-(p-dimethylaminostyryl) pyrazoline, 1-phenyl-3-[p-diethylaminostyryl]-5-(p-diethylaminostyryl) pyrazoline, and the like.

Substituted fluorene charge transport molecules as described in U.S. Pat. No. 4,245,021, the disclosure of which is totally incorporated herein by reference. Examples of fluorene charge transport molecules include 9-(4'-dimethylaminobenzylidene)fluorene, 9-(4'-methoxybenzylidene) fluorene, 9-(2',4'-dimethoxybenzylidene)fluorene, 2-nitro-9-benzylidene-fluorene, 2-nitro-9-(4'-diethylaminobenzylidene)fluorene, and the like.

Oxadiazole transport molecules such as 2,5-bis(4-diethylaminophenyl)-1,3,4-oxadiazole, pyrazoline, imidazole, triazole, and the like. Other examples of oxadiazole transport molecules are described, for example, in German Patent 1,058,836, German Patent 1,060,260, and German Patent 1,120,875, the disclosures of each of which are totally incorporated herein by reference.

Hydrazone transport molecules, such as p-diethylamino benzaldehyde-(diphenylhydrazone), o-ethoxy-p-diethylaminobenzaldehyde-(diphenylhydrazone), o-methyl-p-diethylaminobenzaldehyde-(diphenylhydrazone), o-methyl-p-dimethylaminobenzaldehyde-(diphenylhydrazone), 1-naphthalenecarbaldehyde 1-methyl-1-phenylhydrazone, 1-naphthalenecarbaldehyde 1,1-phenylhydrazone, 4-methoxynaphthlene-1-carbaldeyde 1-methyl-1-phenylhydrazone, and the like. Other examples of hydrazone transport molecules are described, for example in U.S. Pat. Nos. 4,150,987, 4,385,106, 4,338,388, and 4,387,147, the disclosures of each of which are totally incorporated herein by reference.

Carbazole phenyl hydrazone transport molecules such as 9-methylcarbazole-3-carbaldehyde-1,1-diphenylhydrazone, 9-ethylcarbazole-3-carbaldehyde-1-methyl-1-phenylhydrazone, 9-ethylcarbazole-3-carbaldehyde-1-ethyl-1-phenylhydrazone, 9-ethylcarbazole-3-carbaldehyde-1-ethyl-1-benzyl-1-phenylhydrazone, 9-ethylcarbazole-3-carbaldehyde-1,1-diphenylhydrazone, and the like. Other examples of carbazole phenyl hydrazone transport molecules are described, for example, in U.S. Pat. Nos. 4,256,821 and 4,297,426, the disclosures of each of which are totally incorporated herein by reference.

Vinyl-aromatic polymers such as polyvinyl anthracene, polyacenaphthylene; formaldehyde condensation products with various aromatics such as condensates of formaldehyde and 3-bromopyrene; 2,4,7-trinitrofluorenone, and 3,6-dinitro-N-t-butylnaphthalimide as described, for example, in U.S. Pat. No. 3,972,717, the disclosure of which is totally incorporated herein by reference.

Oxadiazole derivatives such as 2,5-bis-(p-diethylaminophenyl)-oxadiazole-1,3,4 described in U.S. Pat. No. 3,895,944, the disclosure of which is totally incorporated herein by reference.

Tri-substituted methanes such as alkyl-bis(N,N-dialkylaminoaryl)methane, cycloalkyl-bis(N,N-dialkylaminoaryl)methane, and cycloalkenyl-bis(N,N-dialkylaminoaryl)methane as described in U.S. Pat. No. 3,820,989, the disclosure of which is totally incorporated herein by reference. 9-Fluorenylidene methylene derivatives having the formula

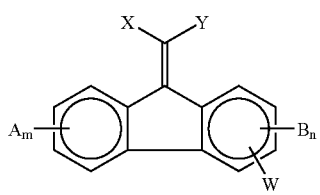

wherein X and Y are cyano groups or alkoxycarbonyl groups; A, B, and W are electron withdrawing groups independently selected from the group consisting of acyl, alkoxycarbonyl, nitro, alkylaminocarbonyl, and derivatives thereof; m is a number of from 0 to 2; and n is the number 0 or 1 as described in U.S. Pat. No. 4,474,865, the disclosure of which is totally incorporated herein by reference. Examples of 9-fluorenylidene methylene derivatives encompassed by the above formula include (4-n-butoxycarbonyl-9-fluorenylidene)malonontrile, (4-phenethoxycarbonyl-9-fluorenylidene) malononitrile, (4-carbitoxy-9-fluorenylidene)malonontrile, (4-n-butoxycarbonyl-2,7-dinitro-9-fluorenylidene)malonate, and the like.

Other charge transport materials include poly-1-vinylpyrene, poly-9-vinylanthracene, poly-9-(4-pentenyl)-carbazole, poly-9-(5-hexyl)-carbazole, polymethylene pyrene, poly-1-(pyrenyl)-butadiene, polymers such as alkyl, nitro, amino, halogen, and hydroxy substitute polymers such as poly-3-amino carbazole, 1,3-dibromo-poly-N-vinyl carbazole, 3,6-dibromo-poly-N-vinyl carbazole, and numerous other transparent organic polymeric or non-polymeric transport materials as described in U.S. Pat. No. 3,870,516, the disclosure of which is totally incorporated herein by reference. Also suitable as charge transport materials are phthalic anhydride, tetrachlorophthalic anhydride, benzil, mellitic anhydride, S-tricyanobenzene, picryl chloride, 2,4-dinitrochlorobenzene, 2,4-dinitrobromobenzene, 4-nitrobiphenyl, 4,4-dinitrophenyl, 2,4,6-trinitroanisole, trichlorotrinitrobenzene, trinitro-o-toluene, 4,6-dichloro-1,3-dinitrobenzene, 4,6-dibromo-1,3-dinitrobenzene, p-dinitrobenzene, chloranil, bromanil, and mixtures thereof, 2,4,7-trinitro-9-fluorenone, 2,4,5,7-tetranitrofluorenone, trinitroanthracene, dinitroacridene, tetracyanopyrene, dinitroanthraquinone, polymers having aromatic or heterocyclic groups with more than one strongly electron withdrawing substituent such as nitro, sulfonate, sulfonyl, carboxyl, cyano, or the like, including polyesters, polysiloxanes, polyamides, polyurethanes, and epoxies, as well as block, graft, or random copolymers containing the aromatic moiety, and the like, as well as mixtures thereof, as described in U.S. Pat. No. 4,081,274, the disclosure of which is totally incorporated herein by reference.

Also suitable are charge transport materials such as triarylamines, including tritolyl amine, of the formula

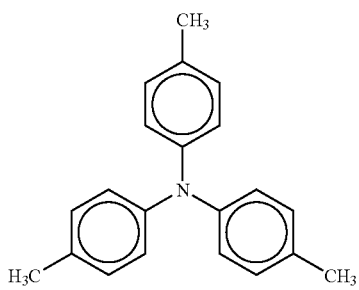

and the like, as disclosed in, for example, U.S. Pat. Nos. 3,240,597 and 3,180,730, the disclosures of each of which are totally incorporated herein by reference, and substituted diarylmethane and triarylmethane compounds, including bis-(4-diethylamino-2-methylphenyl)-phenylmethane, of the formula

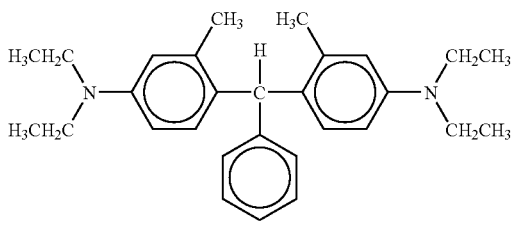

and the like, as disclosed in, for example, U.S. Pat. Nos. 4,082,551, 3,755,310, 3,647,431, British Patent 984,965, British Patent 980,879, and British Patent 1,141,666, the disclosures of each of which are totally incorporated herein by reference.

One specific example of a charge transport molecule is one having the general formula

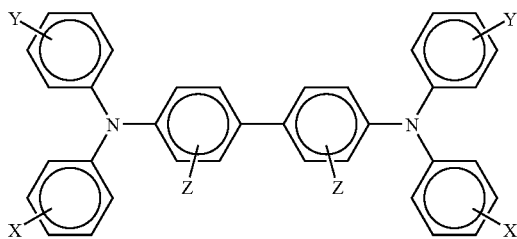

wherein X, Y and Z are each, independently of the others, hydrogen, alkyl groups having from 1 to about 20 carbon atoms, or chlorine, and wherein at least one of X, Y and Z is independently selected to be an alkyl group having from 1 to about 20 carbon atoms or chlorine. If Y and Z are hydrogen, the compound can be named N,N'-diphenyl-N, N'-bis(alkylphenyl)-[1,1'-biphenyl]-4,4'-diamine wherein the alkyl is, for example, methyl, ethyl, propyl, n-butyl, or the like, or the compound can be N,N'-diphenyl-N,N'-bis (chlorophenyl)-[1,1'-biphenyl]-4,4'-diamine. A specific member of this class is N,N'-diphenyl-N,N'-bis(3"-methylphenyl)-(1,1'-biphenyl)-4,4'-diamine (prepared as disclosed in U.S. Pat. No. 4,265,990, the disclosure of which is totally incorporated herein by reference).

Any suitable and conventional technique can be utilized to mix and thereafter apply the charge transport layer coating mixture to the charge generating layer. Examples of application techniques include spraying, dip coating, roll coating, wire wound rod coating, and the like. Drying of the deposited coating can be effected by any suitable conventional technique such as oven drying, infra red radiation drying, air drying, and the like.

The charge transport material is present in the charge transport layer in any effective amount, in one embodiment from about 5 to about 90 percent by weight, in another embodiment from about 20 to about 75 percent by weight, in yet another embodiment from about 20 to about 60 percent by weight, and in still another embodiment from about 30 to about 60 percent by weight, although the amount can be outside of these ranges.

Examples of the highly insulating and transparent resinous components or inactive binder resinous material for the transport layers include materials such as those described in U.S. Pat. No. 3,121,006, the disclosure of which is totally incorporated herein by reference. Specific examples of suitable organic resinous materials include polycarbonates, acrylate polymers, vinyl polymers, cellulose polymers, polyesters, polysiloxanes, polyamides, polyurethanes, polystyrenes, polyarylates, polyethers, polysulfones, and epoxies, as well as block, random or alternating copolymers thereof. Examples of electrically inactive binder materials include polycarbonate resins having a number average molecular weight of from about 20,000 to about 100,000 with a molecular weight in the range of from about 50,000 to about 100,000 being one specific embodiment. The branched polymers as disclosed herein can also be employed as the binder in the charge transport layer of the imaging member, either alone or in combination with other materials. The charge transport layer contains the charge transport material in an amount in one embodiment of from about 5 to about 90 percent by weight, and in another embodiment from about 20 percent to about 75 percent by weight, although the relative amounts of binder and transport material can be outside these ranges.

Generally, the thickness of the charge transport layer is from about 10 to about 50 microns, although thicknesses outside of this range can also be used. In one specific embodiment, the ratio of the thickness of the charge transport layer to the charge generator layer is maintained from about 2:1 to 200:1, and in some instances as great as 400:1.

At least one layer of the imaging members disclosed herein, such as the adhesive layer, the protective overcoat layer, the photogenerating layer, the charge transport layer, or the like, contains a branched polymer as disclosed herein. The branched polymer can be present as the sole binder in the layer, or can be present as a component of a blend of two or more binder polymers. One example of a suitable polymer with which the branched polymers as disclosed herein can be blended is a polycarbonate resin. Any desired or suitable polycarbonate resin can be selected. For example, polycarbonates of the general formula

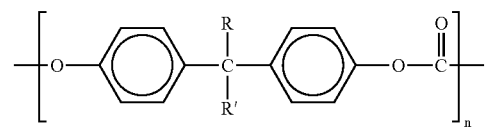

wherein R and R' each, independently of the other, is an alkyl group (including cycloalkyl groups and substituted alkyl groups), in one embodiment with from 1 to about 30 carbon atoms, or a phenyl group (including substituted phenyl groups) and n is an integer representing the number of repeat monomer units, in one embodiment being from about 10 to about 1,000, although the value can be outside of this range. Examples of polycarbonates include poly(4, 4'-isopropylidene-diphenylene) carbonate (also referred to as bisphenol-A-polycarbonate), poly(4,4'-diphenyl-1,1'-cyclohexane) carbonate, and the like. Some polycarbonate resins have a number average molecular weight of from about 20,000 to about 150,000, with a number average molecular weight in the range of from about 50,000 to about 100,000 being another specific embodiment. Some polycarbonate resins have a weight average molecular weight of from about 20,000 to about 100,000, with a weight average molecular weight in the range of from about 50,000 to about 100,000 being another specific embodiment. Within the layer, the additional binder components, such as a polycarbonate, and the branched polymer as disclosed herein can be blended in any suitable or desired relative amounts, in one embodiment from about 1 to about 99 percent by weight of the second binder polymer and from about 1 to about 99 percent by weight of the branched polymer as disclosed herein, in another embodiment from about 5 to about 95 percent by weight of the second binder polymer and from about 5 to about 95 percent by weight of the branched polymer as disclosed herein, and in yet another embodiment from about 25 to about 75 percent by weight of the second binder polymer and from about 25 to about 75 percent by weight of the branched polymer as disclosed herein, although the relative amounts can be outside these ranges.

Other layers, such as conventional electrically conductive ground strip along one edge of the belt in contact with the conductive layer, blocking layer, adhesive layer or charge generating layer to facilitate connection of the electrically conductive layer of the photoreceptor to ground or to an electrical bias, can also be included. Ground strips are well known and usually comprise conductive particles dispersed in a film forming binder.

Optionally, an overcoat layer can also be utilized to improve resistance to abrasion. In some cases an anti-curl back coating can be applied to the surface of the substrate opposite to that bearing the photoconductive layer to provide flatness and/or abrasion resistance. These overcoating and anti-curl back coating layers are well known in the art and can comprise thermoplastic organic polymers or inorganic polymers that are electrically insulating or slightly semiconductive. Overcoatings are continuous and generally have a thickness of less than about 10 micrometers. The thickness of anti-curl backing layers should be sufficient to substantially balance the total forces of the layer or layers on the opposite side of the supporting substrate layer. The total forces are substantially balanced when the belt has no noticeable tendency to curl after all the layers are dried. For example, for an electrophotographic imaging member in which the bulk of the coating thickness on the photoreceptor side of the imaging member is a transport layer containing predominantly polycarbonate resin and having a thickness of about 24 microns on a Mylar substrate having a thickness of about 76 microns, sufficient balance of forces can be achieved with a 13.5 micrometers thick anti-curl layer containing about 99 percent by weight polycarbonate resin, about 1 percent by weight polyester and between about 5 and about 20 percent of coupling agent treated crystalline particles. An example of an anti-curl backing layer is described in U.S. Pat. No. 4,654,284 the disclosure of which is totally incorporated herein by reference. A thickness between about 70 and about 160 microns is a satisfactory range for flexible photoreceptors. Branched polymers as disclosed herein are also suitable for use as overcoat layers and anticurl back coating layers.

Also disclosed herein is a method of generating images with the photoconductive imaging members disclosed herein. The method comprises the steps of generating an electrostatic latent image on a photoconductive imaging member as disclosed herein, developing the latent image, and transferring the developed electrostatic image to a substrate. Optionally, the transferred image can be permanently affixed to the substrate. Development of the image can be achieved by a number of methods, such as cascade, touchdown, powder cloud, magnetic brush, and the like. Transfer of the developed image to a substrate can be by any method, including those making use of a corotron or a biased charging roll. The fixing step can be performed by means of any suitable method, such as radiant flash fusing, heat fusing, pressure fusing, vapor fusing, and the like. Any material used in xerographic copiers and printers can be used as a substrate, such as paper, transparency material, or the like.

Specific embodiments will now be described in detail. These examples are intended to be illustrative, and the claims are not limited to the materials, conditions, or process parameters set forth in these embodiments. All parts and percentages are by weight unless otherwise indicated.

EXAMPLE I

To a 1 liter resin jar fitted with a turbine mechanical stirring shaft, argon inlet, and Dean-Stark trap (topped with a water cooled condenser) was added sequentially 150 grams of polysulfone (PAES, poly-bisphenol-A-co-4,4-dichlorodiphenylsulfone, obtained from Aldrich Chemical Company, Mississauga, Ontario, Canada, Mn 26,000 (advertised)) and 450 grams of N,N-dimethylacetamide (DMAc, A.C.S. reagent grade, obtained from Aldrich Chemical Company, Mississauga, Ontario, Canada). The mixture was heated slightly (50° C.) and stirred (350 rpm) to dissolve the polymer completely. To this solution was then added 150 milliliters of toluene (A.C.S. reagent grade, obtained from Aldrich Chemical Company, Mississauga, Ontario, Canada), 10.5 grams of 1,1,1-tris(4-hydroxyphenyl)ethane (THPE, obtained from Aldrich Chemical Company, Mississauga, Ontario, Canada), and 10.5 grams of cesium carbonate (obtained from Aldrich Chemical Company, Mississauga, Ontario, Canada). The mixture was heated at reflux for 19 hours. The solution was then cooled to room temperature, filtered through a pad of CELITE®), and precipitated into 8 liters of vigorously stirred methanol (obtained from Caledon Laboratories, Georgetown, Ontario, Canada). The resulting precipitate was isolated by vacuum filtration through #1 Whatman filter paper, followed by stirring in 5 liters of deionized water for 1 hour, refiltration, subsequent stirring in 5 liters of methanol for 1 hour, and a final filtration. The precipitate was dried in a vacuum oven (30° C., 7 mmHg) for three days to yield a white free flowing powder (yield 90 percent). Incorporation of the tris(4-hydroxyphenyl)ethane moiety were confirmed by $^1$H NMR [$\delta$ CH$_3$(THPE)=1.64 (TMS)].

EXAMPLE II

The process of Example I was repeated except that 15.75 grams of 1,1,1-tris(4-hydroxyphenyl)ethane was used instead of 10.5 grams of 1,1,1-tris(4-hydroxyphenyl)ethane.

EXAMPLE III

The process of Example I was repeated except that 21.0 grams of 1,1,1-tris(4-hydroxyphenyl)ethane was used instead of 10.5 grams of 1,1,1-tris(4-hydroxyphenyl)ethane.

Measured values (by gas phase chromatography) for number average molecular weight, weight average molecular weight, and polydispersity values for the starting polysulfone material and the products of Examples I, II, and III are as follows:

|  | $M_n$ | $M_w$ | $M_p$ | Polydispersity ($M_w/M_n$) |
|---|---|---|---|---|
| PAES | 43,201 | 70,109 | 70,745 | 1.62 |
| Ex. I | 10,310 | 26,277 | 24,970 | 2.54 |
| Ex. II | 8,853 | 22,086 | 23,363 | 2.49 |
| Ex. III | 7,289 | 16,599 | 19,302 | 2.21 |

Because gas phase chromatography measures hydrodynamic volume by measuring retention time, it is believed that the values above indicate varying degrees of branching within the polymers thus formed, since branching in polymers leads to decreased hydrodynamic volume and increased GPC retention time.

EXAMPLE IV

To a 1 liter resin jar fitted with a turbine mechanical stirring shaft, argon inlet, and Dean-Stark trap (topped with a water cooled condenser) was added sequentially 83.99 grams of 1,1-bis(4-hydroxyphenyl)cyclohexane (bisphenol-Z, obtained from Aldrich Chemical Company, Mississauga, Ontario, Canada), 68.32 g 4,4'-difluorobenzophenone (obtained from Oakwood Chemicals, West Columbia, S.C., USA and Honeywell Specialty Chemicals, Morristown, N.J., USA), 61 grams of potassium carbonate (A.C.S. reagent grade, obtained from Caledon Laboratories, Georgetown, Ontario, Canada), 400 grams of N,N-dimethylacetamide (DMAc, A.C.S. reagent grade, obtained from Aldrich Chemical Company, Mississauga, Ontario, Canada), and 150 grams of toluene (A.C.S. reagent grade, obtained from Aldrich Chemical Company (Mississauga, Ontario, Canada). The mixture was heated at reflux for 19 hours. The solution was then cooled to room temperature, diluted with 400 grams of DMAC, filtered through a pad of CELITE®, and precipitated into 8 liters of vigorously stirred methanol (obtained from Caledon Laboratories, Georgetown, Ontario, Canada). The resulting precipitate was isolated by vacuum filtration through #1 Whatman filter paper, followed by stirring in 5 liters of deionized water for 1 hour, refiltration, subsequent stirring in 5 liters of methanol for 1 hour, and a final filtration. The precipitate was dried in a vacuum oven (30° C., 7 mmHg) for three days to yield a white free flowing powder (yield 6 percent). The polymer was measured to have Mw 46,300 Daltons and Mn 29,300 Daltons by GPC relative to polystyrene standards.

EXAMPLE V

To a 500 liter resin jar fitted with a turbine mechanical stirring shaft, argon inlet, and Dean-Stark trap (topped with a water cooled condenser) was added sequentially 65 grams of the polymer prepared in Example IV (poly-bisphenol-Z-co-4,4-didifluorobenzophenone) and 225 grams of N,N-dimethylacetamide (DMAc, A.C.S. reagent grade, obtained from Aldrich Chemical Company, Mississauga, Ontario, Canada). The mixture was heated slightly (50° C.) and stirred (350 rpm) to dissolve the polymer completely. To this mixture was added 50 milliliters of toluene (A.C.S. reagent grade, obtained from Aldrich Chemical Company, Mississauga, Ontario, Canada), 7.85 grams of 1,1,1-tris(4-hydroxyphenyl)ethane (THPE, obtained from Aldrich Chemical Company, Mississauga, Ontario, Canada), and 25.0 grams of cesium carbonate (obtained from Aldrich Chemical Company, Mississauga, Ontario, Canada). The mixture was heated at reflux for 19 hours. The solution was then cooled to room temperature, filtered through a pad of CELITE®, and precipitated into 4 liters of vigorously stirred methanol (obtained from Caledon Laboratories, Georgetown, Ontario, Canada). The resulting precipitate was isolated by vacuum filtration through #1 Whatman filter paper, followed by stirring in 2.5 liters of deionized water for 1 hour, refiltration, subsequent stirring in 2.5 liters of methanol for 1 hour, and a final filtration. The precipitate was dried in a vacuum oven (30° C., 7 mmHg) for three days to yield a white free flowing powder (yield 90 percent). Incorporation of the tris(4-hydroxyphenyl)ethane moiety were confirmed by $^1$H NMR [δ CH$_3$(THPE)=1.64(TMS)].

EXAMPLE VI

The polymers prepared in Examples I, III, and V (2.00 grams in each instance) are each roll milled in an amber glass bottle with methylene chloride (22.44 grams in each instance) and N,N'-diphenyl-N,N'-bis(3"-methylphenyl)-(1,1'-biphenyl)-4,4'-diamine (2.00 grams in each instance) (charge transport material, prepared as disclosed in U.S. Pat. No. 4,265,990, the disclosure of which is totally incorporated herein by reference). The resulting solutions are each coated onto the photogenerating layers of imaging members comprising a 3 mil thick polyethylene terephthalate substrate, a vacuum deposited titanium oxide coating about 200 Angstroms thick, a 3-aminopropyltriethoxysilane charge blocking layer 300 Angstroms thick, a 49 micron thick polyester adhesive layer (49,000, available from E.I. du Pont de Nemours & Co., Wilmington, Del.) about 400 Angstroms thick, and a 2.5 micron thick photogenerating layer containing 7.5 percent by volume trigonal selenium, 25 percent by volume N,N'-diphenyl-N,N'-bis(3"-methylphenyl)-(1,1'-biphenyl)-4,4'-diamine, and a polyvinylcarbazole binder (67.5 percent by volume) (available from BASF, Mt. Olive, N.J.). The photogenerating layer in each instance is prepared by introducing 8 grams of polyvinyl carbazole and 140 milliliters of a 1:1 volume ratio of a mixture of tetrahydrofuran and toluene into a 20 ounce amber bottle. To this solution is added 8 grams of trigonal selenium and 1,000 grams of ⅛ inch (3.2 milliliter) diameter stainless steel shot. This mixture is then placed on a ball mill for 96 hours. Subsequently, 50 grams of the resulting slurry are added to a solution of 3.6 grams of polyvinyl carbazole and 20 grams of N,N'-diphenyl-N,N'-bis(3"-methylphenyl)-(1,1'-biphenyl)-4,4'-diamine dissolved in 75 milliliters of 1:1 volume ratio of tetrahydrofuran/toluene. This slurry is then placed on a shaker for 10 minutes. The resulting slurry is thereafter applied to the adhesive interface by extrusion coating to form a layer having a wet thickness of 0.5 mil (12.7 microns). This photogenerating layer is dried at 135° C. for 5 minutes in a forced air oven to form a dry thickness of 2.0 microns. (This process for preparing a photogenerating layer is also disclosed in U.S. Pat. No. 5,308,725, the disclosure of which is totally incorporated herein by reference).

Charge transport layers are then applied to the photogenerating layers thus prepared. Charge transport solutions are prepared in each instance by introducing into an amber glass bottle 2.00 grams of N,N'-diphenyl-N,N'-bis(3"-methylphenyl)-(1,1'-biphenyl)-4,4'-diamine, 2.00 grams of the same polymer used as the binder in the photogenerating layer, and 22.44 grams of methylene chloride and admixing the contents to prepare the solution. The charge transport solutions are applied to the photogenerator layers with a 8 mil gap Bird applicator to form a coating which is heated from 40 to 100° C. over 30 minutes to dry the layer. The charge transport layers thus applied to the imaging members have dry coating thicknesses of about 25 microns.

Other embodiments and modifications may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A process for preparing a branched polyarylene ether polymer which comprises (A) providing a reaction mixture which comprises (i) an optional solvent, (ii) a polyfunctional phenol compound of the formula Ar(OH)$_x$ wherein x≧3 and wherein Ar is an aryl moiety or an alkylaryl moiety, provided that when Ar is an alkylaryl moiety at least three of the —OH groups are bonded to an aryl portion thereof, (iii) one or more linear polymers of the formula

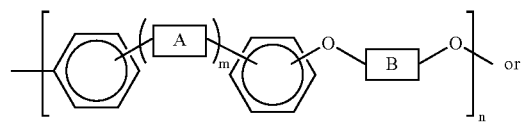 or

-continued

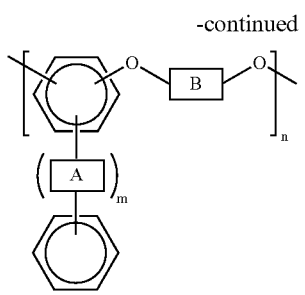

wherein each m, independently of the others, is an integer of 0 or 1, each A, independently of the others, is

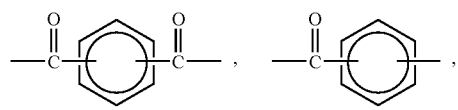

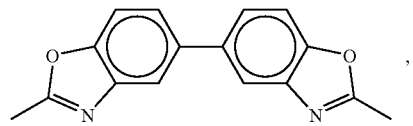

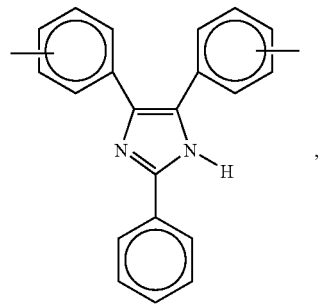

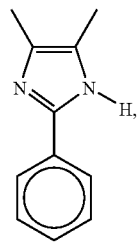

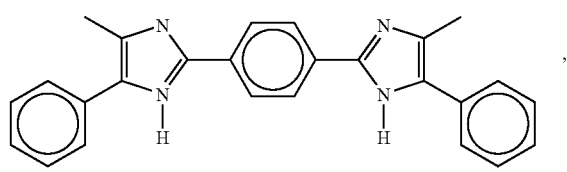

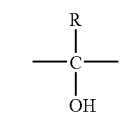

wherein R is a hydrogen atom, an alkyl group, an aryl group, an arylalkyl group, an alkylaryl group, or mixtures thereof,

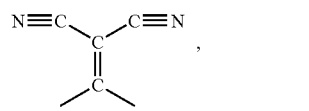

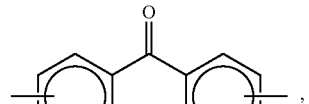

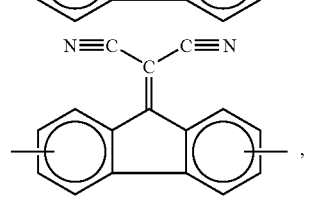

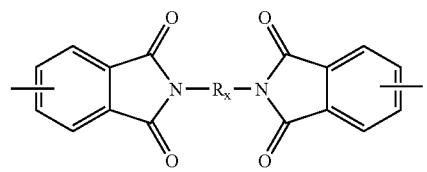

wherein $R_x$ is an alkylene group, an arylene group, an arylalkylene group, an alkylarylene group, or mixtures thereof,

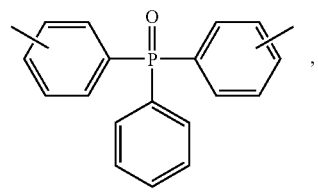 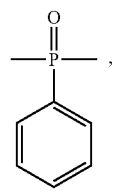

or mixtures thereof, each B, independently of the others, is

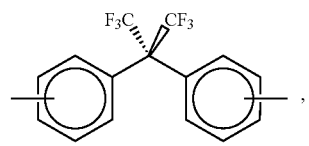

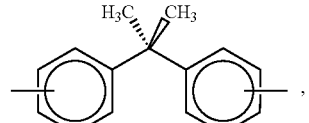

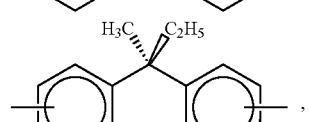

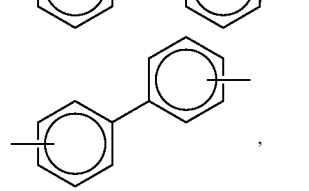

-continued
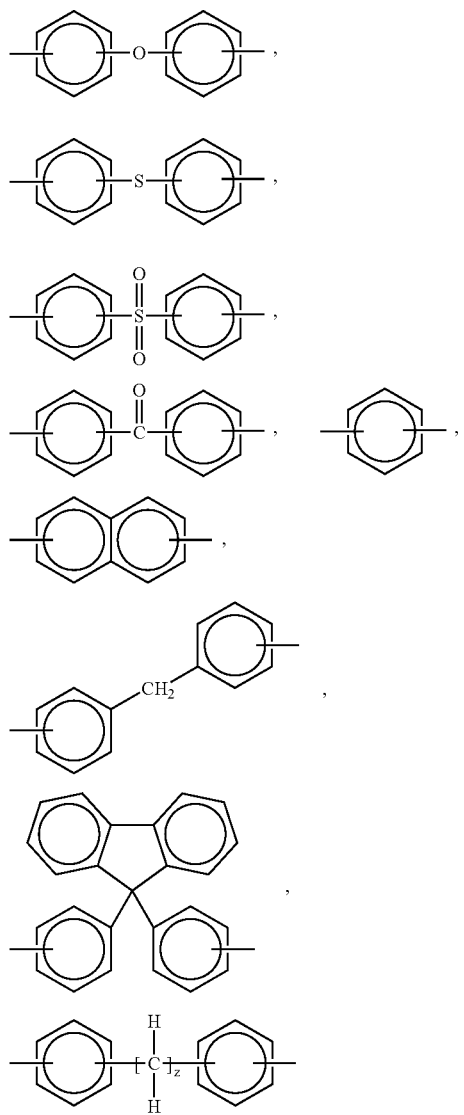
wherein z is an integer of from 2 to about 20,
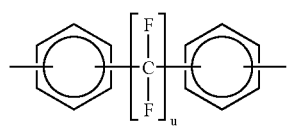
wherein u is an integer of from 1 to about 20,
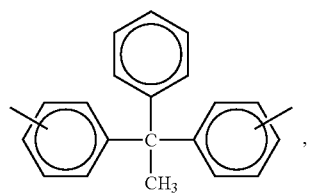
-continued
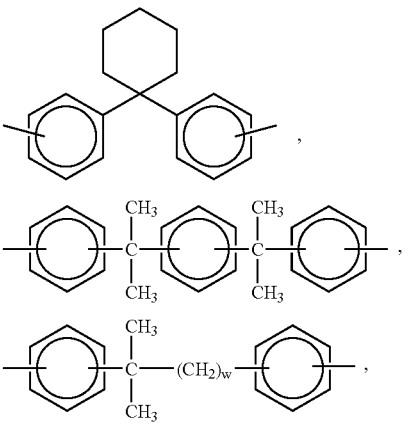
wherein w is an integer of from 1 to about 20,
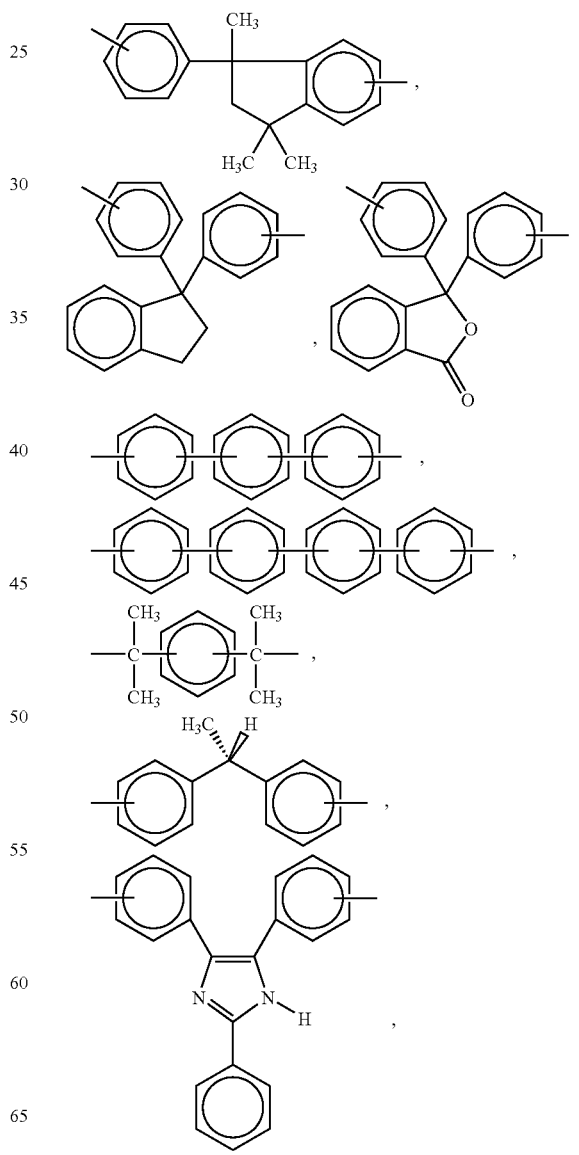

-continued

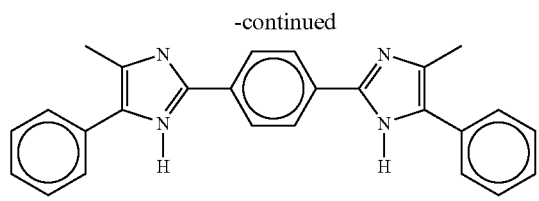,

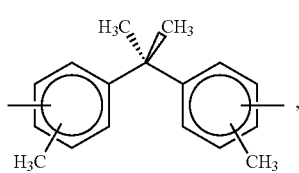,

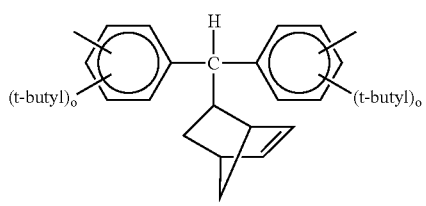

wherein each o, independently of the other, is an integer of 1, 2, 3, or 4,

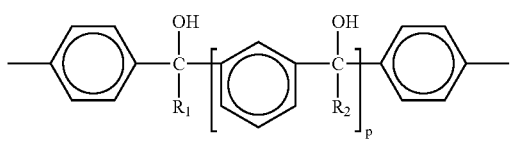

wherein $R_1$ and $R_2$ each, independently of the other, are hydrogen atoms, alkyl groups, aryl groups, arylalkyl groups, alkylaryl groups, or mixtures thereof, and p is an integer of 0 or 1,

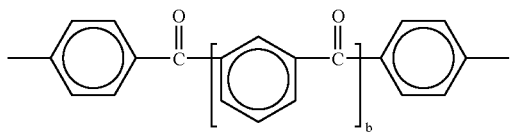

wherein b is an integer of 0 or 1,

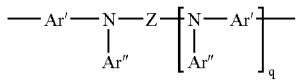

wherein (1) Z is

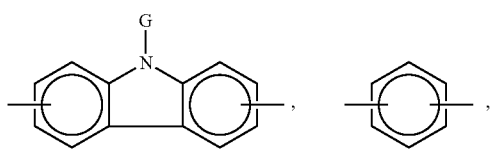,

-continued

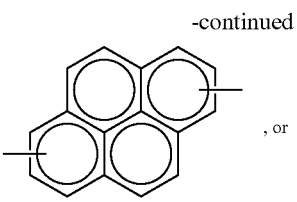, or

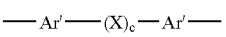

wherein c is 0 or 1; (2) Ar' is

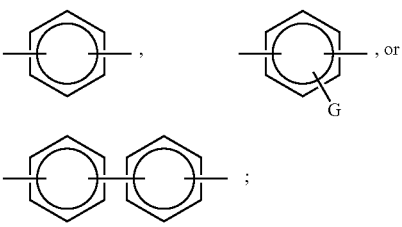;

(3) G is an alkyl group selected from alkyl groups containing from about 2 to about 10 carbon atoms; (4) Ar" is

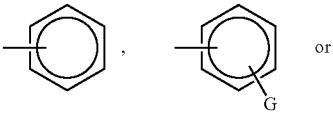

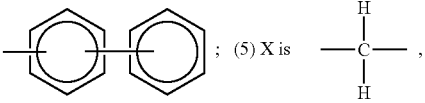; (5) X is 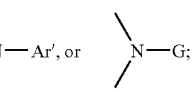,

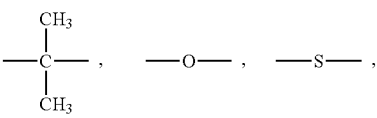

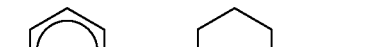

wherein s is 0, 1, or 2,

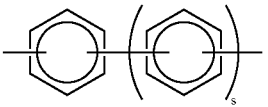

and (6) q is 0 or 1; or mixtures thereof, and n is an integer representing the number of repeat monomer units, (iv) optionally, a compound of the formula

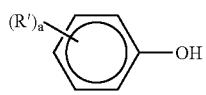

wherein a is an integer of from 1 to 5 and R' is a hydrogen atom, an alkyl group, an aryl group, an arylalkyl group, an alkylaryl group, or a mixture thereof, wherein two or more R' groups can be joined together to form a ring, and (v) a carbonate base; and (B) heating the reaction mixture and removing generated water from the reaction mixture, thereby effecting a polymerization reaction.

2. A process according to claim 1 wherein A is

or a mixture thereof and B is

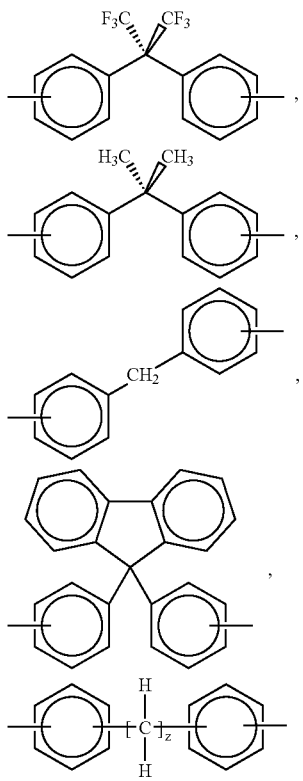

wherein z is an integer of from 2 to about 20,

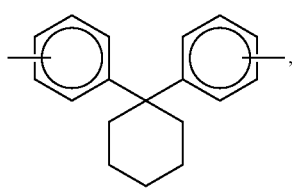

or a mixture thereof.

3. A process according to claim 1 wherein A is

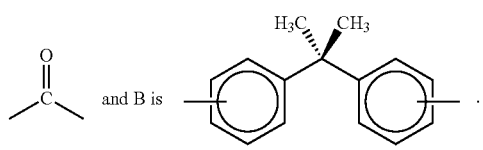

4. A process according to claim 1 wherein A is

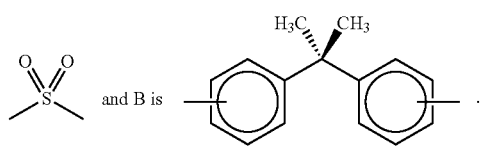

5. A process according to claim 1 wherein A is

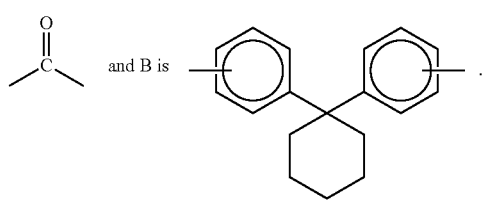

6. A process according to claim 1 wherein A is

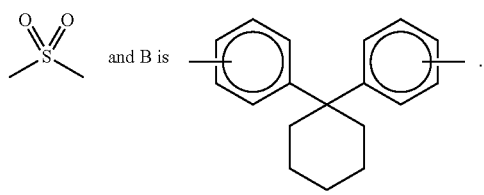

7. A process according to claim 1 wherein Ar is a substituted aryl group or a substituted arylalkyl group.

8. A process according to claim 1 wherein Ar is an unsubstituted aryl group or an unsubstituted arylalkyl group.

9. A process according to claim 1 wherein Ar is an aryl group having one or more hetero atoms therein or an arylalkyl group having one or more hetero atoms therein.

10. A process according to claim 9 wherein the one or more hetero atoms is oxygen, nitrogen, sulfur, silicon, phosphorus, or a mixture thereof.

11. A process according to claim 1 wherein Ar is an aryl group having no hetero atoms therein or an arylalkyl group having no hetero atoms therein.

12. A process according to claim 1 wherein x is 3.

13. A process according to claim 1 wherein the polyfunctional phenol is

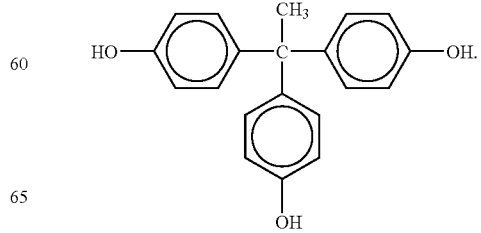

14. A process according to claim 1 wherein the polyfunctional phenol is (a) of the formula

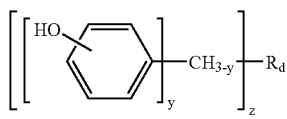

wherein y is an integer of 1, 2, or 3, z is an integer representing the number of HO-φ-CH$_{3-y}$— groups on R$_d$, and R$_d$ is a monovalent moiety; (b) of the formula

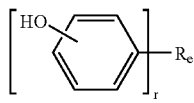

wherein r is an integer of at least about 3 and R$_e$ is an alkyl group, an aryl group, an arylalkyl group, or an alkylaryl group, (c) of the formula

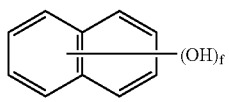

wherein f is an integer of at least 3, (d) of the formula

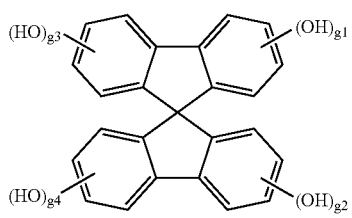

wherein g$_1$, g$_2$, g$_3$, and g$_4$ are each integers of 0, 1, 2, 3, or 4, provided that the sum of g$_1$+g$_2$+g$_3$+g$_4 \geq 3$, (e) of the formula

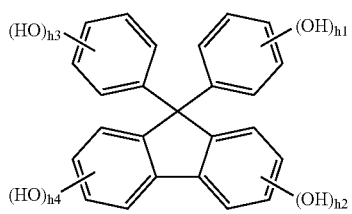

wherein h$_1$, h$_2$, h$_3$, and h$_4$ are each integers of 0, 1, 2, 3, or 4, provided that the sum of h$_1$+h$_2$+h$_3$+h$_4 \geq 3$, (f) of the formula

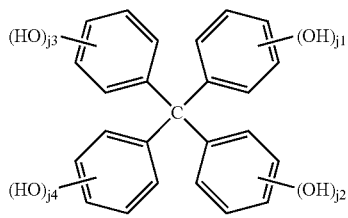

wherein j$_1$, j$_2$, j$_3$, and j$_4$ are each integers of 0, 1, 2, 3, or 4, provided that the sum of j$_1$+j$_2$+j$_3$+j$_4 \geq 3$, or (g) mixtures thereof.

15. A process according to claim 1 wherein the polyfunctional phenol is 1,1,3-tris(2-methyl-4-hydroxy-5-tert-butylphenyl)butane, 3,3,3',3'-tetramethyl-1,1'-spirobisindane-5,5',6,6'-tetrol, pyrogallol, 1,2,4-benzenetriol, phloroglucinol dihydrate, dithranol, nordihydroguaiaretic acid, C-methylcalix(4)resorcinarene, C-undecylcalix(4)-resorcinarene monohydrate, catechin hydrate, epicatechin, or mixtures thereof.

16. A process according to claim 1 wherein a solvent is present.

17. A process according to claim 16 wherein the solvent is N,N-dimethylacetamide, sulfolane, dimethyl formamide, dimethyl sulfoxide, N-methyl pyrrolidinone, hexamethylphosphoric triamide, or mixtures thereof.

18. A process according to claim 1 wherein the compound of the formula

is present.

19. A process according to claim 18 wherein

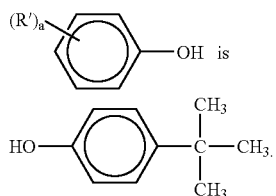

20. A process according to claim 18 wherein

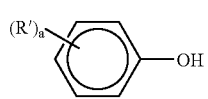

is a methyl phenol, an ethyl phenol, a propyl phenol, a butyl phenol, a pentyl phenol, a hexyl phenol, a heptyl phenol, an octyl phenol, a nonyl phenol, a decyl phenol, an undecyl phenol, a dodecyl phenol, a phenyl phenol, a tolyl phenol, a benzyl phenol, a methoxy phenol, an ethoxy phenol, a propoxy phenol, a butoxy phenol, a pentyloxy phenol, a hexyloxy phenol, a heptyloxy phenol, an octyloxy phenol, a nonyloxy phenol, a decyloxy phenol, an undecyloxy phenol, a dodecyloxy phenol, a phenoxy phenol, a tolyloxy phenol, a benzyloxy phenol, a (polyethyleneoxy) phenol, a (polypropyleneoxy) phenol, a (polybutyleneoxy) phenol, a naphthol, or a mixture thereof.

21. A process according to claim 1 wherein the carbonate base is lithium carbonate, sodium carbonate, potassium carbonate, cesium carbonate, or a mixture thereof.

22. A process according to claim 1 wherein the carbonate base is potassium carbonate.

23. A process according to claim 1 wherein the carbonate base is cesium carbonate.

24. A process according to claim 1 wherein a solvent is present and wherein the reaction mixture is heated to reflux temperature.

25. A process according to claim 1 wherein water is removed from the reaction mixture by azeotropic distillation.

26. A process according to claim 25 wherein the azeotropic distillation is carried out with toluene.

27. A process according to claim 1 wherein the linear polymer is

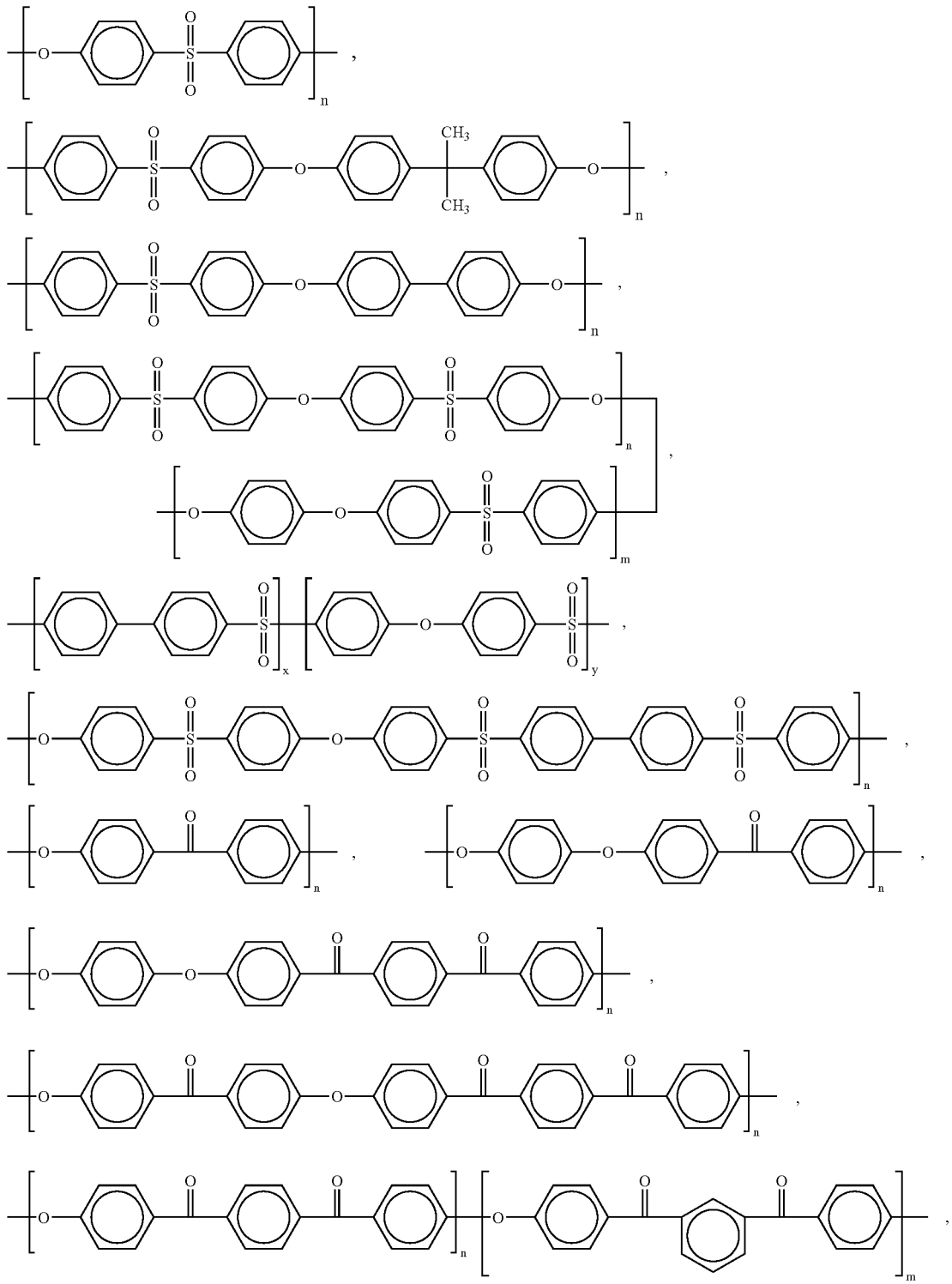

-continued

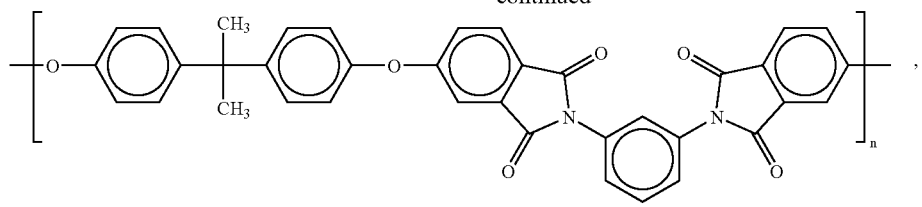

or mixtures thereof.

28. A process according to claim 1 wherein the reaction mixture further contains a dihalogenated compound of the formula

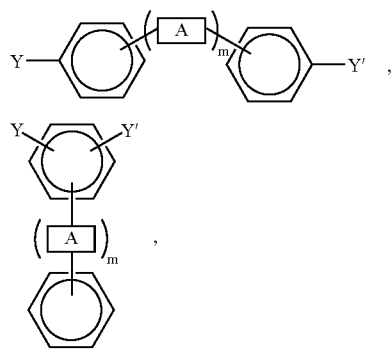

or mixtures thereof, wherein Y and Y' each, independently of the other, is a fluorine atom or a chlorine atom.

29. A process according to claim 28 wherein the dihalogenated compound is

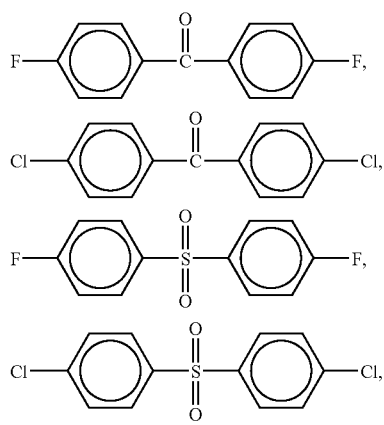

or mixtures thereof.

30. A process according to claim 28 wherein the compound of the formula

is present, wherein the dihalogenated compound is present in an amount of at least about 0.4 mole of dihalogenated compound per every one mole of compound of the formula

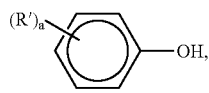

and wherein the dihalogenated compound is present in an amount of no more than about 0.6 mole of dihalogenated compound per every one mole of compound of the formula

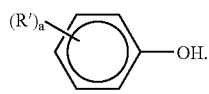

31. A process according to claim 28 wherein x is 3, wherein the dihalogenated compound is present in an amount of at least about 1.4 moles of dihalogenated monomer per every one mole of polyfunctional phenol compound, and wherein the dihalogenated compound is present in an amount of no more than about 1.6 moles of dihalogenated monomer per every one mole of polyfunctional phenol compound.

32. A process for preparing a branched polyarylene ether polymer which comprises (A) providing a reaction mixture which comprises (i) a solvent, (ii) a polyfunctional phenol compound of the formula $Ar(OH)_x$ wherein $x \geq 3$ and wherein Ar is an aryl moiety or an alkylaryl moiety, provided that when Ar is an alkylaryl moiety at least three of the —OH groups are bonded to an aryl portion thereof, (iii) one or more linear polymers of the formula

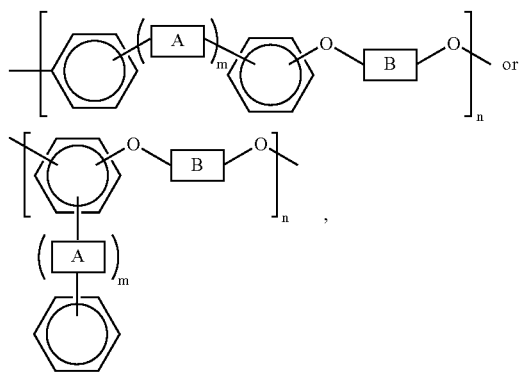

wherein each m, independently of the others, is an integer of 0 or 1, each A, independently of the others, is

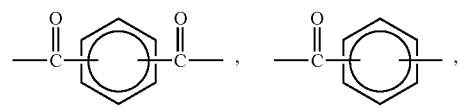

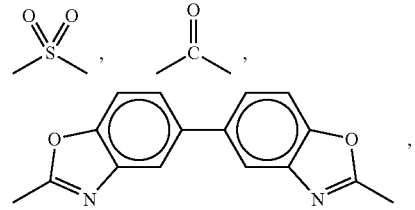

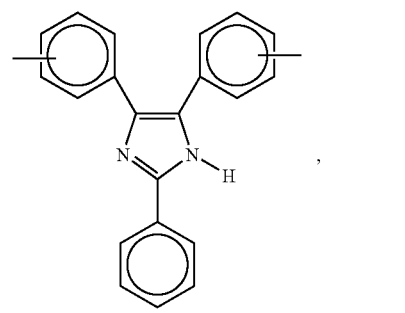

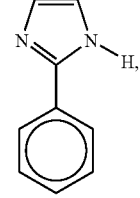

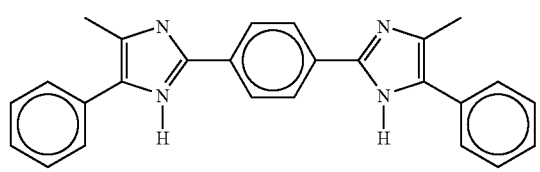

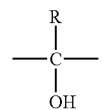

wherein R is a hydrogen atom, an alkyl group, an aryl group, an arylalkyl group, an alkylaryl group, or mixtures thereof,

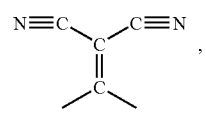

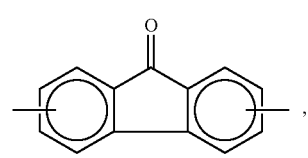

-continued

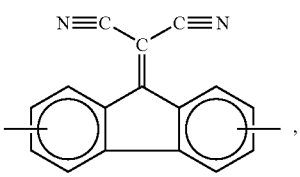

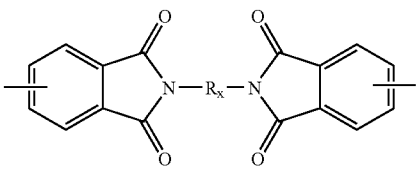

wherein $R_x$ is an alkylene group, an arylene group, an arylalkylene group, an alkylarylene group, or mixtures thereof,

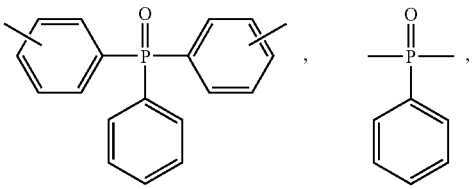

or mixtures thereof, each B, independently of the others, is

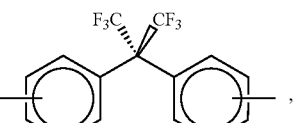

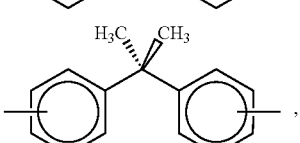

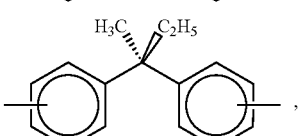

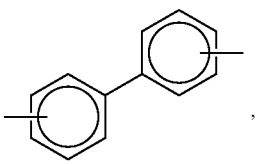

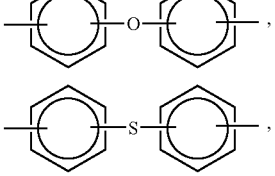

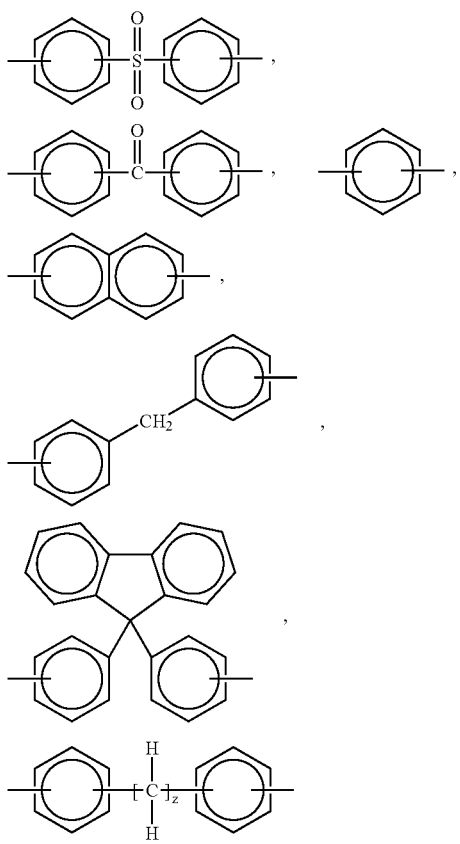
wherein z is an integer of from 2 to about 20,
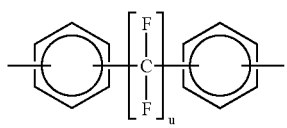
wherein u is an integer of from 1 to about 20,
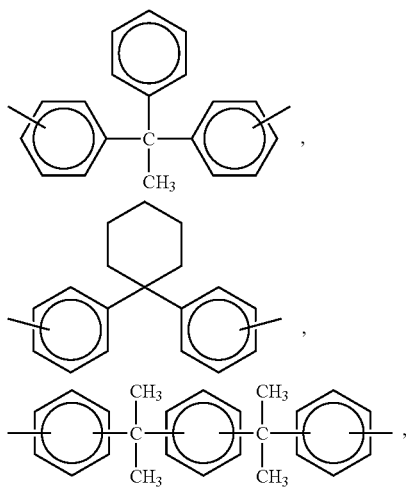
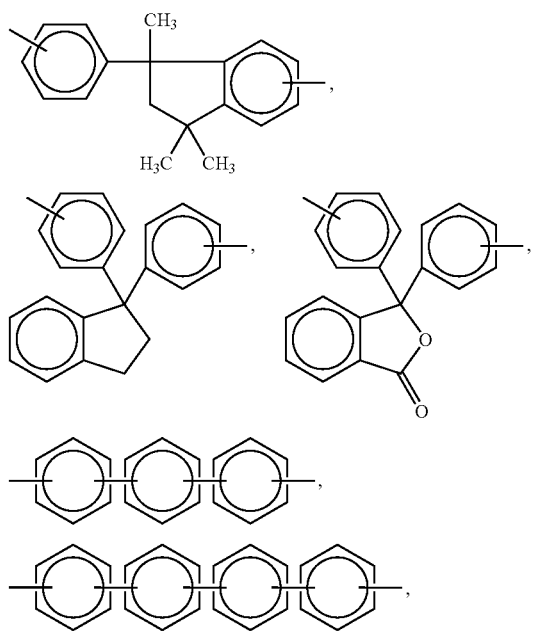
wherein w is an integer of from 1 to about 20,
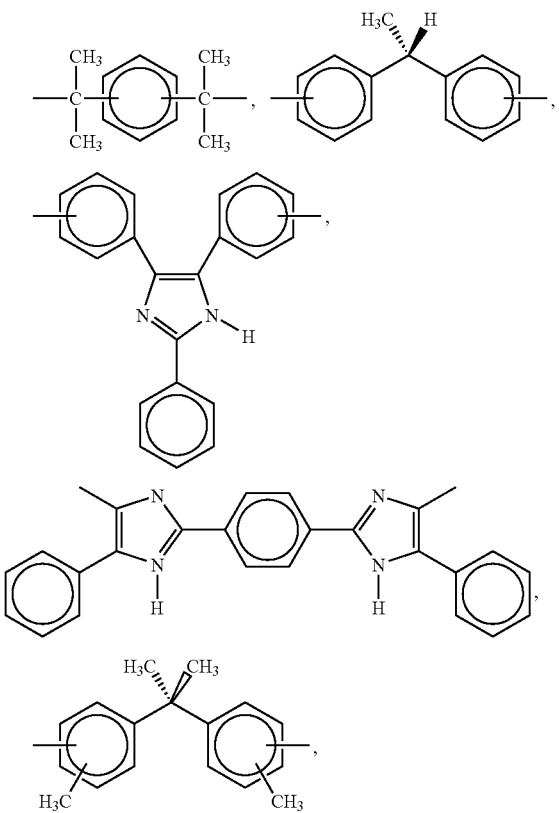

-continued

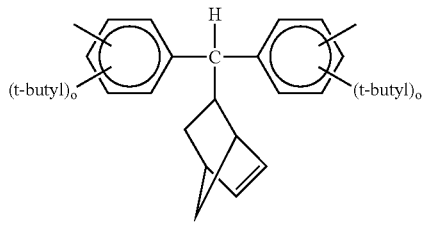

wherein each o, independently of the other, is an integer of 1, 2, 3, or 4,

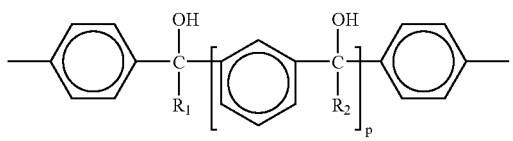

wherein $R_1$ and $R_2$ each, independently of the other, are hydrogen atoms, alkyl groups, aryl groups, arylalkyl groups, alkylaryl groups, or mixtures thereof, and p is an integer of 0 or 1,

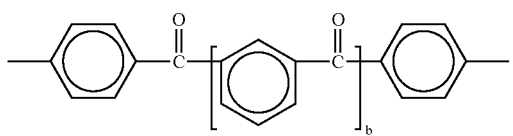

wherein b is an integer of 0 or 1,

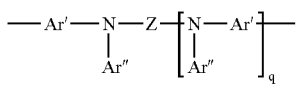

wherein (1) Z is

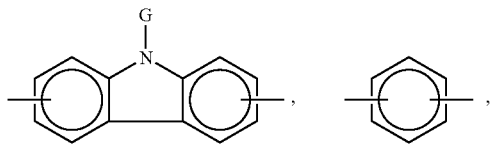

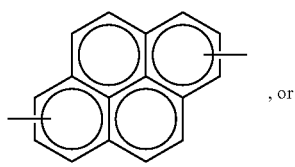

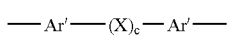

wherein c is 0 or 1; (2) Ar' is

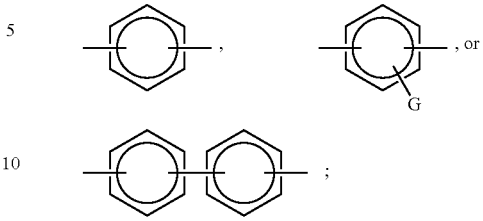

(3) G is an alkyl group selected from alkyl groups containing from about 2 to about 10 carbon atoms; (4) Ar" is

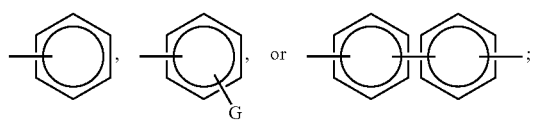

(5) X is

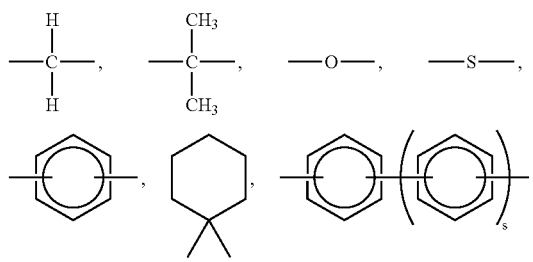

wherein s is 0, 1, or 2,

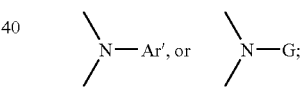

and (6) q is 0 or 1; or mixtures thereof, and n is an integer representing the number of repeat monomer units, (iv) a compound of the formula

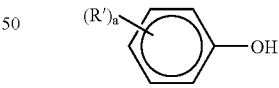

wherein a is an integer of from 1 to 5 and R' is a hydrogen atom, an alkyl group, an aryl group, an arylalkyl group, an alkylaryl group, or a mixture thereof, wherein two or more R' groups can be joined together to form a ring, (v) a carbonate base, and (vi) a dihalogenated monomer compound of the formula

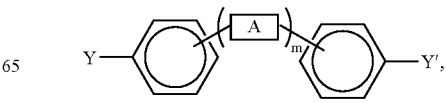

-continued

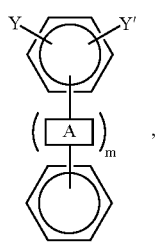

or mixtures thereof, wherein Y and Y' each, independently of the other, is a fluorine atom or a chlorine atom; and (B) heating the reaction mixture and removing generated water from the reaction mixture, thereby effecting a polymerization reaction.

33. A process for preparing a branched polyarylene ether polymer which comprises (A) providing a reaction mixture which comprises (i) a solvent, (ii) a polyfunctional phenol compound of the formula Ar(OH)$_x$ wherein x≧3 and wherein Ar is an aryl moiety or an alkylaryl moiety, provided that when Ar is an alkylaryl moiety at least three of the —OH groups are bonded to an aryl portion thereof, (iii) one or more linear polymers of the formula

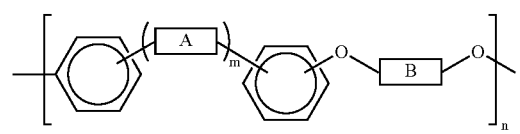

or

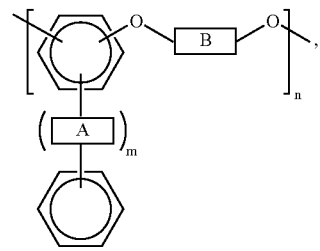

wherein each m, independently of the others, is an integer of 0 or 1, each A, independently of the others, is

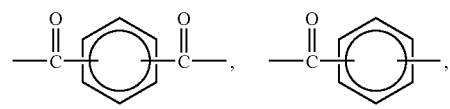

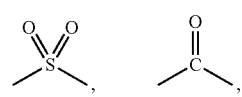

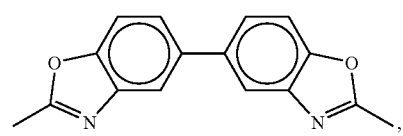

-continued

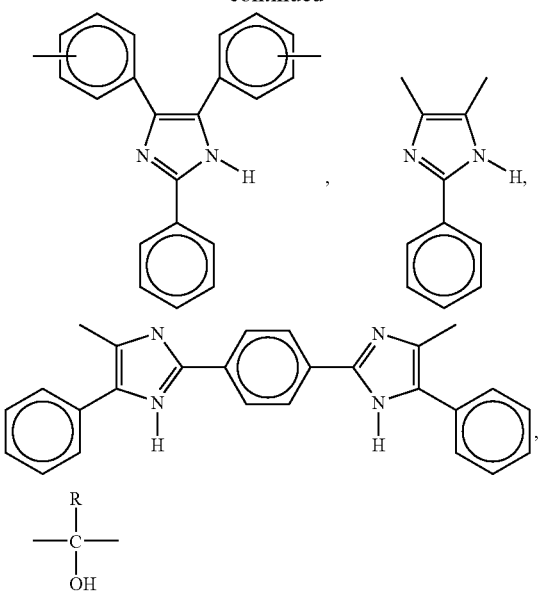

wherein R is a hydrogen atom, an alkyl group, an aryl group, an arylalkyl group, an alkylaryl group, or mixtures thereof,

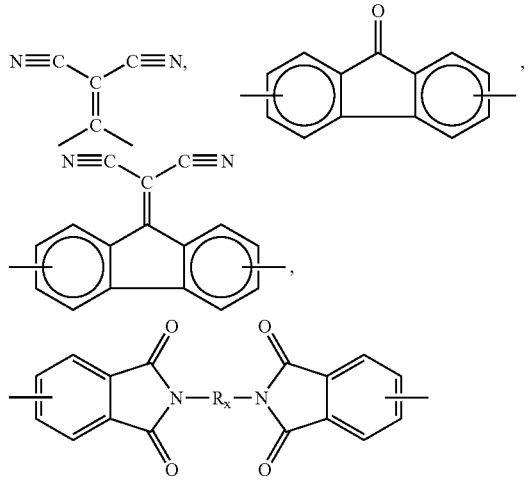

wherein R$_x$ is an alkylene group, on arylene group, an arylalkylene group, an alkylarylene group, or mixtures thereof,

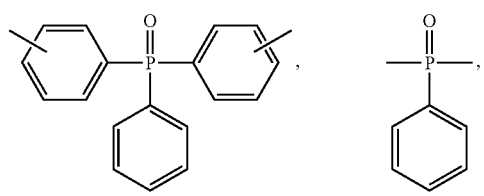

or mixtures thereof, each B, independently of the others, is

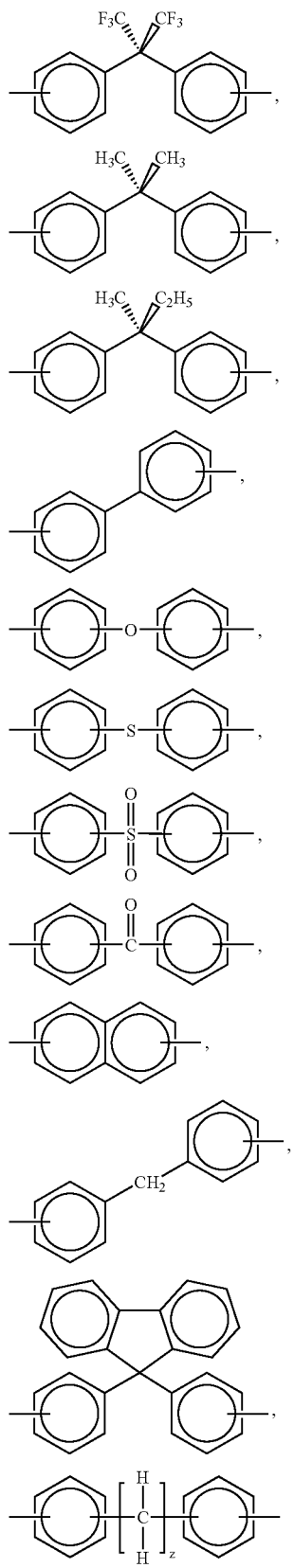
wherein z is an integer of from 2 to about 20,
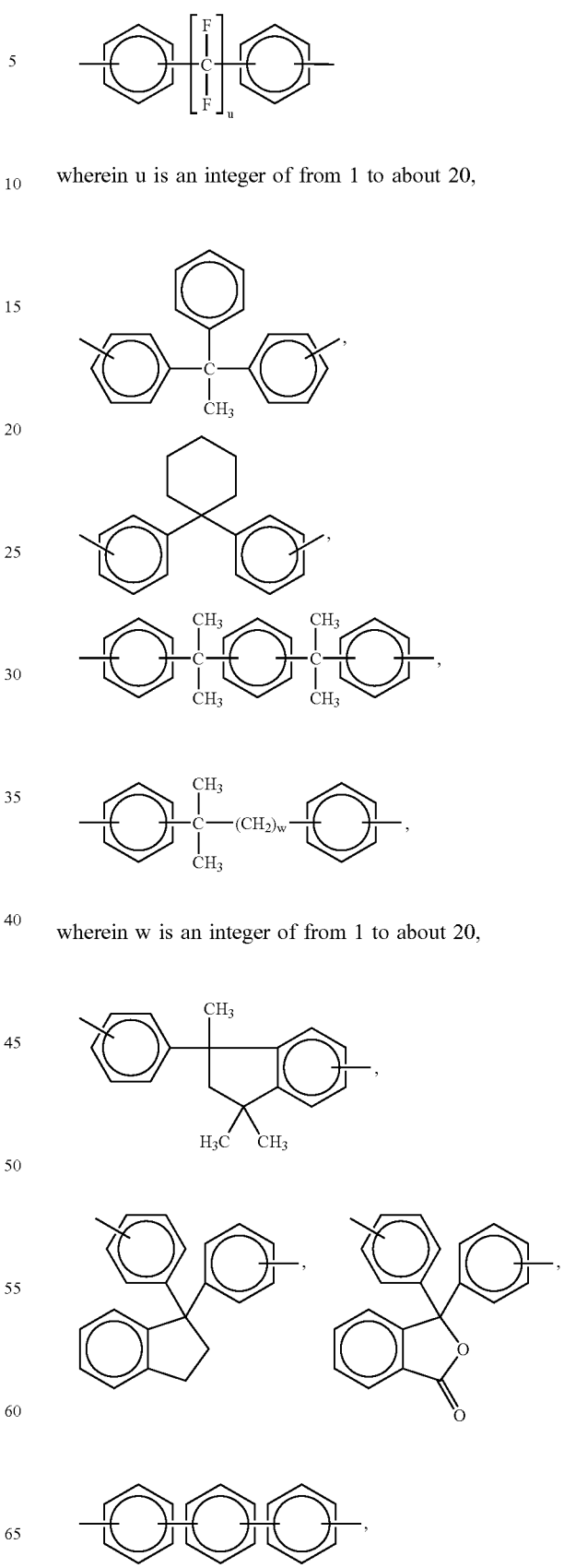
wherein u is an integer of from 1 to about 20,
wherein w is an integer of from 1 to about 20,

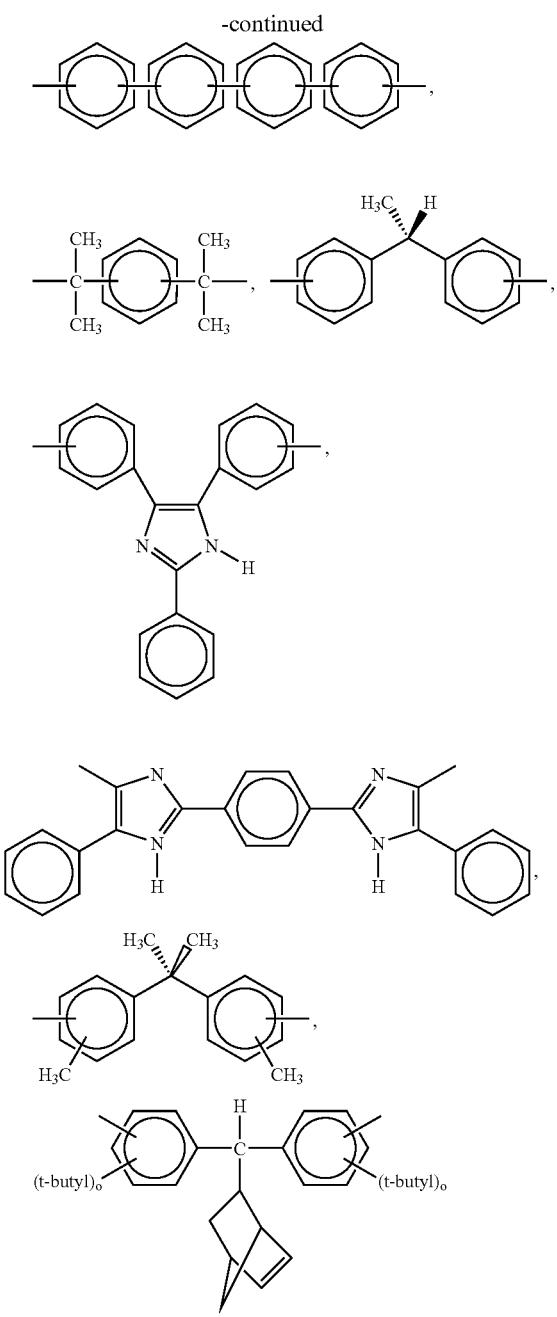

wherein each o, independently of the other, is an integer of 1, 2, 3, or 4,

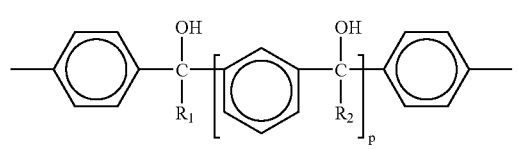

wherein $R_1$ and $R_2$ each, independently of the other, are hydrogen atoms, alkyl groups, aryl groups, arylalkyl groups, alkylaryl groups, or mixtures thereof, and p is an integer of 0 or 1,

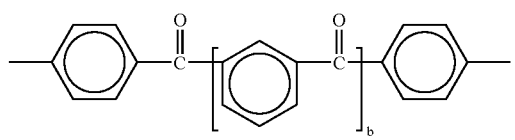

wherein b is an integer of 0 or 1,

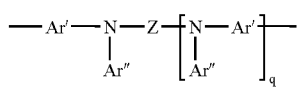

wherein (1)Z is

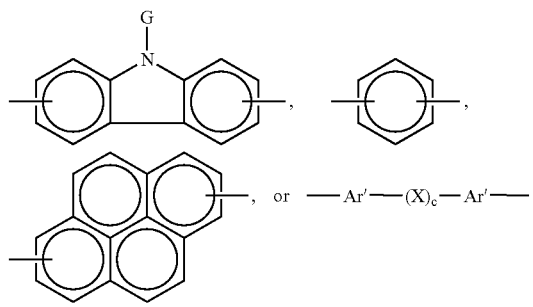

wherein c is 0 or 1; (2) Ar' is

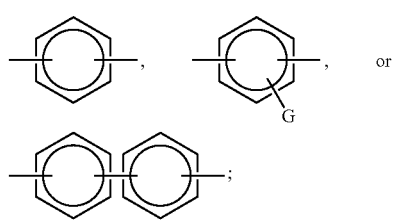

(3) G is an alkyl group selected from alkyl groups containing from about 2 to about 10 carbon atoms; (4) Ar" is

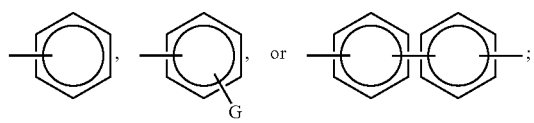

(5) X is

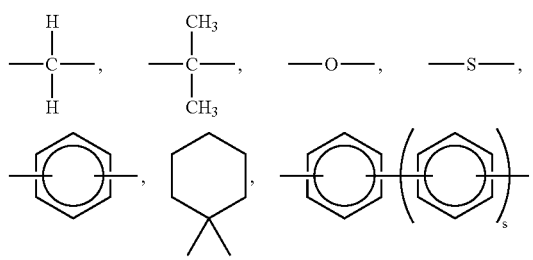

wherein s is 0, 1, or 2,

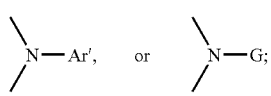

and (6) q is 0 or 1; or mixtures thereof, and n is an integer representing the number of repeat monomer units, (iv) a carbonate base, and (v) a dihalogenated monomer compound of the formula

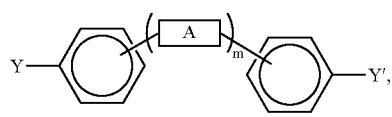

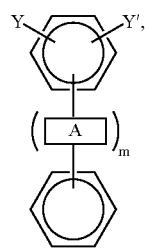

or mixtures thereof, wherein Y and Y' each, independently of the other, is a fluorine atom or a chlorine atom; and
(B) healing the reaction mixture
and removing generated water from the reaction mixture, thereby effecting a polymerization reaction.

* * * * *